May 10, 1966  S. REICH  3,250,914
ZONE CONTROL SYSTEM
Filed Nov. 2, 1961  28 Sheets-Sheet 1

INVENTOR.
S. REICH
BY
HIS ATTORNEY

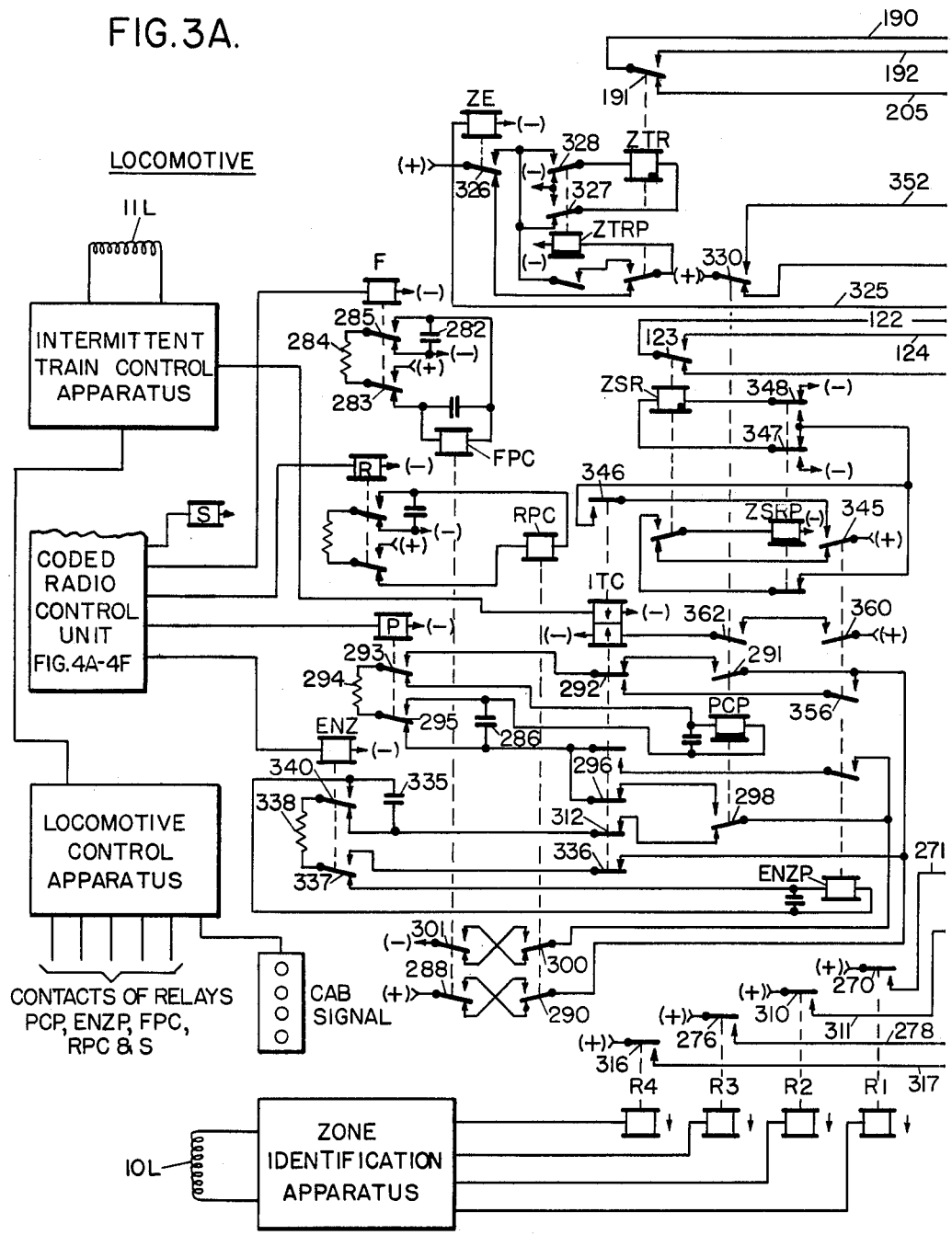

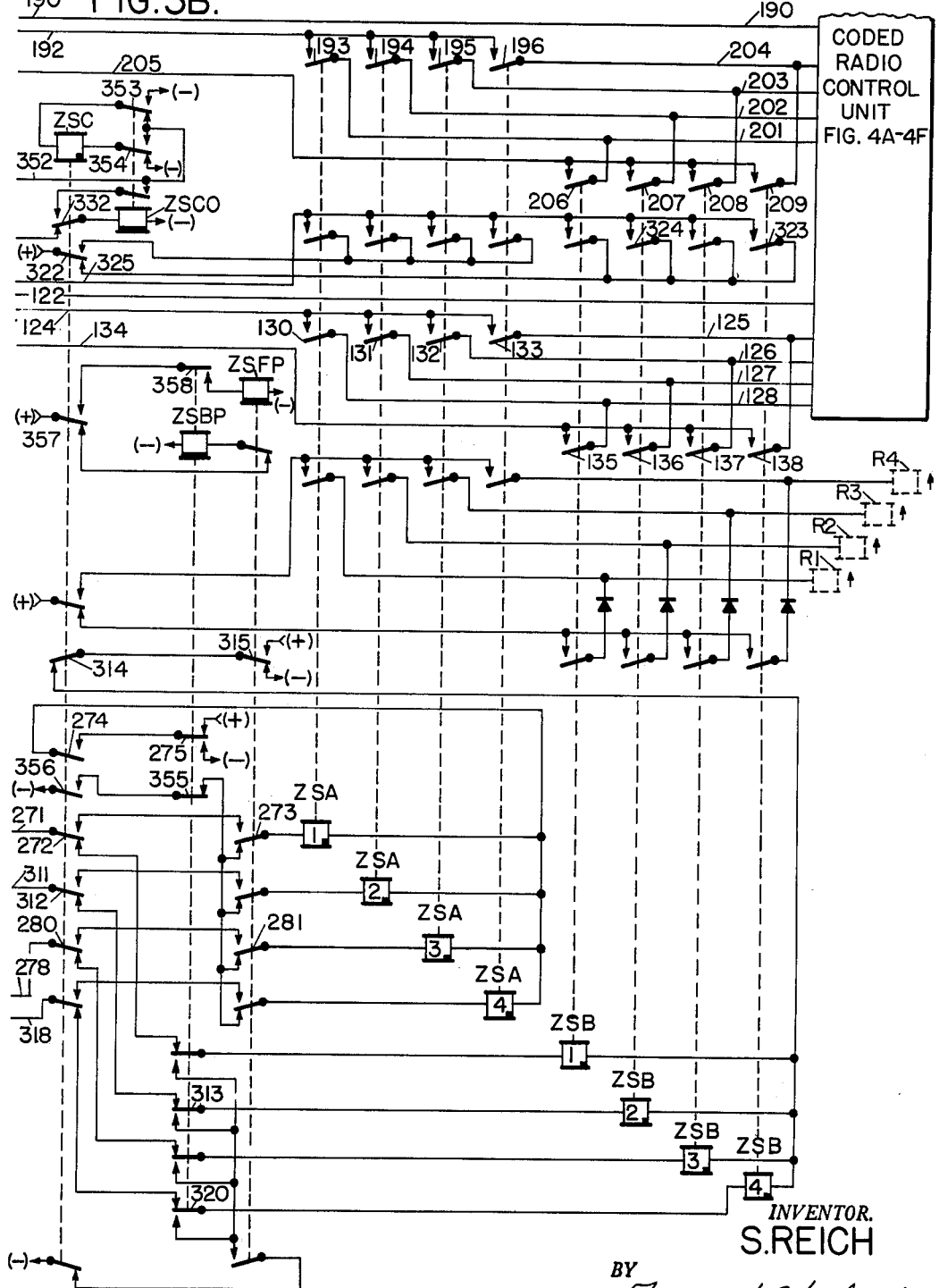

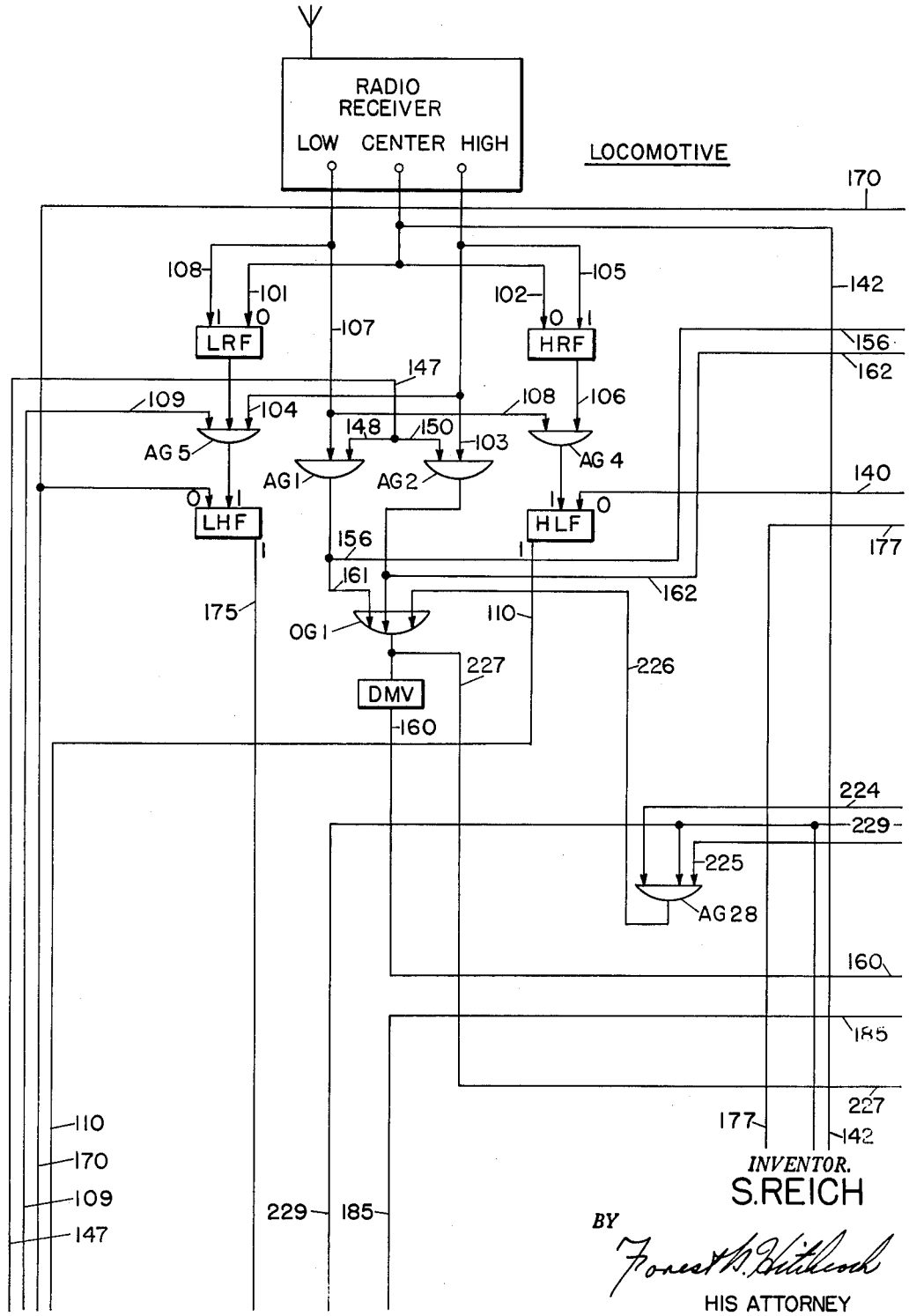

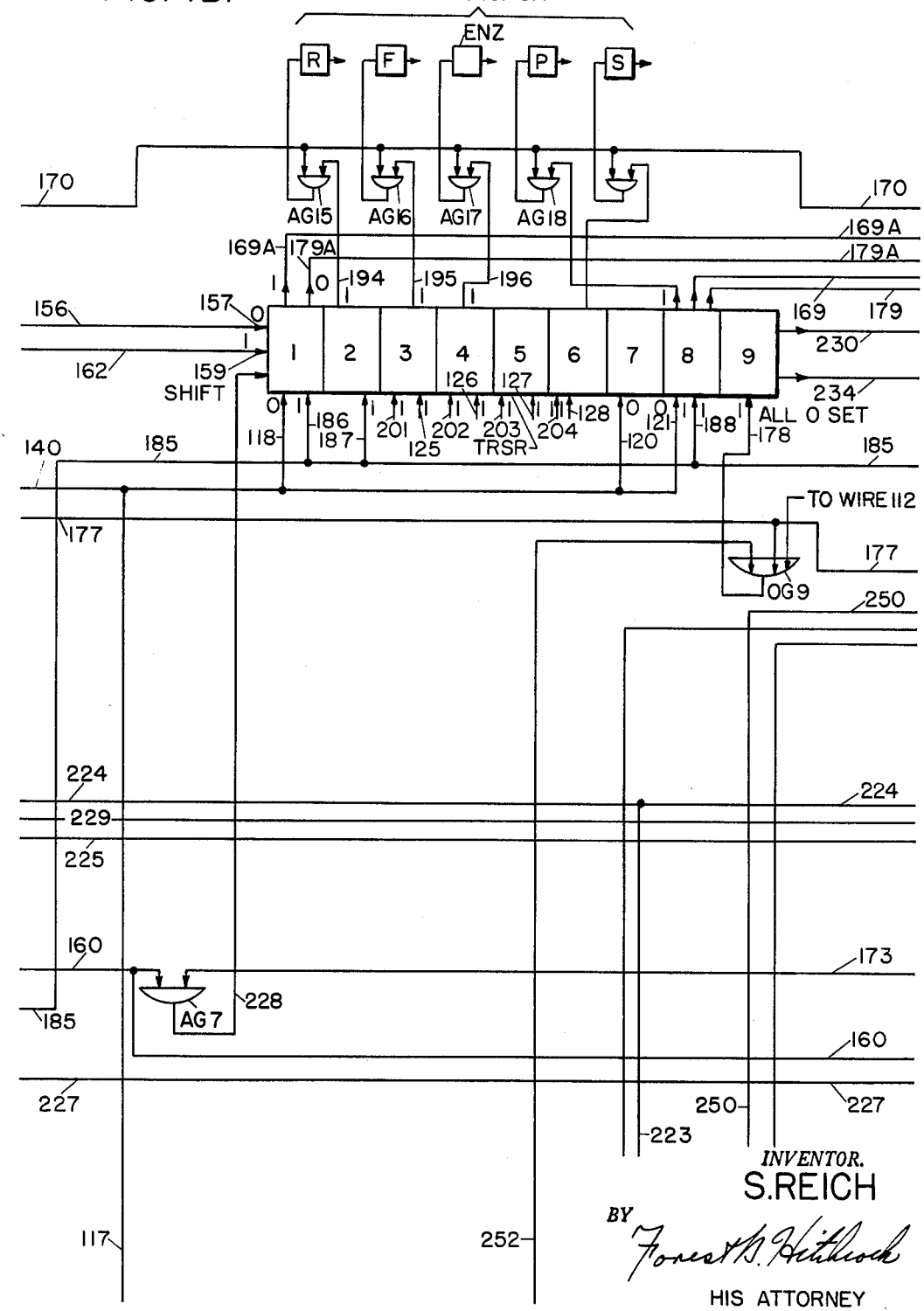

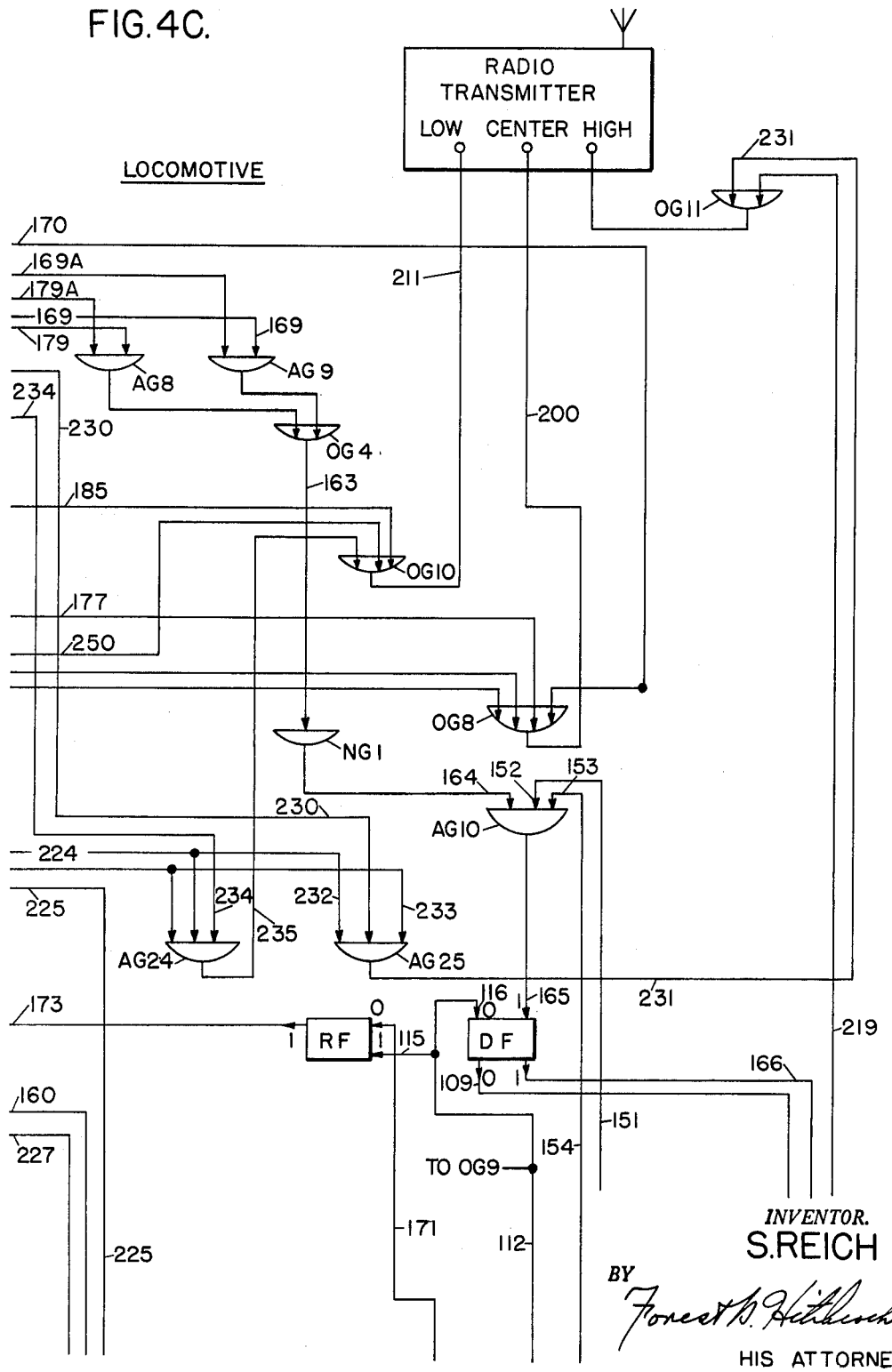

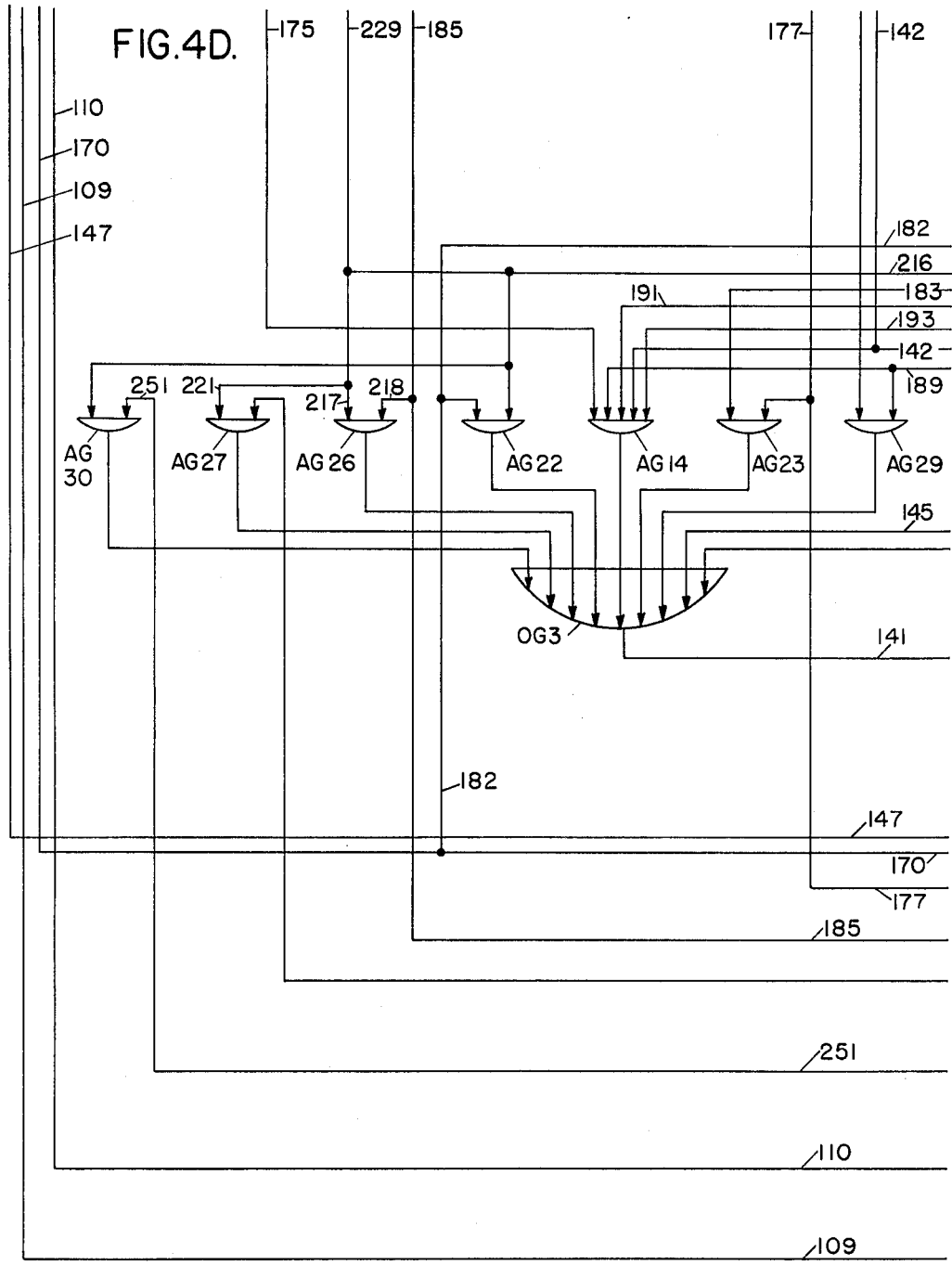

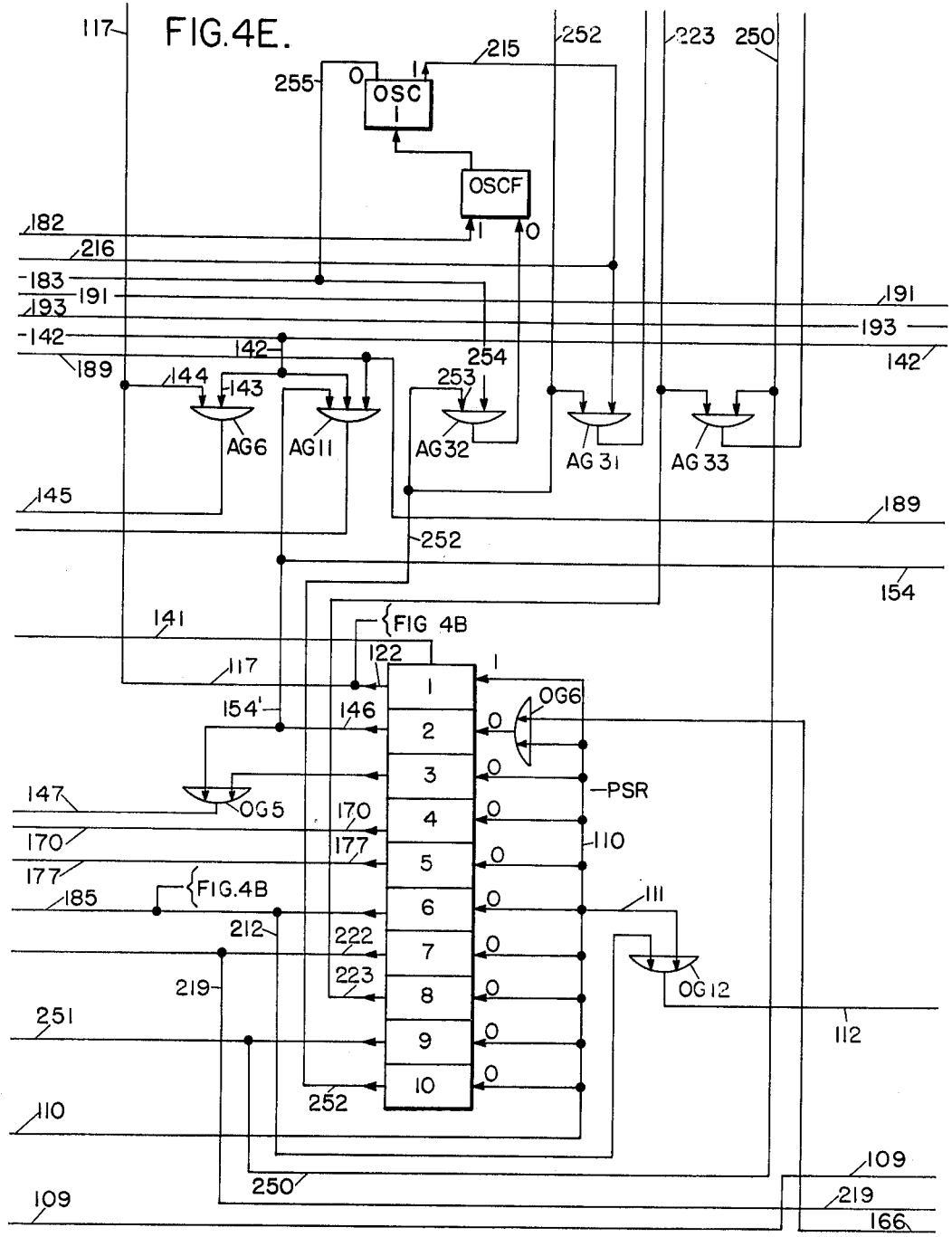

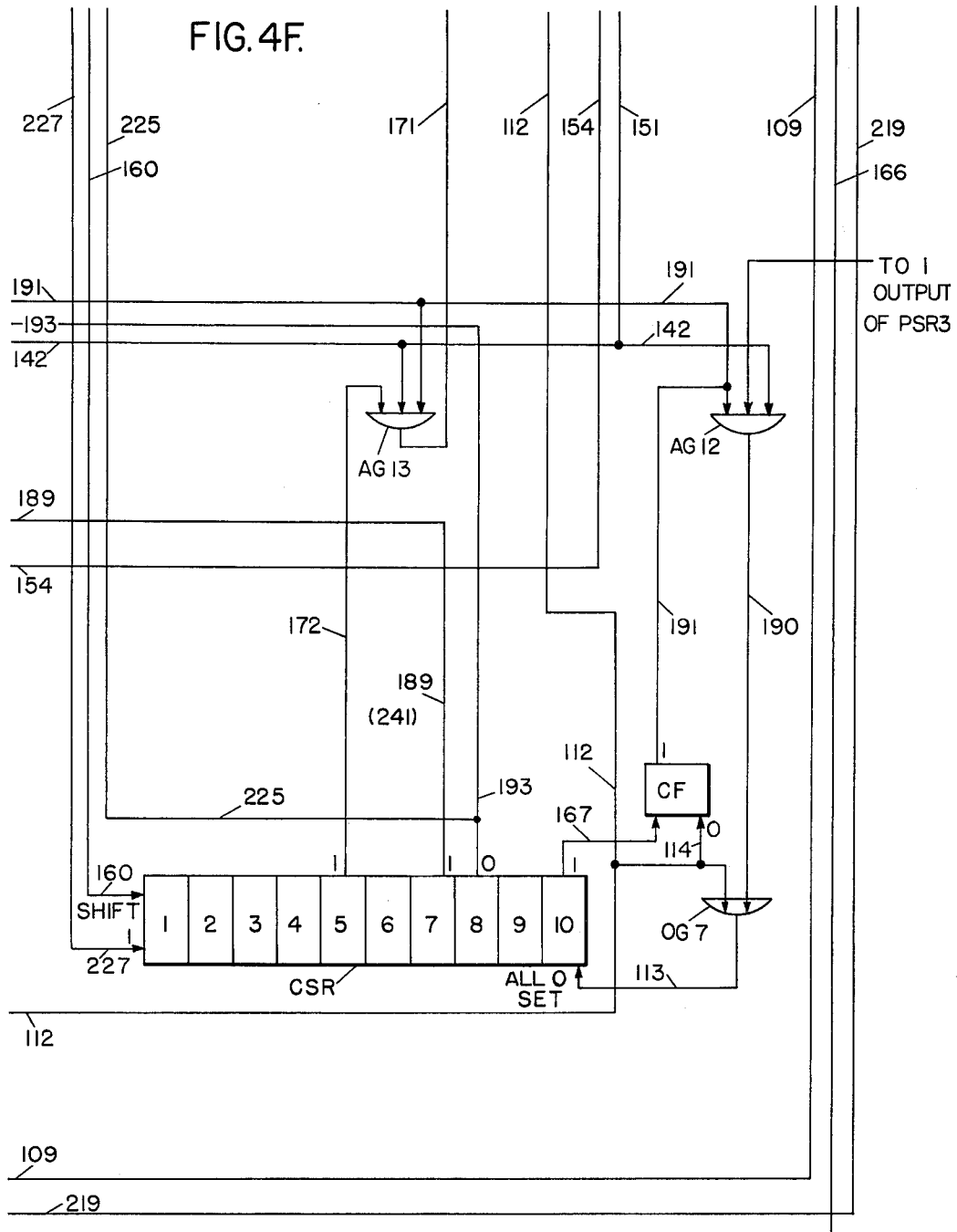

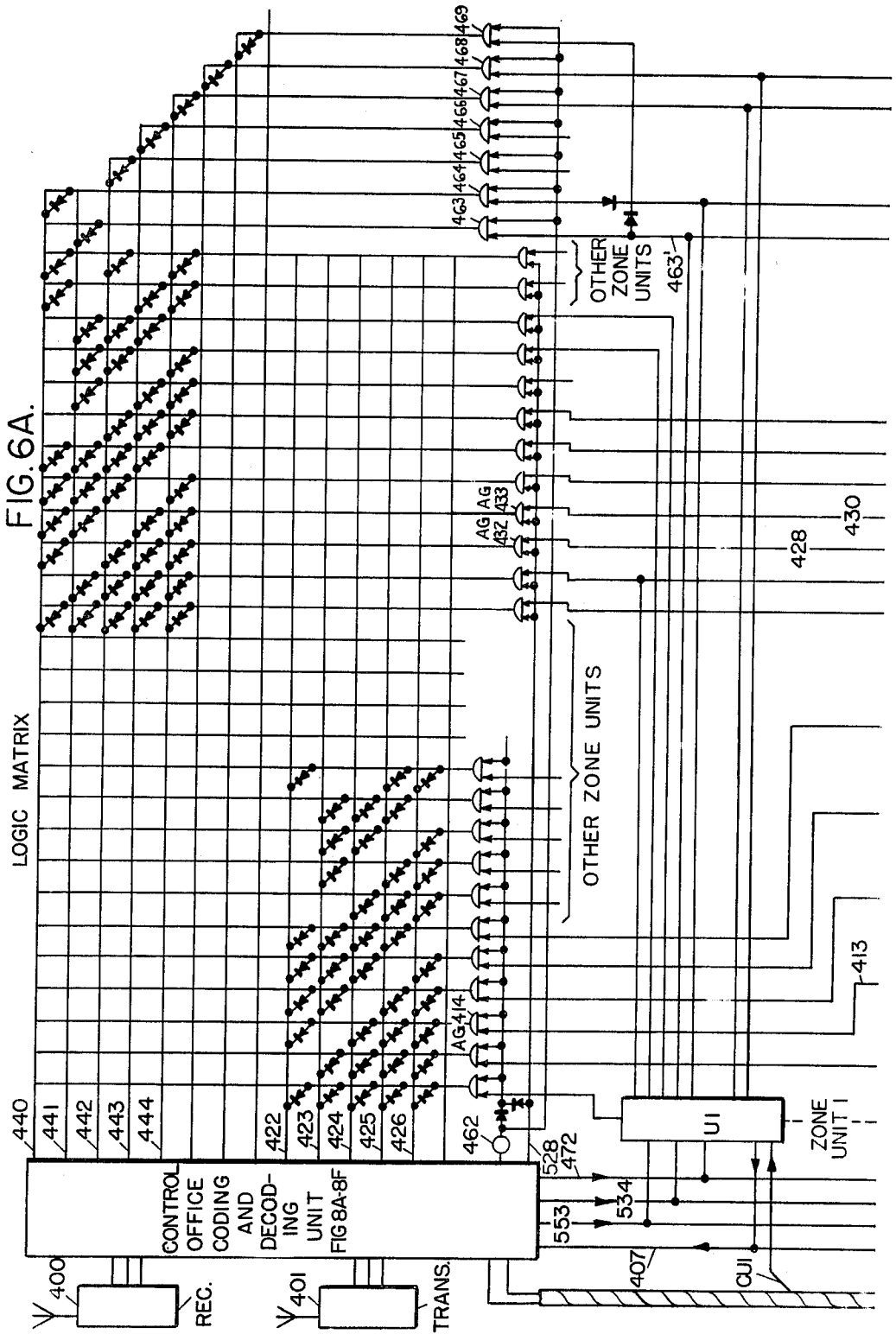

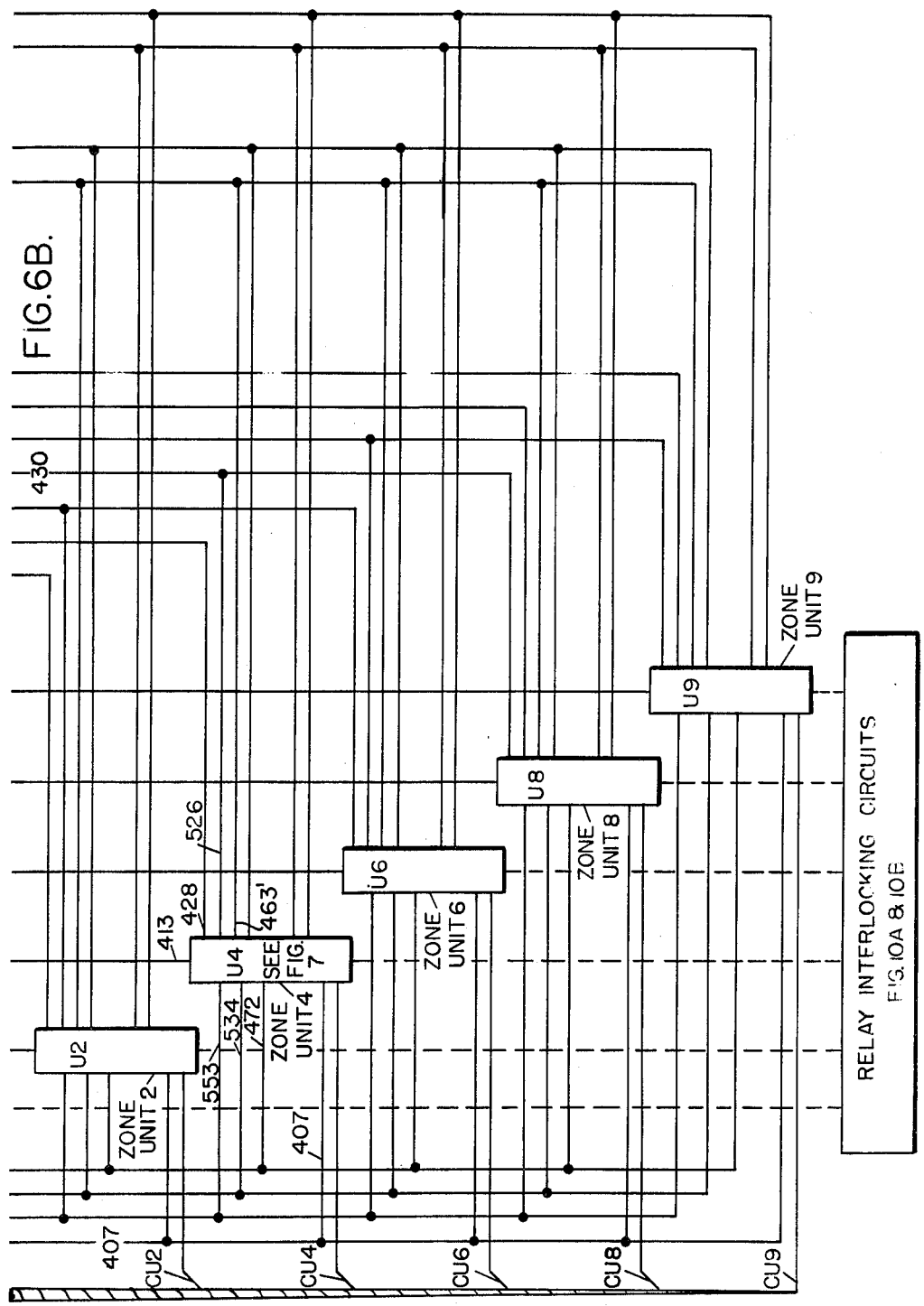

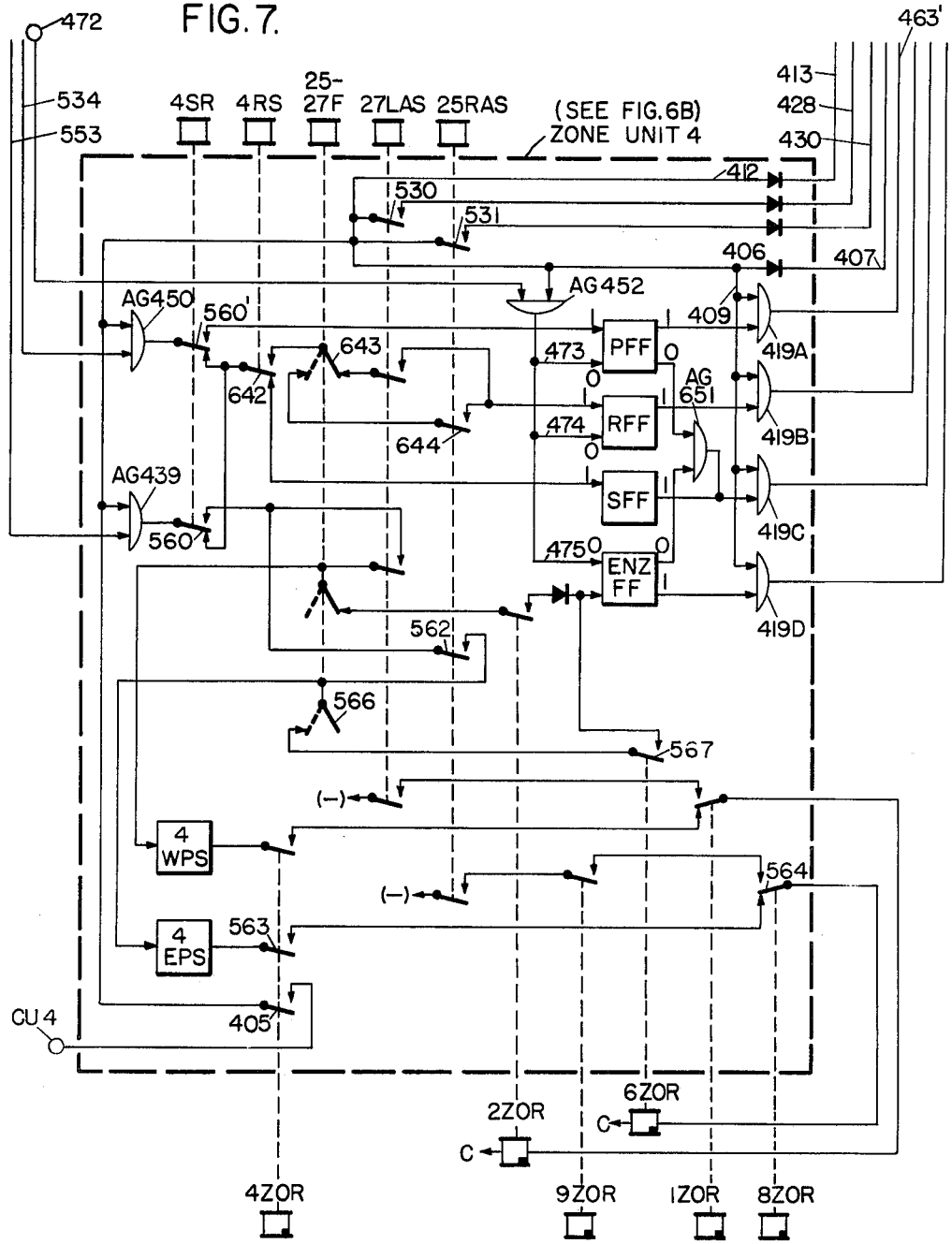

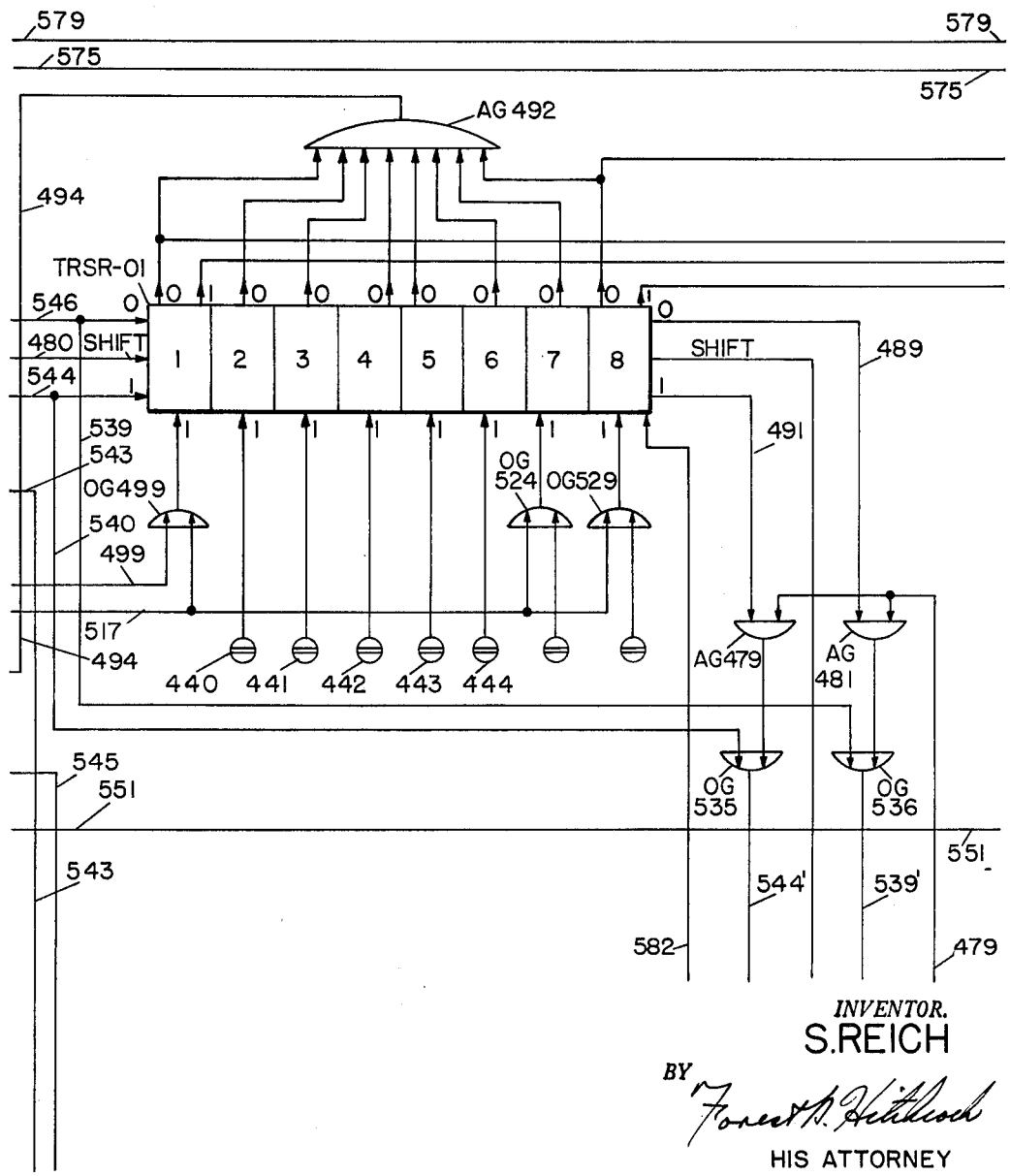

May 10, 1966  S. REICH  3,250,914
ZONE CONTROL SYSTEM
Filed Nov. 2, 1961  28 Sheets-Sheet 15

INVENTOR.
S. REICH
BY
Forest N. Hitchcock
HIS ATTORNEY

May 10, 1966  S. REICH  3,250,914
ZONE CONTROL SYSTEM
Filed Nov. 2, 1961  28 Sheets-Sheet 16

INVENTOR.
S. REICH
BY
Forest N. Hitchcock
HIS ATTORNEY

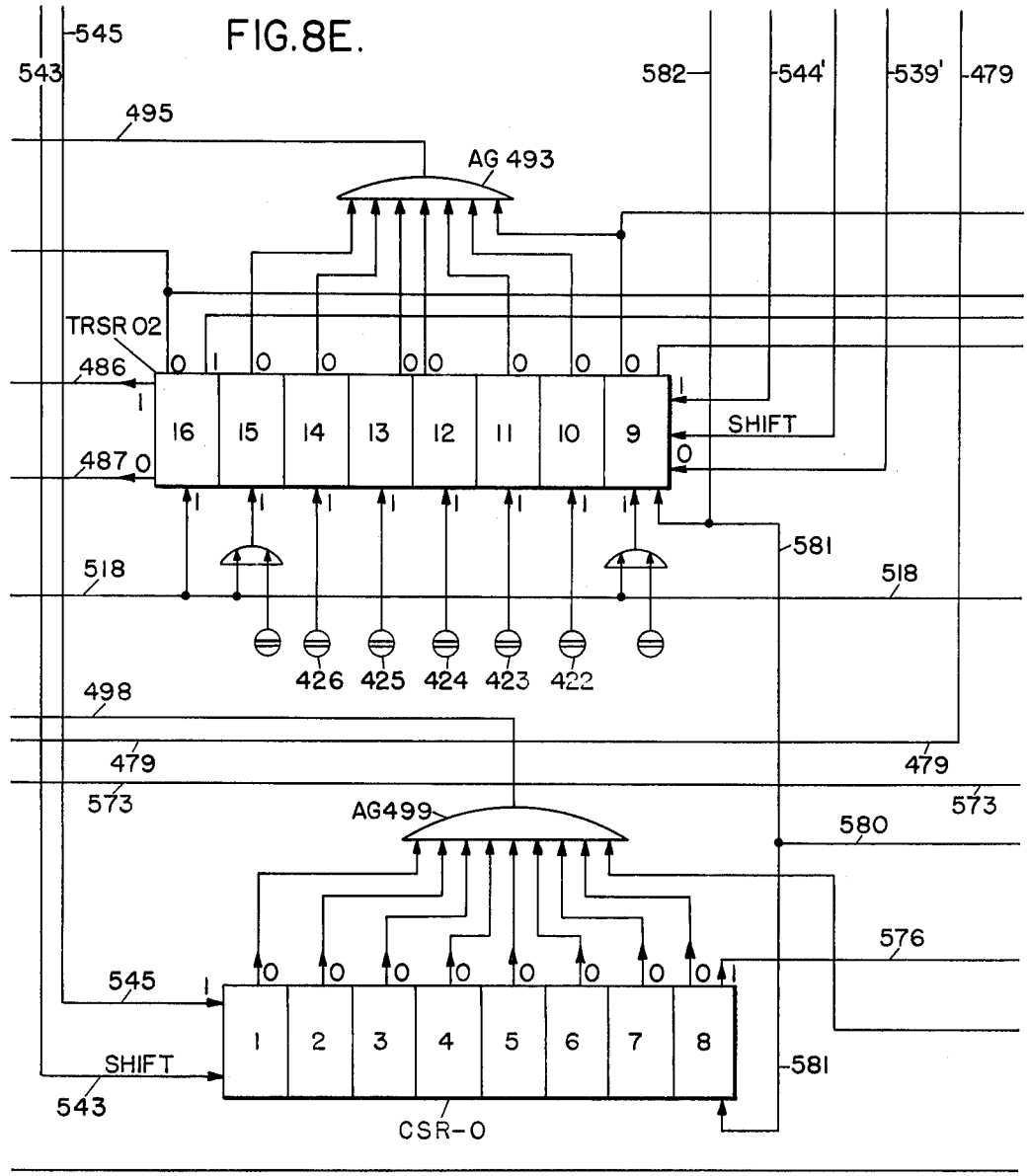

May 10, 1966 S. REICH 3,250,914
ZONE CONTROL SYSTEM
Filed Nov. 2, 1961 28 Sheets-Sheet 19
FIG.IOA.
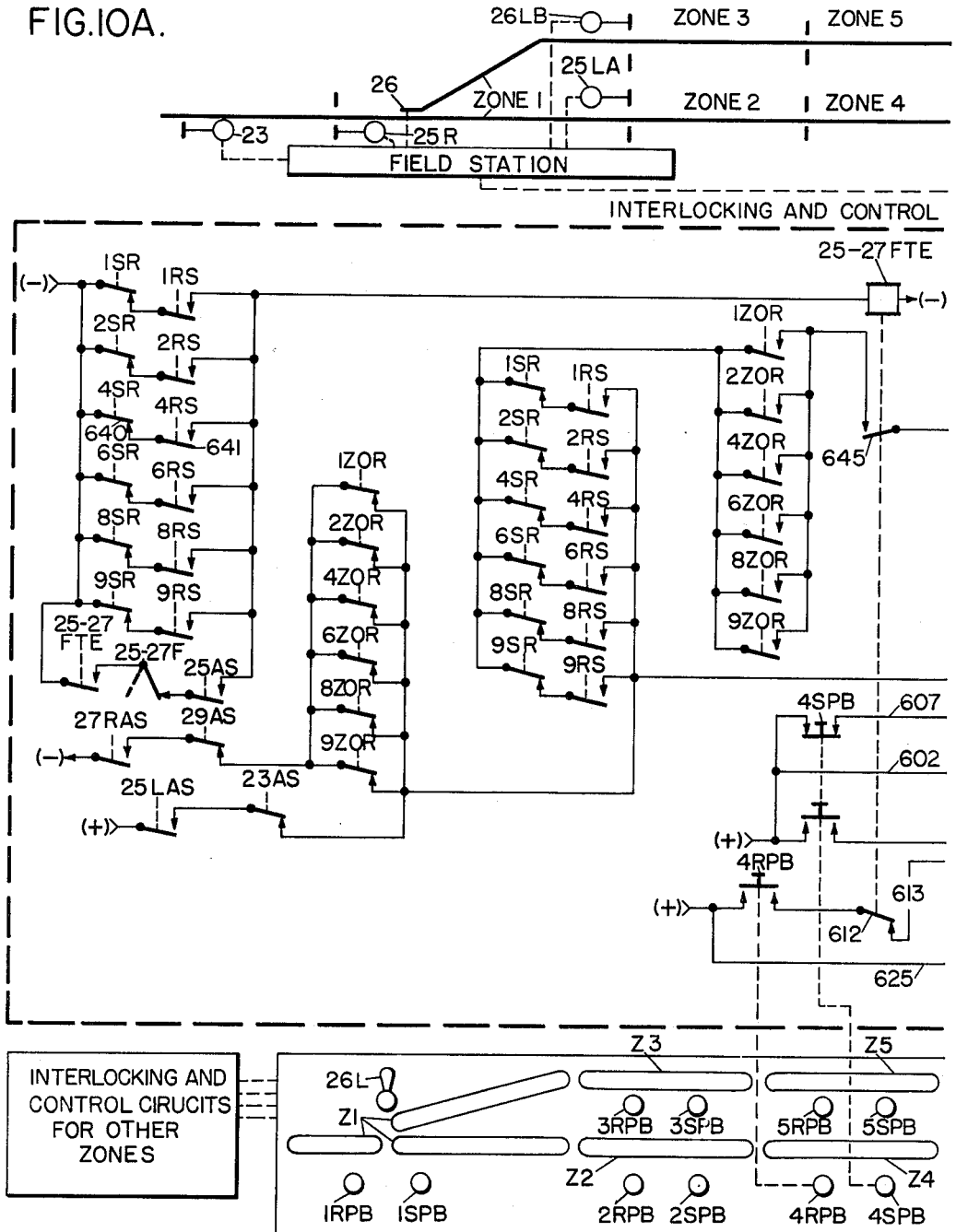
INVENTOR.
S.REICH
BY
Forest D. Hitchcock
HIS ATTORNEY

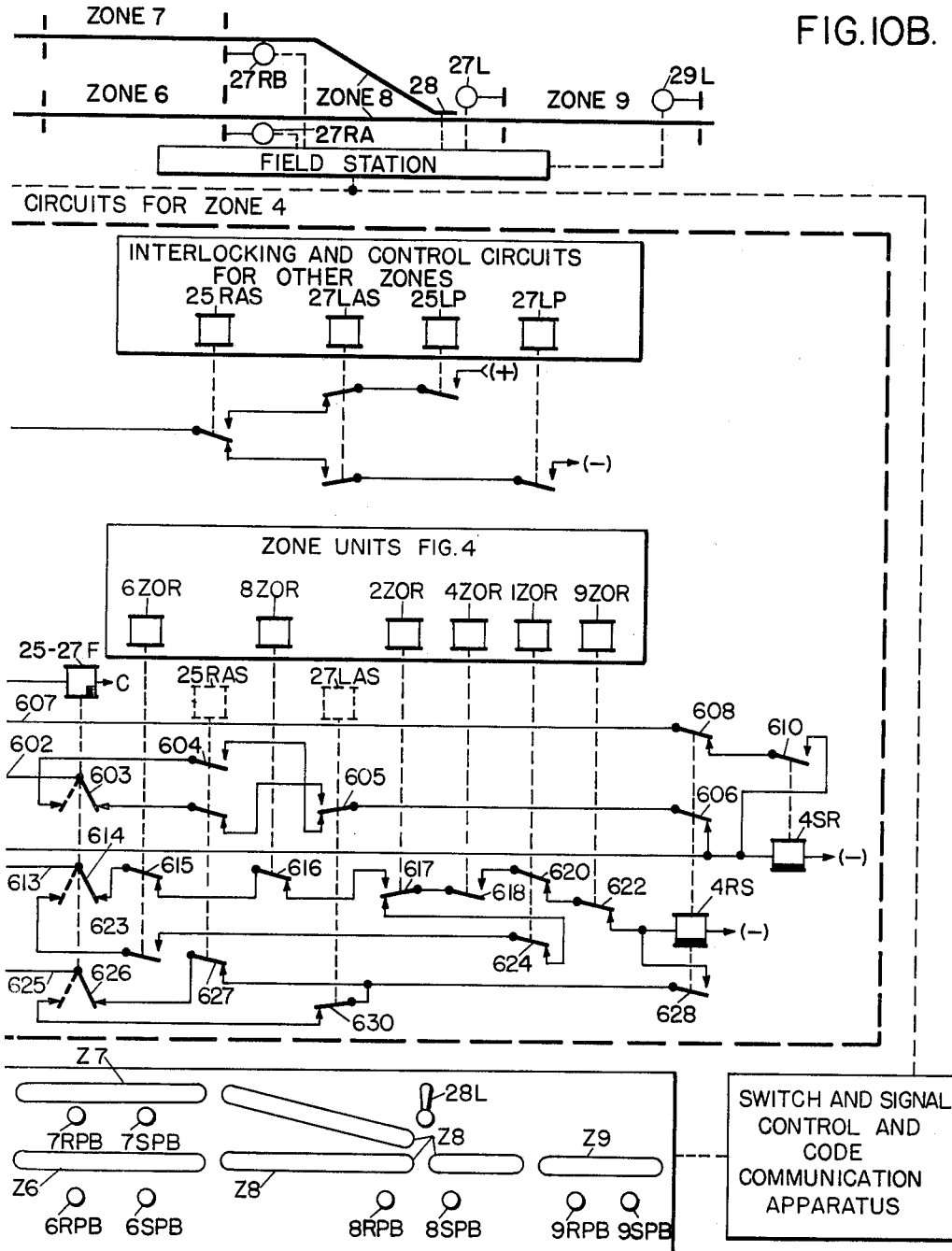

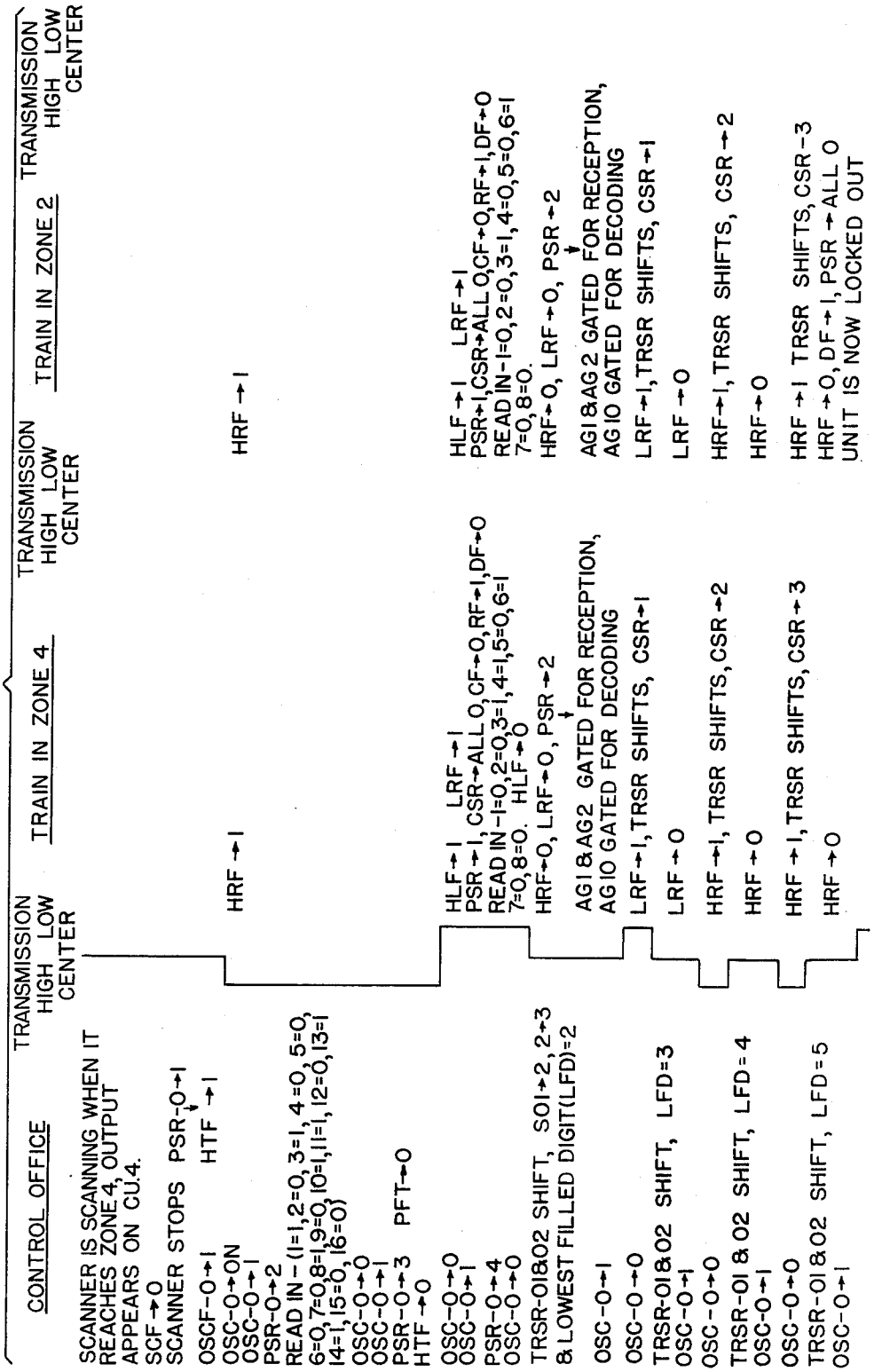

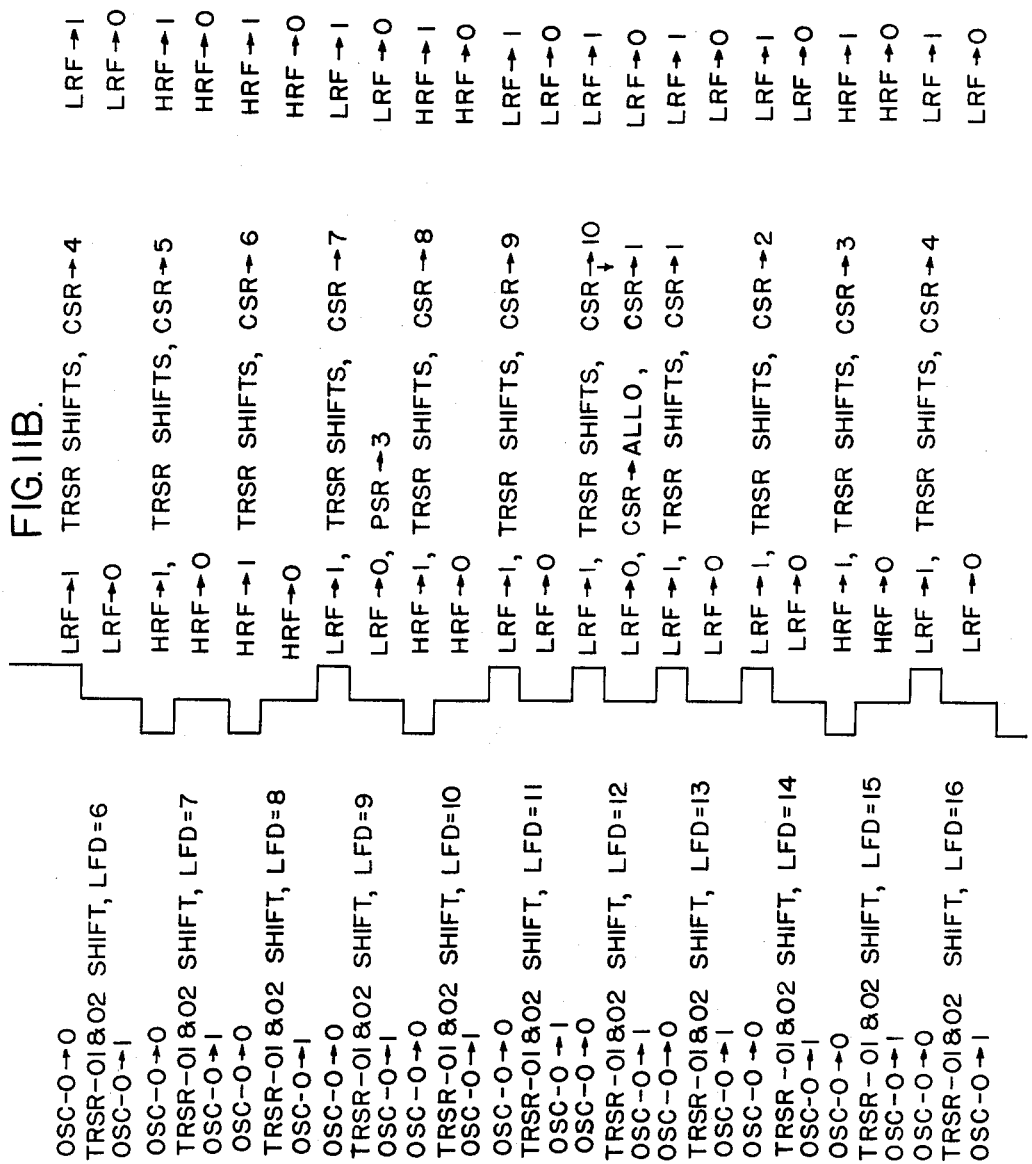

May 10, 1966  S. REICH  3,250,914
ZONE CONTROL SYSTEM
Filed Nov. 2, 1961  28 Sheets-Sheet 24

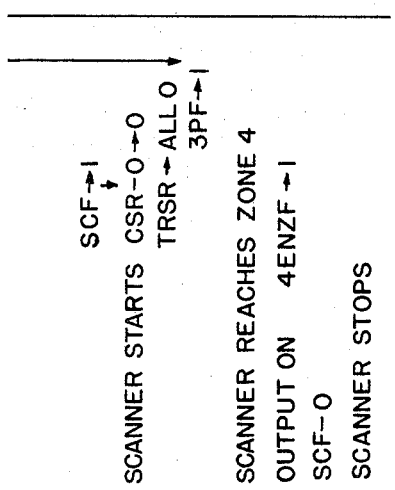

United States Patent Office 3,250,914
Patented May 10, 1966

3,250,914
ZONE CONTROL SYSTEM
Simon Reich, Rochester, N.Y., assignor to General Signal Corporation, a corporation of New York
Filed Nov. 2, 1961, Ser. No. 149,690
18 Claims. (Cl. 246—5)

The present invention relates to a system for governing the operation of railroad trains, and more particularly to a method and system for directing the operation of railroad trains over a stretch to track from a central location. Specifically, this invention relates to a system for controlling the operation of railroad trains over a stretch of track that is divided into zones, by the transmission and reception of information between a remotely located control station and the trains traveling in the controlled territory.

In transmitting traffic or control information to a railway train, it is necessary that the system is not influenced by erroneously transmitted or received information. It is also necessary that the system cannot be controlled to permit a dangerous traffic condition, and that the central control office never loses its control of a locomotive in the territory while the train is traveling therethrough. It is further required in such a system that the failure of any portion of the apparatus used in governing the operation of a train does not result in a condition that is unsafe for any of the trains in the controlled territory.

In a system according to the present invention, the railroad track is zoned geographically, such as by placing inert wayside devices at spaced intervals along the track to define each of the zones. Each train is equipped with apparatus that is responsive to its passing each of the wayside devices to denote its particular zone location. Each train is also equipped with apparatus to receive and transmit coded information from and to a central control office, and apparatus for storing the zone information in which the train is entering, and the zone information in which the train is located preceding its entrance to a new zone. In the present embodiment of the invention, the apparatus is illustrated to provide a system which will effect a control of the locomotive to cause it to either proceed, stop, or reverse its direction in accordance with the reception and lack of reception of coded information from the central control office.

The central control office is provided with apparatus for receiving and storing the zone location information in which each train is located and the zone location information which each train wishes to enter when it reaches the entrance to a new zone. The central office also has transmitting and receiving apparatus and interlocking circuitry to control the transmission of information to trains in respective zones. The central control office may be provided also with a control panel having a track diagram for indicating visually the location of each train in the controlled territory, and buttons or levers to provide a manual control. The system of the present invention may also be used with any conventional centralized traffic control system including outlying field stations, whereby the switches may be operated from the central control office.

One of the objects of the present invention is to provide an improved method and system for governing the operation of vehicles.

Another object of the invention is to provide an improved system for governing the operation of railroad trains along a stretch of railway track from a remote location.

Another object of this invention is to provide a system for controlling the operation of trains from a remote location whereby no unsafe traffic condition can be created between a plurality of trains being controlled or operating in the controlled territory.

Still another object of this invention is to provide a system for controlling the operation of trains which insures that the central control office will not lose control of any of the trains during any portion of their travel.

A further object of this invention is to provide a system of the character described which use a minimum of communication channels between the central control office and the trains operating in the territory.

A further object of this invention is to provide a system of the character described wherein the trains are under the complete control of the central office regardless of their position within a particular individual zone.

A further object of this invention is to provide a system of the character described which permits any number of trains to be controlled through a predetermined number of zones without any alteration or addition to the control office apparatus and equipment.

A still further object of this invention is to provide a system of the character described which permits a minimum of wayside apparatus.

A still further object of this invention is to provide a system of the character described which is not only effective to control the operation of unmanned locomotives, but for manually controlled locomotives as well.

A still further object of the invention is to provide a system of the character described, which may be used with any conventional centralized traffic control system, and when so used, permits trains not under remote control to travel safely over the controlled territory with trains which are under remote control.

A still further object of this invention is to provide a system of the character described which controls the trains to any one of a plurality of proceed, stop, or reverse operations.

Other objects of this invention will become apparent from the drawings, the specification, and the appended claims.

In the drawings:

FIG. 1 illustates diagrammatically a typical track layout, and a train with the train carried apparatus of the system according to one embodiment of this invention, being illustrated in block diagram;

FIG. 2 illustrates in block diagram the control office apparatus of the system according to one embodiment of this invention;

FIGS. 3A and 3B when placed side by side illustrate partly in block form and partly schematically that portion of the train carried apparatus and circuitry which includes the intermittent train control apparatus, the locomotives engine controlling apparatus, the zone identification apparatus, and the zone storage apparatus and circuitry of the system according to this embodiment of the invention;

FIGS. 4A through 4F when arranged according to FIG. 5 illustrate diagrammatically the apparatus and circuitry of the train carried coding, decoding and logic apparatus of the system according to the embodiment of the invention;

FIG. 5 illustrates the arrangement of the drawings of FIGS. 4A and 4F;

FIGS. 6A and 6B when placed one beneath the other illustrate diagrammatically and in block form the manner in which the control office coding and decoding apparatus is connected to the logic matrix and a representative portion of the zone units for a controlled territory;

FIG. 7 illustrates schematically the apparatus and circuitry of the zone units for zone 24 of the typical track layout illustrated herein;

FIGS. 8A through 8F when arranged according to

FIG. 9 illustrate schematically the apparatus and circuitry of the control office coding and decoding unit;

FIG. 9 illustrates the arrangement of FIGS. 8A through 8F;

FIGS 10A and 10B illustrate diagrammatically the interlocking and control apparatus and show schematically the circuitry of the interlocking apparatus associated with one of the zone units of a system constructed according to this embodiment of the invention; and FIGS. 11A–11H is a chart to show a typical sequence of operation of the system.

Figure 1:
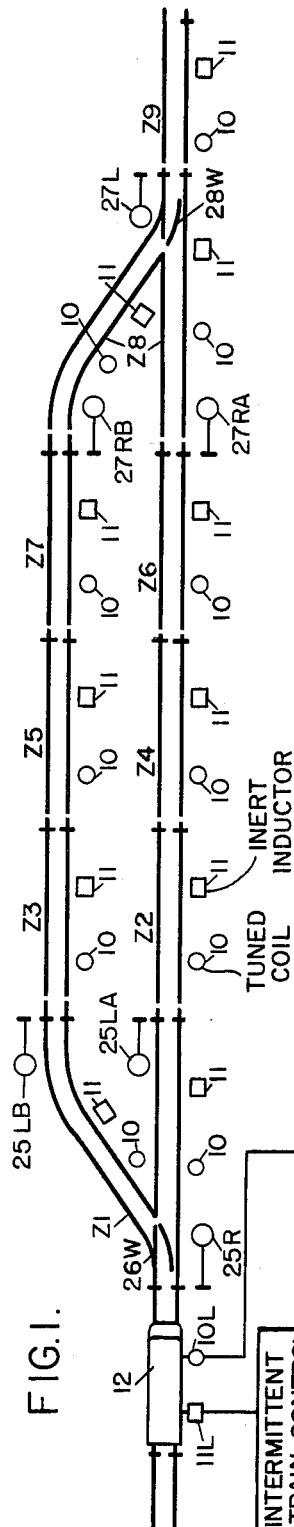

For the purpose of simplifying the illustration and facilitating in the explanation, the various parts and circuits constituting this embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays, components, and other electronic devices are illustrated in a conventional manner, and symbols are used to indicate distinctive outputs and connections to the terminals of sources of electric current, instead of showing all of the wiring conections to these terminals. Certain of the relays and their contacts are shown in written circuit form and identified by corresponding reference characters appearing directly above such contacts.

In carrying out the objects of this invention, and according to the illustrated embodiment, a continuous control of the trains is achieved by means of roll call instruction to the locomotive and a report back to the control office on a continuous scan basis. A space radio carrier is used for communication in conjunction with inert wayside devices along the track, and interlocking equipment and other circuitry at a central control office, which has an operating panel to permit control of the system. The controlled territory is separated into a number of discrete intervals or zones by inert track side elements, and their locations establish the identities and boundaries of the specific zone or section of track. A train carried device responds to its passage of a track side element to determine when a zone boundary has been passed. The trains are addressed from the control office by the number of the zone in which they are located. Each locomotive will receive instructions from the control office and respond to a message addressed to the zone in which it is located by the control center or office. The zone identity and other information is transmitted between each train and the control office at very close intervals of time, such as once each second for example.

Each occupied zone is addressed by the control office in turn, with each train thereby receiving commands periodically, regardless of whether or not the train encounters any new conditions or whether the control office wishes to give a new command. The commands to each train include "Proceed in the same zone that you are now located," "enter a new zone," "stop," or "reverse." The command repetition rate to each train depends on the number of zones occupied in the controlled territory. If no "proceed" or "enter new zone" command is received by the locomotive for a certain predetermined period of time, it will be interpreted by a particular locomotive as a "stop" command. The control office governs the sequence of transmission to and from the trains, thereby preventing one train's transmission from interfering with another's. One communication channel is required for transmission from the trains to the control center, and another channel is required for transmission from the control center to the train with the transmission each way being on a time sharing basis. Information is transmitted by modulating or shifting the basic carrier frequency that is transmitted.

In this embodiment of the invention three modulation or shift frequencies are used: a center frequency, a high frequency, and a low frequency. The code information is formed by combinations of the high and low frequencies shifting from the center frequency which is used for synchronization.

Broadly and without attempting to limit the scope of the invention, each train has apparatus that stores the zone location in which it is traveling, if it has not reached the end of the zone; and if the train is approaching the end of the zone as defined by an inert wayside device, the train then has in storage the zone location in which it is traveling and also the next zone in the direction of travel.

At the control office there is apparatus and circuitry for determining the conditions of occupancy of each zone, the traffic conditions which make it either safe or unsafe to proceed, and means for storing until transmitting the request by the train for a certain command, or a command to be sent to the train as controlled by an operator at the central office, or conditions requiring the train to stop if the command requested is improper.

To start a train moving through the territory, the zone location is pre-set on the train and a "proceed" command is pre-set in the control office apparatus when traffic conditions permit.

When the scanner in the control office reaches the apparatus associated with the zone in which the train is located, it first transmits a particular zone location code. This code is received by all the trains and serves to lock out the apparatus on each train except the one in the particular zone corresponding to the code. The command code is then transmitted which is received effectively only by the train that was not locked out. Assuming that the command is "proceed in the same zone," the apparatus on the train is conditioned by its reception so that the train in this zone is controlled to proceed.

After the command has been transmitted to the train, the control office, in effect, removes the command from its memory. The train addressed then begins transmitting a first series of code pulses to the control office, which causes the control office to store a code in its apparatus that is indicative of the zone in which the train wishes to travel. If the train has not yet reached the end of the zone in which it is proceeding, the code for the zone in which the train is proceeding will be transmitted.

The proper reception of this code causes the control office to store a "proceed" command for that particular zone, after which the communication between the train in this particular zone and the control office is stopped.

The scanner then operates to communicate with the train in the other occupied zones in turns. When the scanner again operates to cause the control office to address the train in this particular zone, if traffic conditions permit, and the train has not yet reached the end of the zone, a similar sequence of communication occurs to keep the train moving.

However, if traffic conditions should change to make it unsafe to travel in this zone, or if the operator at the control office wants to control the train to "stop," the transmission by the train of its zone location to the control office after being addressed, is unable to cause the "proceed" command to be stored in the control office apparatus. If the train is controlled to "stop" a separate stop command is stored therein instead. Thus, the next time the train in this zone is addressed, no command is transmitted, or a "stop" command is transmitted. Thus, the train will be commanded to stop, and a similar communication will occur each time thereafter this zone is addressed until the traffic conditions clear up which will permit the control office to store the "proceed" command or until the operator cancels his manually initiated stop command.

In the event that the code transmitted by the train to the control office does not correspond to the zone in which it is located, or corresponds to the next zone in the direction of travel, no command or movement is stored in the control office apparatus, and the train is controlled to stop. Each time a control of movement that is stored in the control office is transmitted to the train, it is removed from the control office so that traffic conditions are checked before each communication.

When the train approaches the end of the zone as defined by an identification coil, a code corresponding to the identity of the next zone in the direction of travel is then stored on the train. When the scanner reaches the original occupied zone the train is addressed by a code directed to that zone followed by a code corresponding to the "proceed" command. When the train answers the control office under these conditions,, it transmits a code corresponding to the code for the next zone in its direction of travel. The reception of this new zone code by the control office causes the control office to store the command "enter new zone," if the traffic conditions render it safe to do so, and also to store occupancy of this succeeding zone. The next time the office is to address the zone in which the train is located, the particular train in this zone receives the command "enter new zone." However, because the "proceed" command is still stored on the train as a result of the previous transmission by the train to the control office the command to "enter a new zone" is ignored and the result is the same at this point as if no command were received. In response thereto the train again transmits to the control office the code for the next succeeding zone, which is again interpreted as a request to "enter a new zone," and this command is stored in the control office until the next communication with this train.

By the third or fourth time the control office addresses this train, and transmits the command to "enter the new zone," the train has noted that fact that the previous communication did not give a "proceed" command, and the "enter new zone" command is being received by the train. The reception of the command "enter new zone" by the train is indicative of the fact that the train has passed the identification coil near the end of the zone in which it is traveling and that the control office has checked the traffic conditions and found them in a condition to permit the train to enter the subsequent zone, but the reception of the command "enter new zone" does not permit the train to proceed in this new zone.

An intermittent inductor is placed along the track a predetermined distance from the identification coil in the direction of travel of the train. When the train passes this coil it initiates a stop condition and simultaneously causes the train carried apparatus to cancel the zone storage information for the zone which it is leaving and to be responsive to the address of the next succeeding zone. Thus, after passing this inductor the train responds to the reception of the control code addressed to the subsequent zone, and transmits the code for that subsequent zone which will be interpreted at the control office as a request to "proceed" in this zone. When the train receives this command it prevents the application of the brakes of the train.

If the zone identification coil were defective, a wrong response from the train would prevent the subsequent transmission of a proper command and the train would stop. If the zone identification coil were missing the train would be brought to a stop after passing the inert wayside inductor because no "enter new zone" command would be stored on the train. If the inert wayside inductor were defective or missing the train could not respond to address the subsequent zone after passing the zone identification coil and the train would come to a stop when it reaches the entrance to the next zone.

A separate "stop" command may be provided to reenforce the "no code" stop command and to give quicker response than the "no code" stop. The command for reversing the locomotive requires first a "stop" command to be transmitted for a minimum time, then a check at the train to prove the train has actually come to a stop, and thirdly a reverse command transmitted by the control office. After this, the "proceed" or "enter new zone" commands are transmitted as required. The zone number transmitted by the train to the control office is checked at the office to make certain it is the zone number of the zone the train is actually in, or the zone number of the next zone in the direction of travel. If this check is in disagreement, no "proceed" or "enter new zone" command can be transmitted.

With respect to the communications between the control office and the train, the control office transmission code is comprised of a plurality of series of pulses, which in sequence indicate the beginning of transmission to condition the train carried equipment for reception, identify the particular zone to which the transmission is intended, thus locking out all the trains except that one in the particular zone addressed, present the command to the train in the zone addressed, and denote the end of control office to train transmission.

Before a command is executed by the locomotive, the number of pulse digits or bits received at the train in the zone addressed must correspond to that number which it is required to receive. The "proceed" command and the "enter new zone" command are sent to the train whenever the control office interlocking unit indicates that it is proper for the train to operate as indicated in response to a request therefor. These commands are so interlocked that if an inert wayside identification marker is defective, the train will detect this failure and come to a stop.

Following the completion of the control center to train transmission, the train in the zone addressed begins a train to control office transmission cycle. This cycle consists of a plurality of series of pulses which in sequence announce the beginning of transmission, identify the zone the train is in, if the train is not at the end of that zone, or if the train is at the end of that zone and is to enter a new zone, identify the number of the subsequent zone in the direction of travel, and mark the end of the transmission cycle from the train. The number of pulses received at the control office is checked to insure that it equals the proper number of pulses which should be be transmitted before the transmission is interpreted.

Referring to the drawings, and particularly to FIG. 1 the illustrated track layout for this embodiment of the invention is separated geographically into zones Z1 through Z9. Each zone is defined by a single entrance coil such as are denoted at 10, and an unwound inductor, which is spaced from each coil 10 and referred to at 11. Each coil 10 is spaced from a respective inductor 11, a distance equal to at least one stopping length for a train. The controlled territory is illustrated to include a passing siding having a switch 26W and 28W, respectively, at each end thereof. Zones Z1, Z2, Z4, Z6, Z8 and Z9 are illustrated as successive zones on the main track.

Zones Z1, Z3, Z5, Z7 and Z8 are successive zones on the siding. The zones Z1 and Z8 are common to both the main track and passing siding because they include the switches 26W and 28W respectively.

The zone entrance or identification coils 10 are comprised of one or more loops which are distinctly tuned according to a particular identity of the zone location which it defines. In the illustrated embodiment of the invention it is contemplated that one to four distinctively tuned loops may be used for each zone identification coil as required. For example, the coil for zone Z2 may consist of only one loop that is tuned distinctively, and zone Z4 may have two or more different and distinctively tuned loops to denote its particular zone location. These wayside loops are conventional and comprise a fixed coil and a variable condenser which make up a tuned circuit. The particular combination of tuned loops 10 at each zone location are conventional and are used to distinctively activate certain train carried zone identification apparatus to be hereinafter described. Each intermittent inductor 11 may be a conventional unwound inductor which activates certain train carried apparatus and intermittent train control apparatus on the locomotive as hereinafter described.

Mounted on each locomotive, one of which is referred to at 12, is a coil 10L which is distinctively influenced each time the locomotive passes one of the wayside coils 10. The coil 10L is connected to well known identification apparatus used in conventional train describing systems. In the illustrated embodiment of the invention, it is assumed that when the train carried coil 10L passes a wayside loop 10 an oscillating reaction occurs in a conventional manner which is amplified by a conventional reaction amplifier each time the oscillator frequency sweeps by the loop frequency. The output of the oscillator is fed to a plurality of tuned circuits on the train corresponding to the wayside loops at the entrance to each zone. Each of these circuits is arranged in a well known manner to produce a momentary output pulse each time the oscillator sweeps the corresponding frequency thus a means is provided for identifying each wayside loop. A conventional arrangement of thyratron tubes, for example, which act as an electric switch, control an associated relay R1, R2, R3 and R4 in a manner well known in the art (FIG. 3A). Thus each time the train carried loop 10L passes a particular zone identification loop 10, a particular combination of the relays R1 through R4 are dropped away to designate the particular zone location. Also located on the locomotive is a coil 11L which is influenced by its passing each of the inert inductive devices 11. The influence of the coil 11L drops relay ITC when the train passes coil 11.

Each locomotive in this embodiment of the invention may be equipped with conventional control apparatus which operates the throttle or brakes of the locomotive and/or conventional cab signalling apparatus. A radio transmitter and receiver is provided on each locomotive to receive and transmit the code information as controlled by the system. A coding, decoding, and logic apparatus is provided on the train which receives and stores code impulses transmitted from the central control office that correspond to the address of the zone and the zone command. A zone number or identification storage and control unit is also provided on the train which supplies information to the coded radio control unit on the train, which allows this unit to determine which zone call to respond to, and what to transmit when it replies to a control office inquiry. This train carried unit receives commands from the coded radio control unit in the central office. The storage and control unit on the train also influences the correct sequence of operation of the system, and supplies safety interlocking as will be described in connection with the operation of the system.

Figure 2:
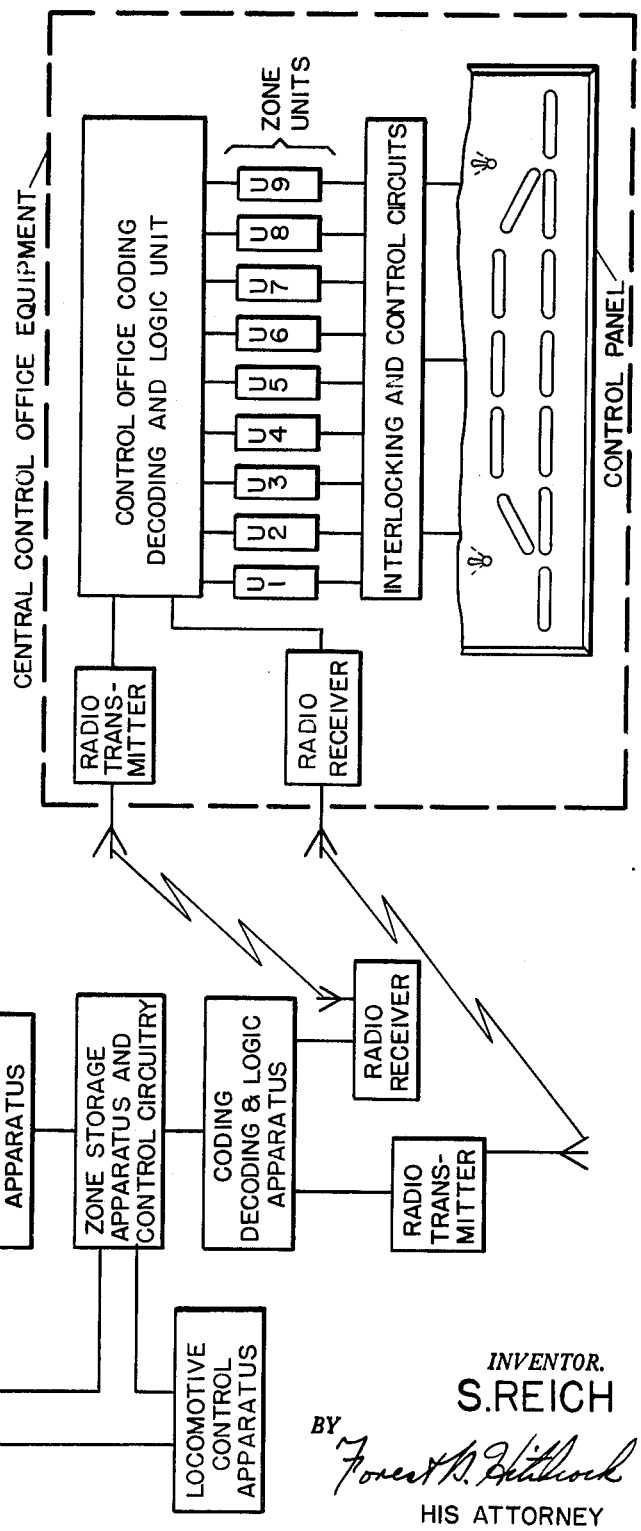

Referring to FIG. 2, the central control office is provided with a radio transmitter and receiver which is capable of transmitting coded information addressed to the locomotive and receiving coded information originating from the train carried transmitter. A coding, decoding and logic unit is provided in the central office, which is capable of scanning all of the zones in the control territory and stopping at those zones which are occupied. A zone unit is also provided in the control office for each of the zones in the system and are referred to in FIG. 2 at U1 through U9 successively. When the coding, decoding and logic unit scanner stops at an occupied zone, a code is transmitted for that zone which is followed by a command which is accomplished in conjunction with the zone units U1 through U9. The coding, decoding and logic unit, upon receiving the report from the train located in that zone, checks this information against that which would be a proper reply, and then forms a logical decision as to whether the train wishes to "proceed" in the same zone or whether the train wishes to "enter a new zone," and indicates this information to the proper zone unit U1 through U9. The coding, decoding and logic unit is comprised of conventional shift registers, flip flop circuits, gate circuits, "and" circuits, "or" circuits, and multivibrators which are connected in a manner to obtain the desired operation as will hereinafter be described.

A standard coded CTC system or a unit wire system may be provided for operating distant switches, and be provided with a suitable control panel having a track diagram thereon. This control panel may be equipped with individual contacts to operate each signal or with push buttons for conventional NX operation in accordance with the requirements of practice. In addition, suitable markings on the panel would delineate the limits of the zones. Push buttons or other types of contacts would be provided to manually control the train from the central control office. For example, suitable buttons may be provided to transmit various commands such as stop, reverse, etc.

The zone units U1 through U9, are provided to indicate zone occupancy to the decoding and logic unit, to the other zone units, and to interlocking circuitry which prevents the unsafe transmission of controls. They also determine the code that the radio transmitter transmits and are used in the logical decision making circuits of the coding, decoding and logic unit. In this connection they also indicate zone code for the next zone in the direction of travel which is used in the logical decision making circuits of the control office coding, decoding and logic unit. Further they provide the proper registration and interlocking functions and supply the command information to the coding unit for proper train operation at the proper time.

Referring to FIGS. 3A and 3B the zone storage apparatus and control unit on each train comprises a bank of magnetic stick zone storage relays ZSA1 through ZSA4, and a second bank of zone storage relays ZSB1 through ZSB4. Theses relays serve to store the zone number of the zone in which the train is in, and/or the zone into which the train wishes to enter. They are picked up when the train passes a wayside identification coil 10 and are knocked down when the train leaves the zone of which they are storing the identification. The zone storage relays ZSA or ZSB are picked up in a certain combination in accordance with the deenergizing of a particular combination of the zone identification relays R1 through R4. Thus, in using four zone relays together with four zone identification relays R, sixteen possible zones can be identified. The two banks of relays ZSA and ZSB, are provided to store both the zone in which the train is located and the zone which the train wishes to enter.

A zone storage control relay ZSC, which is a magnetic stick relay, is provided to determine which bank, either ZSA or ZSB, of storage relays are empty, and to feed the incoming information from the relays R1 through R4 into the proper bank of zone storage relays ZSA or ZSB. The relay ZSC is also used in clearing a bank of zone storage relays and for energizing the pick-up windings of the relays R1 through R4 (FIG. 3B) to reset the relays. A zone storage control operating relay ZSCO, which is a slow release neutral relay is provided to operate the ZSC relay at the required time.

A zone storage receiver relay ZSR, which is a magnetic stick relay, is provided to determine whether the coded radio control unit on the train will respond to the zone code represented by the storage bank ZSA or ZSB. When a train is traveling in a particular zone, this relay causes the coded radio control unit to respond to the zone code of that zone. This zone code may be stored in either zone storage bank ZSA or zone storage bank ZSB. The relay ZSR also, after meeting predetermined conditions, causes the coded radio control unit to respond to the zone code of the new zone in which the train wishes to enter, that is, if the zone in which the train is traveling was stored in the bank ZSB, it would cause the coded radio control unit to respond to the zone stored in zone storage bank ZSA. A slow release neutral zone storage receiver repeater relay ZSRP is provided for operating the relay ZSR at the proper time.

A code transmitting relay ZTR, which is a magnetic stick relay, is provided to determine the code that is being transmitted by the coding unit. When a train is traveling in a particular zone, this relay will cause the radio control unit to transmit the code for that zone. After the train has passed an identification point at which the zone code for the succeeding zone is received, the ZTR relay causes the radio control unit to transmit the code for this new zone. A zone transmitter repeater relay ZTRP, which is a slow release neutral relay, is provided for operating the ZTR relay at the proper time. A zone entering relay ZE, which is a neutral relay, is picked up each time the train enters a new zone. This relay ZE is provided to operate the ZTR relay at the proper time.

An output relay F is picked up momentarily by the radio control unit whenever the central control office transmits a command for the train to move in a forward direction. An output relay R is provided to be picked up momentarily in response to a command for the train to travel in a reverse direction. An output relay P is provided to be picked up momentarily in response to the reception of "proceed" command. An output relay ENZ is provided to be picked up momentarily in response to the reception of a command to "enter a new zone." The output relays F, R, P and ENZ are provided with repeater relays FPC, RPC, PCP, and ENZP respectively, which are picked up in response to the picking up of their respective output relays and held picked up by the repeated operation of their associated output relays. In addition these repeater relays are interlocked to provide for the proper sequence for entering a new zone. The output relays will only respond on a locomotive which is in the zone being addressed. Contacts of the repeater relays may be used to operate the locomotive control apparatus or the cab signal in any well known manner.

A relay ITC, which is a normally energized double wound relay is deenergized each time the train passes an inductor 11, and is reenergized when the repeater relays PCP and ENZP are both picked up. The relay ITC is provided to cause the relay ZSR to reverse its position and to cause the radio control unit to respond to the code transmission from the central control office addressed to a new zone.

Relays ZSFP and ZSBP, which are slow release neutral relays are provided in the pulse forming networks to clear respective zone storage relay banks ZSA and ZSB.

Referring to FIGS. 4A through 4F, circuits are shown for the train carried coded radio control unit, or in other words the receiving coding, decoding and logic apparatus which is provided to receive and store code impulses transmitted from the central control office which indicate the address of the zone and the zone command. This apparatus also determines whether the code which the control office transmitted is addressed to the zone in which the train is located. Moreover, it serves to pick up the proper output relay F, R, P or ENZ if the code which the control office transmitted is indeed addressed to the zone in which the train is located. If it is not, this unit is locked out for the remainder of a code transmission cycle. Furthermore, the radio control unit is provided to transmit to the central office the code of the zone which the train is in, or the zone which the train wishes to enter.

The coded radio control unit comprises a plurality of shift registers, PSR (FIG. 4E), CSR (FIG. 4F), and TRSR (FIG. 4B). The shift register PSR is the programming shift register which controls the sequence of operation of the unit, that is, to determine whether the shift register TRSR is to convert serial input to a parallel output or a parallel input to a serial output, and also to determine the times of transmitting and receiving of the unit with respect to its separate functions. The shift register CSR is provided as a counting shift register which counts the number of digits that are received by the code radio control unit to insure that a complete code cycle is received. The particular zone location code conditions the shift register TRSR at the beginning of a received cycle in accordance with the position of the zone storage relays ZSA or ZSB previously referred to.

A plurality of "and" gates AG and a plurality of "or" gates OG are provided to control the various operations of the unit in response to the reception or transmission of a code and in controlling the operation of the various shift registers. These gates, which are illustrated diagrammatically, may be of any conventional type. The "and" gates provide an energized output when a plurality of energized inputs are applied to the gate contemporaneously. The "or" gates provide an output when one or more inputs are singularly energized.

A plurality of flip-flop circuits, which may be of any conventional type are operated to one or the other of two conditions to provide a distinctive output upon the application of energy to its respective input. For simplicity of description, a flip-flop circuit is described as being operated to either its "zero" condition or its "one" condition upon the application of energy to its respective inputs.

The flip-flop circuit LRF (FIG. 4A) is operated to its "one" position in response to the reception of a low frequency from the radio receiver, and a flip-flop circuit HRF is operated to its "one" position in response to the reception of a high frequency by the radio receiver. The flip-flop circuits LRF and HRF are operated to their "zero" position in response to the reception of a center frequency by the radio receiver.

A flip-flop circuit LHF is operated to its "one" position in response to a low frequency followed by a high frequency that is received by the radio receiver; and a flip-flop circuit HLF is operated to its "one" position in response to the reception of a high frequency followed by a low frequency that is received. The circuits LHF and HLF are utilized at the start and at the end of a reception cycle to mark in a characteristic manner the beginning and end of a code cycle that is received from the control office and to condition the coded radio control unit accordingly.

A delay multivibrator DMV (FIG. 4A) is provided to be operated to produce a delayed output to the counting shift register CSR to shift the units of the register sequentially to their "one" position and to the TRSR for the same purpose. The delay multivibrator DMV is operated in response to each high or low frequency after the code cycle has been initiated.

A flip-flop circuit CF (FIG. 4F) is provided to mark the beginning of a cycle by being operated to its "zero" condition and marks a predetermined point in the received cycle by being operated to its "one" position at digit No. 10.

A flip-flop circuit RF (FIG. 4C) is the receiving flip-flop circuit and is operated to its "one" condition upon the reception of a low frequency that follows a high frequency at the beginning of a cycle of transmission and is used in conjunction with the output of the "or" gate OG1 (FIG. 4A) and the inputs of the "and" gate AG7 (FIG. 4B) to place the shift register TRSR in the proper condition of operation to start a cycle.

A flip-flop circuit DF (FIG. 4C), which is a decoding flip-flop circuit is operated to its "zero" condition at the start of a cycle and is operated to its "one" condition when the code for the particular radio control unit does not match the zone location code in which the train is located.

An oscillator OSC1 (FIG. 4E) is provided to determine the repetition rate and the length of the pulses in the transmission of a code from the radio control unit by controlling the times when all the shift registers operate. The flip-flop circuit OSCF (FIG. 4E) is provided to control the operation of the oscillator OSC1.

With reference to the drawings 4A through 4F and the sequence charts of FIGS. 11A through 11H, the operation of the radio control unit will be described in connection with the reception of a typical code from the control office for a train in zone 4. This code is always commenced by the reception of a center frequency, which is followed by a high frequency that is followed by a low frequency.

Upon the reception of the center frequency, which is continually being received when a code cycle is not being transmitted, the flip-flop circuits LRF and HRF are operated to their "zero" condition by the application of energy to wires 101 and 102 connected to the center terminal of the radio receiver.

Upon the reception of the first high frequency "and" gate AG2 and "and" gate AG5 are conditioned by the application of energy to wires 103 and 104. Also, the flip-flop circuit HRF is operated to its "one" condition by the application of energy to the wire 105. The output of the circuit HRF conditions the "and" gate AG4 over wire 106.

Upon the reception of the first low frequency the "and" gate AG1 is conditioned over wire 107 and the circuit LRF is operated to its "one" condition over wire 108. Also, the "and" gate AG4 is conditioned to produce an output at this time by the application of energy to its input over wire 108 connected to the wire 107. The output of the gate AG4 operates the HLF circuit to its "one" condition noting that the receiver has received a high followed by a low frequency.

Upon the operation of the circuit HLF to its "one" condition, the No. 1 unit of the shift register PSR is operated to its "one" condition over wire 110 and all the other units are operated to their "zero" condition. Also, all the units of the shift register CSR are shifted to their "zero" condition or reset by virtue of energy being applied to the wire 110, over wire 111 (FIG. 4E) through "or" gate OG12, over wire 112 to the input of the gate OG7 and wire 113, to the shift register CSR. Also, the flip-flop circuit CF is operated to its "zero" condition over the wire 112 (FIG. 4F), and the input wire 114. Also, the flip-flop circuit RF is operated to its "one" condition over wire 112 to the input wire 115. The flip-flop circuit DF is operated to its "zero" condition over the wire 112 (FIG. 4C) to the input 116. When the flip-flop circuit RF is put in its "one" condition, gate AG7 is conditioned for shifting the register TRSR on subsequent pulses. When the circuit DF is operated to its "zero" condition, the gate AG5 is conditioned so that the circuit will be responsive to successive pulses which are low frequencies followed by high frequencies. Wire 109 from the output of the circuit DF to the input of the gate AG5 is provided for this purpose.

Upon the conditioning of unit 1 of the shift register PSR to its "one" condition, the various units of the shift register TRSR are placed in a particular condition. The units 1, 7 and 8 are placed in their "zero" condition by the application of energy over wire 117 from unit 1 of the register PSR and the input wires 118, 120, and 121 respectively, that are connected to wire 117. The units 3, 4, 5 and 6 of the shift register TRSR are selectively placed in either their "zero" or "one" condition in accordance with the zone that the train is occupying.

Referring to FIG. 3B, when the unit 1 of the shift register PSR is placed in its "one" condition, energy is applied from unit 1 of PSR over wire 122 that is connected to wire 117, through front contact 123 of the relay ZSR (FIG. 3A), wire 124, and to wires 125, 126, 127, or 128 (FIGS. 3B and 4B) depending upon which of the contacts 130, 131, 132, or 133 of the zone storage relays ZSA are picked up. Assume, for example, that the train is in zone 4 which calls for the energization of relays ZSA1, ZSA3 and ZSA4. This in turn places units 3, 4 and 6 respectively in their "one" conditions. With the relay ZSA4 in its picked up position, for example, energy is applied through front contact 133 of the relay ZSA4, and the wire 125, to place the unit 3 of the shift register TRSR in its "one" condition. The units 4 and 6 are controlled to the "one" condition, and unit 5 remains in its "zero" condition. This is in accordance with the code for zone 4 as indicated in FIG. 11A of the sequence chart. If back contact 123 of the relay ZSR were closed to register that the zone location code is stored in the zone storage relays ZSB, the various units 3, 4, 5 and 6 of the shift register TRSR would be selectively energized through the back contact 123 over wire 134, and front contacts 135, 136, 137 or 138 of the relays ZSB1 through ZSB4 respectively. The application of energy to the wire 117 (FIGS. 4E and 4B), as previously stated, also causes the flip-flop circuit HLF (FIG. 4A) to return to its "zero" condition over wire 140. The coded radio control unit is now in condition to receive a code.

Upon the reception of the first center frequency which follows the first low frequency, the flip-flop circuits HRF and LRF go to "zero" as previously described. The shift register PSR is shifted to its next higher numbered unit so that the No. 2 unit is now in its "one" condition because the No. 1 unit of PSR was previously in its "one" condition.

The application of energy to the shifting bus 141 to cause the register PSR to shift occurs in the following manner. When the radio receiver receives the center frequency, energy is applied to wire 142 (FIG. 4A) and to the input 143 of gate AB6 (FIG. 4B). Since energy is already applied to input 144 of AG6 over the wire 117, an output over wire 145 is conducted through the "or" gate OG3 to the wire 141.

With the No. 2 unit of the shift register PSR now in its "one" condition, the "and" gates AG1 and AG2 (FIG. 4A) are gated to provide an output upon the reception of subsequent high and low frequencies by virtue of the energy that is applied to wire 146 at the output of unit 2 of the register PSR, which is conducted through the gate OG5, through wire 147, to inputs 148 and 150 of the gates AG1 and AG2 respectively. Also, the gate AG10 (FIG. 4C) is gated to conduct by the energizing of the wire 142 which applies energy over a wire 151 (FIG. 4F) to the input 152 (FIG. 4C) of the gate AG10. The other input 153 of the gate AG10 is also energized by the application of energy to a wire 154 which is connected to the output wire 146 of unit 2 of the shift register PSR.

Upon the reception of the next code pulse, which is a low frequency pulse, for example, the flip-flop circuit LRF is operated to its "one" condition over the previously described wire 108. The reception of this pulse causes the shift register TRSR to shift one step to the right as viewed in FIG. 4B. This transfers the condition of each lower numbered unit of the shift register TRSR to its next higher numbered or adjacent unit to the right, and also shifts the counting shift register CSR to its No. 1 unit. The shift register TRSR is shifted one unit by the application of energy from the output of gate AG1 over wire 156 to the "zero" shift wire input 157. The counting shift register CSR is caused at this time to move to its No. 1 position to count the first digit by the application of energy to wire 160 which is connected to the output of the delay multivibrator DMV which is energized through the gate OG1 by virtue of its input wire 161 being energized.

As previously mentioned the next reception is a center frequency which operates the flip-flop circuit LRF back to its "zero" condition. The next pulse which is received is a high frequency, for example, which operates the flip-flop circuit HRF to its "one" condition as previously described. This causes the register TRSR to shift one position to the right by the application of energy over wire 162 connected to the output of the gate AG2 to the "one" shift input 159 of register TRSR. Also, the shift register CSR is shifted to the No. 2 position by the application of energy over the previously mentioned wire 160. A center frequency follows the previous high frequency which marks the end of the second digit and operates the flip-flop circuit HRF to "zero."

Upon the reception of the next pulse, which is a high frequency, the circuit HRF is shifted to its one condition as previously described, the counting shift register CSR moves to its No. 3 position for counting the third digit received, and the shift register TRSR is shifted one position by the application of energy to the wire 162 at the output of the gate AG2 to energize the "one" wire 159.

A similar sequence of operation of the shift register TRSR occurs as each digit is received until the counting shift register CSR reaches its No. 7 position. Prior to and including that digit in the reception of the code cycle, if the condition of the No. 1 and the No. 8 unit of the shift register TRSR become in disagreement, that is, one of the units is in its "zero" condition and the other of the units is in its "one" condition, the apparatus for that particular train is locked out and will not be affected by any further reception of the code.

The zone in which the train is located as determined by the condition of the relays ZSA or ZSB, determines whether or not this shift register will cause the unit to be locked out on a certain digit. As long as the No. 1 unit and the No. 8 unit of the register TRSR are both in agreement, that is, when they are both in either their "zero" or "one" condition, energy is being applied to both input wires 169 and 169A of gate AG9 or both input wires 179 and 179A of gate AG8. This condition causes energy to be applied to wire 163 at the output of the "or" gate OG4 from the output of either AG8 or AG9 to maintain the input of the negative gate NG1 energized. This prevents an output from the gate NG1.

Assuming, for example, that the units 1 and 8 of the register TRSR come into disagreement at a certain digit, the decoding flip-flop circuit DF shifts to its "one" condition and the units of the shift register PSR are all shifted to their "zero" condition. The circuit DF is shifted to its "one" position by the removal of energy from the wire 163 to cause the gate NG1 to conduct. Thus, if the unit 1 of the shift register TRSR is in its "one" condition and the unit 8 is in its "zero" condition, energy is applied to input wire 164 of the gate AG10. Thus, AG10 now provides an output to the input wire 165 of the flip-flop circuit DF which shifts it to its "one" condition when the center frequency is received. The other input wires 152 and 153 of the gate AG10 are energized when the PSR shift register provides an output from wire 154 from its No. 2 unit and the center frequency terminal of the receiver energizes the wire 151. Upon the shifting of the circuit DF to its "one" condition, energy is applied over wire 166 to the input of the gate OG6 (FIG. 4E) which places the No. 2 unit of the shift register PSR to its "zero" position. When the No. 2 unit of the register PSR is placed in its "zero" condition energy is removed from the output wire 147 which prevents the gates AG1 and AG2 from conducting upon the reception of subsequent pulses which are lows followed by centers or highs followed by centers. Thus, no subsequent pulses in this cycle can affect the operation of the train having a unit which is locked out.

Assuming that the locomotive is in the zone to which the transmitted code is addressed, and is not locked out as previously described, upon the reception of the tenth digit, the counting shift register CSR moves to its No. 10 position which operates the flip-flop circuit CF to its "one" condition by the application of energy to wire 167. When the unit is not locked out and when the shift register CSR has its No. 7 unit in the "one" condition, with the register PSR, No. 2 unit in the one position the shift register PSR is shifted upon reception of the following center frequency so that No. 3 unit is now in the "one" condition by the energizing of wire 189 from the No. 7 unit of CSR the wire 142, and the wire 154' to the inputs of the gate AG11 which conducts through the "or" gate OG3 to energize wire 141.

On the center frequency following the tenth digit the counting shift register units all go to "zero" so that the register begins counting over again commencing with its No. 1 unit. On the eleventh digit, which in the present example is a low frequency pulse, the circuit LRF goes to 1, thereby causing the register TRSR to shift one unit and place its No. 1 unit in a zero condition. Also, the register CSR is shifted to place its No. 1 unit in its "one" condition by the energizing of wires 160 and 227. In the present example after the following center frequency, the next pulse is a low frequency which shifts the register TRSR and places its No. 1 unit in the "zero" condition. The counting shift register places its No. 1 unit in the "one" condition and shifts so that its No. 2 unit is also in the "one" condition.

The shift register TRSR and CSR continue shifting thereafter in response to each pulse, up to the fifteenth pulse in the cycle or until the counting register CSR reaches the No. 5 unit. From the eleventh to the fifteenth digit of the cycle the shift register TRSR is being shifted and its units actuated to their "one" or "zero" condition depending on the received code.

Upon the reception of the fifteenth pulse, which, in this example, is a high frequency pulse, the register CSR shifts to its No. five unit together with the shifting of the TRSR as previously described. When the counting shift register is in its No. 5 position and upon the reception of the following center frequency, the flip-flop circuit RF is operated to its "zero" condition, which cuts out, or in other words, prevents the further shifting of the shift register TRSR.

The circuit RF is operated to its "zero" condition by the gating of the gate AG13 (FIG. 4F), which is caused to energize input wire 171 to the circuit RF, by the energizing of wire 172 from unit 5 of the register CSR, wire 142 that is energized by the reception of a center frequency, and wire 172' from the output of the circuit CF, which was in its "one" condition. The shift register TRSR is cut out because energy is no longer provided on wire 173 at the output of the circuit RF, which heretofore conditioned the "and" gate AG7 so that it conducts to energize wire 228 (FIG. 4B) upon the reception of either a high or low frequency pulse.

At this point it should be recalled that the shift register TRSR, because of the reception of the previous code pulses as shown in the chart of FIGS. 11A and 11B is now in such a condition that its No. 1 unit is in the "1" condition, its No. 2 unit is in the "zero" condition, its No. 3 unit is in the "one" condition, its No. 4, 5, 6 and 7 units are in the "zero" condition and its No. 8 is in the "1" condition. The sixteenth pulse is always a low frequency pulse and the seventeenth pulse is a high frequency pulse without an intervening center frequency.

Upon the reception of the low frequency sixteenth pulse, and the counting shift register CSR shifts to its No. 6 unit, but the register TRSR does not shift because it was cut out as previously described. Upon the reception of the following high frequency pulse, the counting register shifts to its No. 7 unit, so that now there is energy on wire connected to this unit. Also, because these pulses comprised a low pulse followed by a high, the flip-flop circuit LHF is operated to its "one" condition.

Upon the reception of the next center frequency subsequent to the low followed by the high pulses, the program shift register shifts to its No. 4 unit, because the gate AG14 is caused to conduct, which energizes the shifting wire 141.

The gating of the gate AG14 is caused by the energization of the wire 175, which insures that the previous pulse was a low followed by a high; the energization of the wire 189, which insures that the register CSR is in its No. 7 unit, and therefore a connect count; the energization of a wire 191 which insures that the flip-flop circuit CF is in the proper condition; the energization of wire 142, which insures that a center frequency is being received; and the energization of a wire 193 that is energized while the unit No. 8 of the register CSR is in its "zero" condition, which insures that the center frequency occurred in the correct sequence.

Also, the energizing of the output wire 170 gates the "and" gates AG15, AG16, AG17 and AG18 (FIG. 4B), which have their respective input wires 194, 195, 196 and 197 energized because of their associated units of the register TRSR being in their "one" condition.

In the present example, the output relay F which controls the train to go, and the output relay P which directs the train to travel in the zone in which it is located are energized, because their units No. 3 and 8 of the register TRSR are in their "one" condition.

Thus, at this point, it is apparent that the coded radio control unit has received in serial form the command from the control office to proceed forward and this command is executed at the end of the cycle in parallel form by the energizing of the output relays F and P following the last digit in the reception portion of the cycle.

Upon the momentary picking up of the relays F and P, relays FPC and PCP (FIG. 3A), are energized in the zone storage and control apparatus and circuitry, the effect of which will be hereinafter described.

The coded radio control unit is now ready to transmit to the control office a code cycle which informs the control office of the zone location in which the train is traveling or in certain instances as hereinafter described the new zone location which the train wishes to enter. Control office apparatus stores this information to control its next command to the train as will hereinafter be described.

In commencing a transmission from the train to the control office, the output from the unit No. 4 of the shift register PSR applies energy to a wire 182 (FIG. 4D) which is connected to the wire 170 to operate the oscillator flip-flop circuit OSCF to its "one" condition, which causes the oscillator OSC to start and therefore operate to its "one" position as is evident from FIG. 4E. Wire 170 is connected to the input of gate OG8 which conducts to cause its output wire 200 to conduct, thereby causing the transmitter (FIG. 4C) to transmit a center frequency. Also, the application of energy from the wire 170 to the wire 182 conditions an output from the gate AG22 when energy on wire 216 connected to output wire 215 of the oscillator OSC becomes energized in response to the oscillator operating to its 1 state. The gate OG3 then conducts, which energizes the wire 141 for operating the register PSR to its No. 5 position.

When the shift register PSR is providing a "one" output from its No. 5 digit, the wire 177 is energized which provides an output at the gate OG9 to the input 178 of the shift register TRSR to operate all of its units to their "zero" condition. Wire 177 is also connected to the input of the gate OG8 to cause the wire 200 to remain energized to sustain the transmission of the center frequency when the register PSR is conducting from its No. 5 digit position. The oscillator OSC returns to its "zero" condition.

When the oscillator OSC goes to "zero," the shift register PSR shifts from its No. 5 digit position to provide an output at its No. 6 digit position. This is accomplished by the application of energy from the "zero" output wire of oscillator OSC through wire 183, the gate AG23, which is conditioned by the application of energy from the output of the unit 5 of the register PSR, and through the gate OG3 and the shifting wire 141.

The operation of the programming shift register PSR to provide an output at its No. 6 digit position causes the radio transmitter to transmit a low frequency pulse, and also causes the various units of the shift register TRSR to be conditioned to respective "one" and "zero" conditions. To transmit the low frequency pulse, the wire 185 is energized which is connected to the input of gate OG10 to energize wire 211 connected to the low frequency terminal of the transmitter. Simultaneously, by the application of energy to output wire 195 of unit 6 of the register PSR causes unit No. 1 of the shift register TRSR to go to its "1" condition through input wire 186; unit No. 2 to go to its "one" condition through input wire 187; and unit No. 8 to go to its No. "one" condition through input wire 188. The units No. 3, 4, 5, 6 and 7 of the register TRSR, are conditioned at this time to their "zero" or "one" conditions in accordance with the positions of the ZSA or ZSB relays (FIG. 3B). This is caused by the application of energy at the output of digit No. 6 of the programming shift register PSR to a wire 190, and through either the front or back contact 191 of the relay ZTR (FIG. 3A). Assuming that the zone location is stored in the bank of relays ZSA, the relay ZTR will have its front contact 191 closed which causes the energy that is applied to the wire 190 to be conducted through a wire 192 and the various front contacts of those relays ZSA which are closed for the particular zone location in which the train is located. If the zone storage location is stored in the bank ZSA, and assuming that the relay ZSA1, ZSA2 and ZSA3, are all energized to have their front contacts 193, 194 and 195 respectively in their closed position; and the relay ZSA4 is in a position so that its front contact 196 is open, energy will be applied to the wires 201, 202 and 203 to place the units 3, 4 and 5 of the shift register TRSR in their "one" conditions. Unit No. 6, because the relay ZSA4 is not operated will be in its "zero" position. Unit No. 7 remains in its "zero" position.

If back contact 191 of the relay ZTR was closed the energy from the wire 190 would be applied to a wire 205 for energizing the particular wires 201 through 204 through the front contacts 206, 207, 208 and 209 of the respective relays ZSB1 through ZSB4.

At this time, the output from the digit No. 6 of the shift register PSR also applies energy to a wire 212 which provides an input to the gate OG12 to produce an output over the wire 112 which places the flip-flop circuit CF in its "zero" condition, the flip-flop circuit DF in its "zero" condition, and the flip-flop circuit RF in its "one" condition by conducting energy to input wire 114 of circuit CF, wire 115 of circuit RF, and wire 116 of the flip-flop DF. Also, the shift register CSR is set so that all of its units or digits are in their "zero" condition through the input wire to OG7 which is connected to the wire 114, and therefore causes the output of the gate OG7 to be energized to energize the reset wire 113.

The oscillator OSC now goes to its "one" condition which causes the shift register PSR to shift to its No. 7 position by the application of energy on wire 215 at the output of the oscillator OSC and wire 216 which is connected to the input wire 217 of the gate AG26. Because the other input wire 218 to the gate AG26 has energy applied thereto over the output wire 185 of the unit No. 6 of the register PSR, the gate AG26 conducts from its output through the gate OG3 and the wire 141 to shift the register PSR. When the shift register PSR is in its No. 7 position, energy is applied at its output 222 and a wire 219 which is connected to the input of gate OG11, the output of which is connected to the high frequency terminal of the radio transmitter. This causes the radio transmitter to send a high frequency pulse.

The oscillator OSC now goes to "zero" which causes the shift register PSR to apply an output from its No. 8 unit. The register PSR is shifted from its No. 7 to its No. 8 position by the application of energy to the wire 255 which is connected to the input wire 221 of the gate AG27. Because energy is applied to output wire 222 of unit No. 7 of the register PSR, energy is conducted through the gate AG27 and the gate OG3 to apply energy to the shifting wire 141.

The coded radio control unit will now commence the transmission of a code to the control office characteristic of the zone location in which the train is traveling. The code which is to be transmitted is read into the register TRSR as previously described, and is read out in serial form.

The counting shift register CSR counts the subsequent digits. AND gate AG28 and the output wire 226 is connected to the gate OG1 to energize the wire 160 and the wire 227 that are connected to shift the register CSR, and to shift the TRSR through AG7.

The wire 160 is also connected to the input of gate AG7 so that each time the OSC goes to its "one" condition the gate AG7 conducts to energize shifting wire 228 of the register TRSR.

The gate AG28 controls the shifting of the register TRSR and the register CSR, which conducts each time the OSC goes to 1 and the register PSR is reading out of its No. 8 digit. Input wire 225 is connected to the "zero" output of the No. 7 unit of the register CSR, which cuts off transmission when unit No. 7 goes to its "one" condition.

Gates AG24 and AG25 are also conditioned by the application of energy from wire 223 at the output of unit No. 8 of the register PSR, which is connected to a common input wire 224. Wire 229 is connected to the output of oscillator OSC in its "one" condition which is connected at the input gates AG24 and AG25. The output of gate AG24 is connected through the gate OG10 as is evident in FIG. 4C to energize the wire 211 connected to the low frequency terminal of the transmitter. The output wire 231 of the gate AG25 is connected to the gate OG11 that is connected to the high frequency terminal of the transmitter.

The output of the register TRSR selects which gate, either AG24 or AG25, is to conduct and thus determines whether the code will be a high frequency or a low frequency. If unit No. 8 of TRSR is "one" gate AG25 conducts by the application of energy to wire 230. If unit No. 8 of TRSR is "zero" gate AG24 conducts by application of energy to wire 234.

In the present example, when the shift register TRSR is shifted, an output is provided from its No. 8 unit which is in the "one" condition, thus causing the transmission of a high frequency through the gate OG11 by the energizing of its wire 230.

The oscillator OSC then goes to its "zero" condition to transmit a center frequency. Because of the condition of the various units of the shift register TRSR, the next shifting of the register TRSR energizes the wire 230 to transmit another high frequency. On the next digit the TRSR shifts, and at this time energy is applied to the "zero" output wire 234 to cause energy to be conducted from the output of the gate AG24. The output wire 235 of the gate AG24 is connected through the gate OG10 to the wire 211 connected to the low frequency terminal of the radio transmitter. Thus, it is apparent that each operation or shifting of the oscillator OSC from its "zero" to its "one" condition causes the shift register TRSR to move one position to either apply energy to the high or low frequency terminal of the radio transmitter in accordance with the conditions which were read into the respective units of the register TRSR at the beginning of the cycle. This determines the code that is transmitted from the locomotive, and which code corresponds to the zone in which the locomotive is located.

When the counting shift register is in its No. 7 position, and the oscillator is providing a zero output, the program shift register PSR moves to its No. 9 unit to mark the beginning of the clear out of the cycle of transmission by the application of energy to the output wire 189 of the No. 7 unit of the counting shift register CSR.

With the program shift register in its No. 9 position a low frequency is transmitted by energizing the wire 211 from the output of the gate OG10 by the application of energy to the wire 250 which is connected to the input of the gate OG10. This also causes the program shift register to shift to its No. 10 position by the application of energy to the wire 251 which is connected to the input of the gate AG30. This produces an output from the gate AG30 to the gate OG3 to energize the shifting wire 141. Also, a high frequency is transmitted by the application of energy to the wire 231 and through the gate OG11 to mark the end of the cycle, which is a high frequency followed by a low.

At this point, the shift register TRSR units all go to their "zero" condition by the application of energy to the wire 252 connected to the unit 10 of the shift register PSR which energizes the "zero" set wire 178 through the gate OG9. When the oscillator goes to "zero" the flip-flop circuit OCF goes to "zero" because input wire 253 to the gate AG32 is connected to the wire 252 and input wire 254 to the gate AG32 is energized by the "zero" output wire 255 of the oscillator OSC.

The reception by the control office of this previously described cycle of operation of the locomotive carried radio control unit during its transmission cycle causes the apparatus in the central control office to store the zone location of the code which was received, and also conditions the apparatus to commence the scanner moving until it reaches the next occupied zone wherein it sends out a code that is received by the locomotive in that occupied zone, the radio control unit of which operates in a manner similar to the cycle herein described.

In the foregoing description of the operation of the coded radio control unit, it is apparent that the zone location of the train is stored into the shift register PRSR; and, if the received code does not correspond to the zone location, as evidenced by the condition of the register PRSR in the separate digits, the unit is locked out. If the received code corresponds to the zone location in the register PRSR, the output relays F, R, C, or ENZ of the zone storage and control apparatus on the locomotive are energized at the end of the reception portion of the cycle in accordance with the code received from the control office. Also, the apparatus is conditioned for the locomotive to control office transmission cycle, so that the train transmits the zone location that it is in or the next zone in the direction of travel of the train.

In describing the foregoing operation, reference was made to the effect on the system of the condition of the zone storage relays ZSA, ZSB (FIGS. 3A and 3B) with regard to the reception of the code at the zone location which is transmitted. Also, reference was made to the output relays previously mentioned and their selective operation in accordance with the code received by the addressed locomotive. With reference to FIGS. 3A and 3B, the system will now be described in connection with the effect of the reception and transmission of a code on the train carried apparatus illustrated therein.

Assuming that the train 12 is traveling in zone Z4 (FIG. 1), but has not yet reached the wayside identification device 10 for that zone, either the zone storage relays ZSA or ZBA are energized in the proper combination according to the identification code for the zone Z4. Assuming that this zone location is stored in the relay bank ZSA, the relays ZSA1 and ZSA3 are in their energized condition to indicate occupancy by the zone Z4. Front contacts of the relays ZSA1 and ZSA3 are closed without energy being applied to their respective winding because the relays ZSA and ZSB are magnetic stick relays which stay in their operated position after energy is removed.

The relays ZSA1 and ZSA3 are energized in response to the dropping away of the relays R1 and R3 when the coil 10L passes the wayside device 10 associated with the zone Z2 preceding the zone Z4. The circuit for picking up the relays ZSA1 extends from (+) and includes back contact 270 of the relay R1, wire 271, front contact 272 of the relay ZSC, front contact 273 of the relay ZSFP, the winding of the relay ZSA1, front contact 274 of the relays ZSC, and back contact 275 of the relays ZSBP, to (−). The circuit for picking up the relay ZSA3 extends from (+) and includes back contact 276 of the relay R3, wire 278, front contact 280 of the relay ZSC, front contact 281 of the relay ZSFP, the winding of the relay ZSA3, and the front contacts 274 of the relays ZSC and the back contact 275 of the relays ZSBP, to (−). The relays ZTR is picked up at this time so that its front contact 191 is closed.

When the train receives a message from the control office addressed to the train in zone Z4, as previously described, the coded radio control unit is prevented from being locked out by the completion of the circuit which includes the wire 122, the front contact 123 of the magnetic stick relay ZSR which is operated, the wire 124, and the front contacts 130 and 132 to energize the wires 128 and 126 respectively so that the shift register TRSR as previously described, is properly conditioned.

Assuming that the train in zone receives a command to proceed forward during the next portion of the code, the output or application relays F and P are energized, as previously described. In response to the picking up of the relay F, the relay FPC is picked up by the discharging of a capacitor 282 through the winding of the relay FPC, after the relay F has picked up and dropped away in response to this short pulse of energy. The circuit for charging the capacitor 282 upon the picking up of the relay F extends from (+) and includes front contact 283, resistor 284, front contact 285, and the capacitor 282 to (−). When the relay F drops away upon the termination of the pulse, the capacitor 282 is discharged through the back contact 285, through resistor 284, and through back contact 283 of the relays FPC. This relay was picked up in connection with the entering of the train into the zone Z4, as will be hereinafter described, and is held picked up in response to the momentary operation of the relay F. The discharging of capacitor 286 through the winding of the relay PCP maintains the relay picked up in the following manner. Upon the picking up of the relay P, the capacitor 286 is charged by a circuit which extends from (+) and includes front contact 288 of the relay FPC, back contact 290 of the relay RPC, front contact 291 of the relay PCP, front contact 292 of the relay 1TC, front contact 293 of the relay P, resistor 294, front contact 295 of the relay P, the capacitor 286, front contact 296 of the relay 1TC, front contact 298 of the relay PCP, back contact 300 of the relay RPC, and front contact 301 of the relay FPC to (−). When the relay P drops away upon the termination of the pulse, capacitor 286 is discharged through the winding of the relay PCP by connecting the (−) potential that is connected to the heel of the contact 301 through the front contact 298, front contact 296, through back contact 295, through resistor 294, back contact 293, through the winding of the relay PCP, and the capacitor 286 which was heretofore positively charged.

During the next portion of the cycle when the train transmits its zone location to the control office as previously described, the zone location code stored in relays ZSA is transmitted because the magnetic stick relays ZTR is picked up thereby causing its front contact 191 to be closed. This completes a circuit from the wire 190 through the front contact 191, the wire 192, and the front contacts 193 and 195 respectively of the relays ZSA1 and ZSA3 to energize the wire 203 and 201 connected to the shift register TRSR.

Each time the train is addressed while it is progressing in the zone Z4, and before it reaches the wayside identification coil 10 associated with that zone, the same sequence of operation occurs as previously described. When the train approaches the next zone and passes the wayside identification coil 10 and at the end of zone Z4, certain of the relays R1 through R4 are deenergized in a combination corresponding to the next zone, such as zone Z6 for example. Assuming that the relays R2 and R4 are deenergized for the zone Z6, the relays ZSB2 and ZSB4 are picked up to store the code for the new zone location in the storage bank that comprises the relays ZSB. The circuit for picking up the relay ZSB2 extends from (+) and includes back contact 310 of the relay R2, wire 311, back contact 312 of the relay ZSC, front contact 313 of the relay ZSBP, the winding of the relay ZSB2, back contact 314 of the relay ZSC, and back contact 315 of the relay ZSFP, to (−). The circuits for picking up the relay ZSB4 extends from (+) and includes back contact 316 of the relay R4, wire 317, back contact 318 of the relay ZSC, front contact 320 of the relay ZSBP, the winding of the relay ZSB4, back contact 314 of the relay ZSC, and the back contact 315 of the relay ZSFP, to (−).

Upon the picking up of the relays ZSB2 and ZSB4, the zone entering relay ZE is energized by a circuit which extends from (+) and includes back contact 322 of the relay ZSC, either front contact 323 or front contact 324 of the relays ZSB4 and ZSB2 respectively, wire 325, and the winding of the relay ZE, to (−). Upon the picking up of the relay ZE, the relay ZTR is knocked down by a circuit which extends from (+) and includes front contact 326 of the relay ZE, back contact 327 of the relay ZTRP, the winding of the relay ZTR, and back contact 328 of the relay ZTRP, to (−).

The knocking down of the relay ZTR causes its contact 191 to change from front to back, which completes a circuit from the coded radio control unit over the wire 190 through the back contact 191 of the relay ZTR, the wire 205, and the front contact 207 and 209 of the relay ZSB2 and ZSB4 that are connected to the wire 201 and 204 respectively leading to the coded radio control unit.

At this point, the train is still being addressed through the storage bank comprising the ZSA relays through the front contact 130 and 132 of the relay ZSA1 and ZSA3, but during that portion of the code cycle as previously described where the train transmits its zone location back to the control office, the zone location that is transmitted is that which is stored in the bank of relays comprising the relays ZSB2 and ZSB4 because of the back contact 191 of the relays ZTR being closed.

The reception of the new zone code which is different from that to which the train was addressed when received by the control office is indicative of a request by the train for permission to enter the new zone, that is zone Z6. The train will continue to receive a code from the control office addressed to the zone Z4 and transmit the new zone code addressed to the zone Z6 each time the control office scanner causes the control office to transmit the code for that zone as will be described hereinafter.

Assuming that the conditions are such, as determined by the control office interlocking as will be hereinafter described, so that if authority for the train to enter the new zone Z6 is not given, but the train continues to proceed in zone Z4 without stopping, when the train passes the inductive coil 11, the relay ITC is caused to drop away by an obvious circuit. The dropping away of the relay ITC causes its front contact 292 to open which results in the dropping away of the relay PCP even though the train may be receiving a proceed command. On the dropping away of the relay PCP, the relay ZSCO is energized by a circuit which extends from (+) and includes back contact 330 of the relay PCP, back contact 332 of the relay ZSC, and the winding of the relays ZSCO, to (−). Unless the relay PCP is picked up again by the picking up of the relay ENZP as hereinafter described, the train will automatically be brought to a stop by the intermittent train control apparatus.

Assuming that after the train transmits the new zone code that was previously described, the traffic conditions are such that the control office sends a code to the train to enter the new zone, in this example, zone Z6, the relay ENZ is coded which causes capacitor 335 to discharge through the coil of the relay ENZP by a circuit which extends from (+) and includes front contact 288 of the relay FPC, back contact 290 of the relay RPC, front contact 336 of the relay ITC, front contact 337 of the relay ENZ, resistor 338, front contact 340 of the relay ENZ, the capacitor 335, front contact 312 of the relay ITC, the back contact 298 of the relay PCP, the back contact 300 of the relay RPC, and the front contact 301 of the relay FPC, to (−).

After the picking up of the relay ENZP, the relay ITC is dropped away by inductive coupling with the coil 11L. The relay ZSR is knocked down by a circuit which extends from (+) and includes front contact 345 of the relay ENZP, back contact 346 of the relay ITC, front contact 347 of the relay ZSR, the winding of the relays ZSR, and front contact 348 of the relay ZSRP, to (−).

Upon the knocking down of the relay ZSR, the train will no longer respond to a code addressed to zone ZS4; in this example, that code stored in the bank of relays ZSA, but will respond only to the code stored in the bank of relays ZSB or the zone Z6. This is evident from the circuit that includes the wire 122, the back contact 123 of the relay ZSR, and the contacts 135 and 137 of the relays ZSB2 and ZSB4 respectively.

So if the train receives a proceed control for the zone Z6, the relay P and consequently its repeater relay PCP is again energized. The relay PCP is picked up by virtue of front contact 356 of the relay ENZP being closed and the back contact 292 of the relay ITC being closed.

Upon the picking up of the relay PCP, the relay ZSC is picked up by a circuit which extends from (+) and includes the front contact 330 of the relay PCP, wire 352, back contact 353 of the relay ZSCO, the winding of relay ZSC, back contact 354 of the relay ZSCO, to (−).

When the relay ZSC picks up, the zone location stored in the zone storage relay ZSA is cancelled by knocking down those relays which were previously in their picked up position. The circuit for cancelling this zone location, in this example, zone location Z4 extends from (+) and includes the front contact 275 of the relay ZSBP, front contact 274 of the relay ZSC, the windings of the relay ZSA that are picked up, the back contact 273 and 281 of the relay ZSFP, front contact 355 of the relay ZSBP, and front contact 356 of the relay ZSB, to (−).

The slow up drop away relay ZSBP is then caused to drop away by the opening of back contact 357 of the relay ZSC in its obvious energizing circuit. Upon the dropping away of the relay ZSBP, the relay ZSFP is energized by a circuit which extends from (+) and includes front contact 357 of the relay ZSC, back contact 358 of the relay ZSBP, and the winding of the relays ZSFP, to (−). This conditions the apparatus so that the next zone location which is read into the train and stored therein will be stored in the bank of relays ZSA.

When the relay PCP picks up, the relay ITC is restored to its picked up position by a circuit which extends from (+) and includes front contact 360 of the relay ENZP, front contact 362 of the relay PCP, and the lower winding of the relay ITC, to (−).

The picking up of the relay ZCS also causes the relay ZE to be deenergized by the opening of the back contact 322 of the relay ZSC.

At this time, the train is receiving its command through the zone location stored in the bank of relays ZSB because the relay ZSR is in its dropped away position, and it is also transmitting its zone location through this same bank of relays ZSB because the relays ZTR is dropped away.

Thus, under normal operation, before a train reaches the end of the zone in which it is traveling, it is receiving a proceed control from the control office and then transmitting to the control office the same zone in which it is located. When it reaches the end of the zone and passes the wayside identification transmitter located at the end, the code for the succeeding zone is fed into the storage bank which causes the train to transmit to the control office during a portion of the cycle, the code for the new zone in which it wishes to enter. When the train begins transmitting the code of the new zone, the PCP relay drops away and the ENZP picks up. This relay ENZP stays picked up until the train passes over the intermittent inductive device 11L which causes the relay ITC to drop out. In response to the dropping out of the ITC relay, the ZSR relay changes its position which causes the coded radio control unit to respond to the code transmission from the central office addressed to the new zone only. When a proceed command is then received by the train, the relay PCP picks up which causes the relay ITC to reset. Thus, unless this sequence is completed each time the train enters a new zone, the train will stop. For example, if the relay ENZP is not picked up properly, the relay PCP cannot thereafter be picked up once it has dropped away and the train stops. Also, if the relay ITC does not drop away, the relay PCP cannot pick up even though the relay ENZP picks up, and the train stops. Moreover, if the relay ITC is not in its picked up position when the train receives the command enter new zone, the relay ENZP cannot pick up. The contacts of the relays PCP and ENZP are connected in the motor control circuit so that the train will stop unless one or the other is energized. The relay F and its repeater FPC operate in conjunction with the relay PCP for extra protection. The relay R is used to change the direction of movement.

Control office apparatus

With reference to FIGS. 6A and 6B, the control office has a receiver 400 for receiving the coded pulses from the train, and a transmitter 401 for transmitting coded pulses to the train. The pulses received by the receiver 400 control the control office coding and decoding unit, and this unit determines the code pulses which are transmitted over the transmitter 401. A logic matrix comprised of a plurality of diodes determine the code to be transmitted and the effect on the control office apparatus of the code received. The zone units, which are illustrated in block diagram in FIGS. 6A and 6B, and referred to at U1, U2, U4, U6, U8 and U9 condition the control office coding and decoding apparatus through the diode matrix and are conditioned by the control office coding and decoding unit during the transmission and reception of pulses. The zone units U, one of which is provided for each zone in the system are also controlled in accordance with the conventional principles of railroad interlocking circuitry and in accordance with the manual control of the system to provide for safe operation of the trains.

FIG. 7 illustrates schematically a zone unit, such as the zone unit U4 for the zone Z4 for example. The other zone units U2, U6, U8, etc., are similar with the exception of the contacts of the various zone relays ZOR which are included in accordance with the requirements of practice. Each zone unit is comprised of a plurality of zone occupancy relays ZOR. In this system there is a zone occupancy relay ZOR for each zone in the territory. Relay 1ZOR is provided for zone Z1, relay 4ZOR is provided for zone Z4 and so on for all of the zones in the system. The relays ZOR are magnetic stick relays which are energized in accordance with a condition of occupancy of a particular zone and are deenergized when a train has passed through the zone and is located a safe distance therefrom in accordance with the requirements of practice, such as two zones, for example.

Each zone unit is also comprised of a plurality of flip-flop circuits which are capable of being put in their "one"

condition or their "zero" condition. The flip-flop circuit PFF is placed in its "one" condition when a train in its respective zone is authorized to proceed in that zone. A flip-flop circuit RFF is put in its "one" condition when a train in its respective zone is authorized to reverse its direction of travel. A flip-flop circuit SFF is put in its "one" condition when the control office requires a train in its respective zone to stop. A flip-flop circuit ENZFF is placed in its "one" condition when the train in that particular zone associated with the flip-flop circuit is authorized to enter a new zone. It is understood that other flip-flop circuits could be added for commanding a train in other respects such as idling and inching, etc.

These flip-flop circuits in each zone are controlled by a plurality of AND gates, and their output is also controlled by a plurality of AND gates. These gates are controlled by the coded radio control unit in the control office, and the output from the flip-flop circuits, as controlled by other AND gates condition the control office coding and decoding unit.

Each zone unit is also comprised of a plurality of traffic governing relay contacts, and are included therein so that unsafe authorization and control cannot be transmitted to a train approaching the zone associated with a particular zone unit. These relays are referred to at F, at LAS, and at RAS. The numerical prefix associated with each of these referenced relays corresponds to the zone or the signal by which they are governed in accordance with standard railway practice. Components EPS and WPS are conventional pulse stretchers to insure that the zone relay for the next zone in the direction of travel of the train is properly energized. A more detailed description of the circuitry of the zone unit U4 will be given in connection with a description of the operation of the system, and such description and the drawings will give a full understanding of the other zone units employed in the system.

Referring to FIGS. 8A through 8F, the control office coding and decoding unit is comprised of an oscillator, a plurality of shift registers, flip-flop circuits, AND gates, OR gates, and NOR gates. The control office coding unit is also comprised of a scanner 403 (FIG. 8F) which controls the initiation of a transmission to a train, and which is controlled by the zone units U and the coded radio control unit. The scanner is operative to start the system after a complete transmission and reception cycle, and to stop the system when it is determined that a train is approaching or occupies a particular zone. Thus, the scanner will stop on a zone terminal associated with a zone that is occupied, and after a communication cycle is completed, will scan until it senses another occupied zone in turn to commence another complete cycle for a train in that particular zone. Thus, the system continuously addresses the trains in the system in turn regardless of their position in each zone and whether or not the trains encounter any new conditions. The frequency of addressing each zone in turn is determined by the number of occupied zones in the territory.

A shift register PSR-0 is provided to program the information and its sequence of transmission so that the information will be transmitted and received in the proper order. A counting shift register CSR-0 is provided to count the number of digits in each cycle to insure that the correct number has been properly received and transmitted. Shift registers TRSR-01 and TRSR-02 are provided to convert serial input to parallel output and parallel input to serial output. The shift registers TRSR-01 and TRSR-02 as governed by a respective zone unit and its condition determine the code to be transmitted. It also determines the effect that a received code will have on the subsequent command to the train.

The different transmission codes are formed by combinations of a high frequency and a low frequency shifting of a center carrier modulation frequency. The carrier modulation frequency at the control office is identical to the carrier modulation frequencies able to be received and transmitted by the transmitters and receivers on each of the trains.

Whenever the control office is not transmitting a code, a steady center frequency is transmitted. The control office transmission code is comprised of a pulse train that can be considered in four parts. The first part indicates the beginning of transmission, which is a high frequency followed by a low frequency that is followed by a center frequency, which in effect clears out the train carried radio control unit. The second part of the transmission denotes the zone that is being addressed. This consists of high frequencies followed by centers and low frequencies followed by center frequencies. By the end of this second part of the transmission code, all the trains except that in the zone addressed are locked out and are unable to receive a command in the manner previously described in connection with the train carried equipment. The third part represents the command to the train in the zone addressed. It is comprised of high frequencies followed by center frequencies and low frequencies followed by center frequencies. The number of pulses in this portion of the transmission code is determined by the number of commands that may be transmitted to trains in the system. The fourth part of the transmission code denotes the end of transmission and consists of a low frequency followed by a high frequency that is followed by a center frequency.

At the end of this four part transmission code the train in the zone addressed begins a train to control office transmission, as previously described in the description of the train carried equipment. The code which is received at the control office is comprised of a pulse train which may be considered as having three parts. The first part announces the beginning of the transmission to the control office and consists of a center frequency followed by a low frequency that is followed by a high frequency, which is followed by another center frequency. The second part of the code received at the control office is characteristic of the zone number of the zone in which the train is located that is transmitting to the control office, or is characteristic of the zone that the train wishes to enter if the train transmitting the code wishes to enter a new zone. The reception of the information, when it is the same as the zone in which the train is located, is considered to be a request by the train to proceed in the same zone. This second part of the pulse train consists of a series of high frequencies followed by center frequencies and low frequencies followed by center frequencies. The number of pulses in this series is determined by the number of zones in the system. The third part of the pulse train received by the control office marks the end of transmission by the train and consists of a high frequency followed by a low frequency followed by a center frequency.

A complete description of the control office coding and decoding unit, the zone units, and the logic matrix will be given in connection with a typical transmission and reception cycle according to the sequence charts of FIGS. 11A to 11H wth the zone Z4 occupied. When the scanner 403 completes a code cycle for a previous zone that is occupied it scans successive ones of the contacts CU1 through CU9. When it reaches the terminal CU4, a circuit is completed for stopping the scanner 403 and starting the beginning of a transmission code. This circuit extends from the terminal CU4 (FIG. 7) and includes front contact 405 of the relay 4ZOR, diode 406, wire 407, AND gate AG408 (FIG. 8F), and the stop control flip-flop circuit SCF which causes it to be placed in its "zero" condition. With output wire 410 of the circuit SCF energized, the scanner 403 is stopped. Input wire 411 to the gate AG408 is included to insure that the coding and decoding unit is in the proper condition to being the transmission of a code to the train.

The application of energy to the terminal CU4 (FIG. 7) also causes energy to be applied through a diode 412 to a wire 413 to condition an AND gate AG414 (FIG. 6A) which controls, by way of the logic matrix, the energy on wires 422 through 426 which are connected to respective units 10 to 14 of the shift register TRSR-02 (FIG. 8E). When energy is applied to these wires, as controlled by the diode matrix, their associated unit of the shift register TRSR-02 is placed in its "one" condition.

Also, a wire 428 or 430 (FIG. 7) is energized depending upon the condition of the directional stick relays 25RAS or 27LAS, which are indicative of the direction of train movement, to condition an AND gate 432 or 433 (FIG. 6A). The conditioning of the AND gate 432 or 433 prepares the diode matrix (FIG. 6A) to energize, according to a particular combination, the wires 440 through 444 connected to units 2 through 6 respectively of the shift register TRSR-01 (FIG. 8B). This portion of the shift register is prepared by the code in accordance with the direction of travel of the train during the reception portion of the cycle. However, at this time in the cycle terminals 440 to 444 are not energized by the zone unit.

The application of energy to terminal CU4 applies energy to input wire 409 (FIG. 7) which conditions the gates AG419A through AG419D to conduct at the proper time during the cycle if its associated flip-flop circuit PFF, RFF, SFF, or ENZFF is in its "one" condition. Also, the application of energy to the terminal CU4 conditions gate AG439 (FIG. 7), gate AG450 and gate AG452 for operating the flip-flop circuits PFF, RFF, and ENZFF to their "zero" condition at the proper time during the transmission cycle and after the command has been transmitted. Also, energy from the terminal CU4 by way of the gate AG439 is used to operate either the pulse stretcher 4WPS or pulse stretcher 4EPS for picking up the zone relay associated with the succeeding zone at the proper time, during the cycle, as will hereinafter be described. Thus, in this example, energy is applied to terminal CU4 during this whole control office transmission and reception cycle so that the system will be governed by the unit U4 for the zone Z4 only.

Figure 8A:
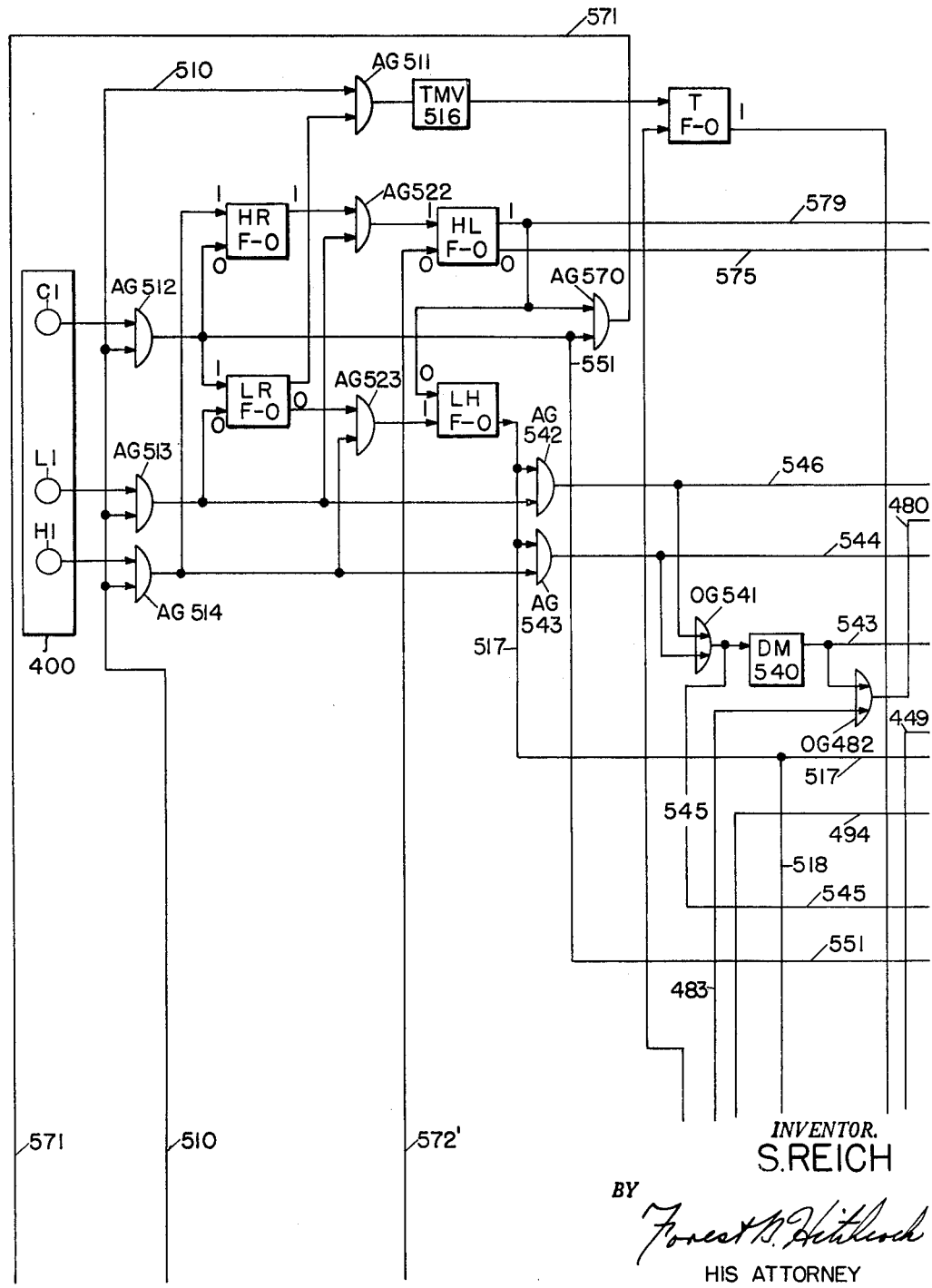
Figure 8C:
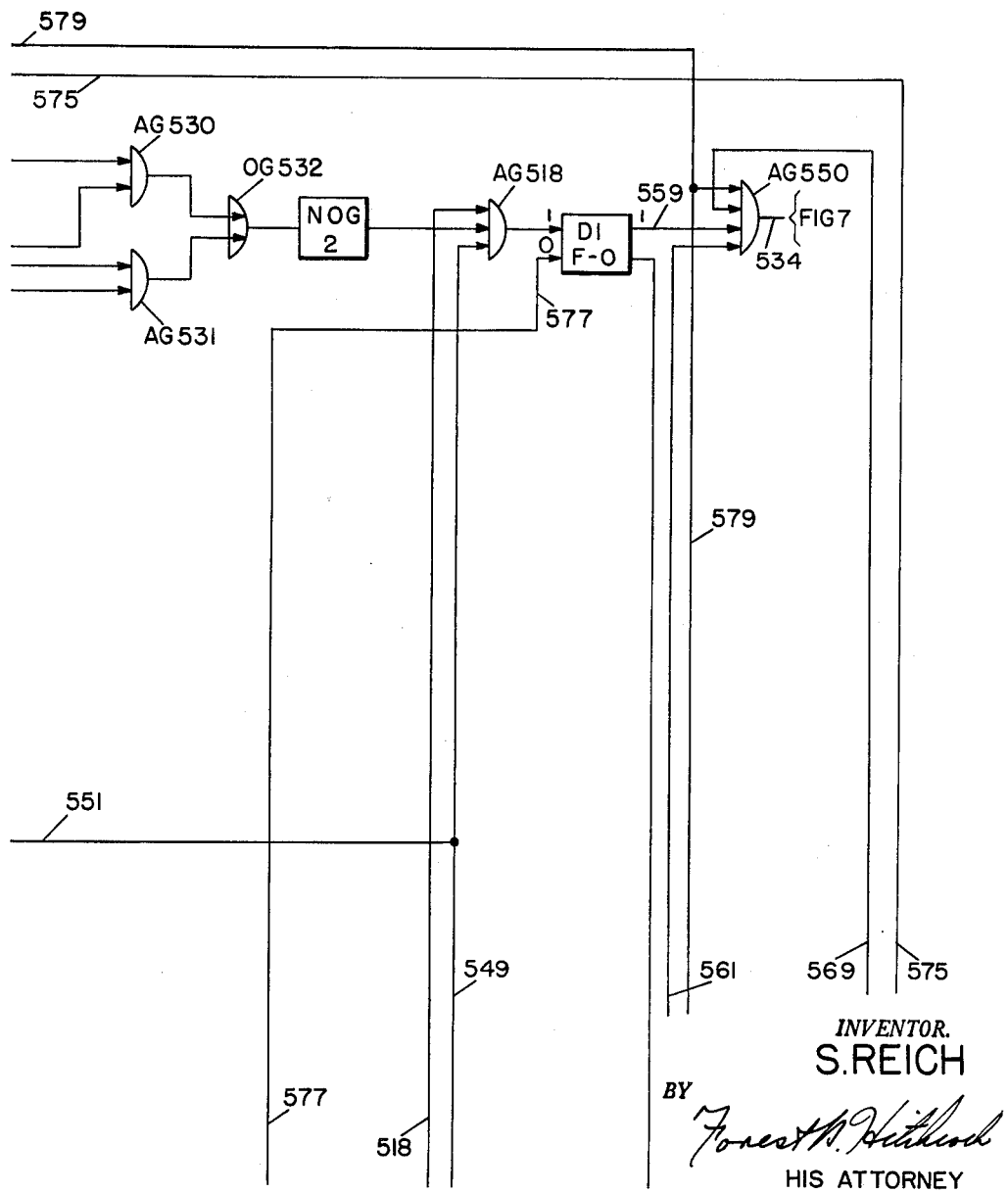
Figure 8D:
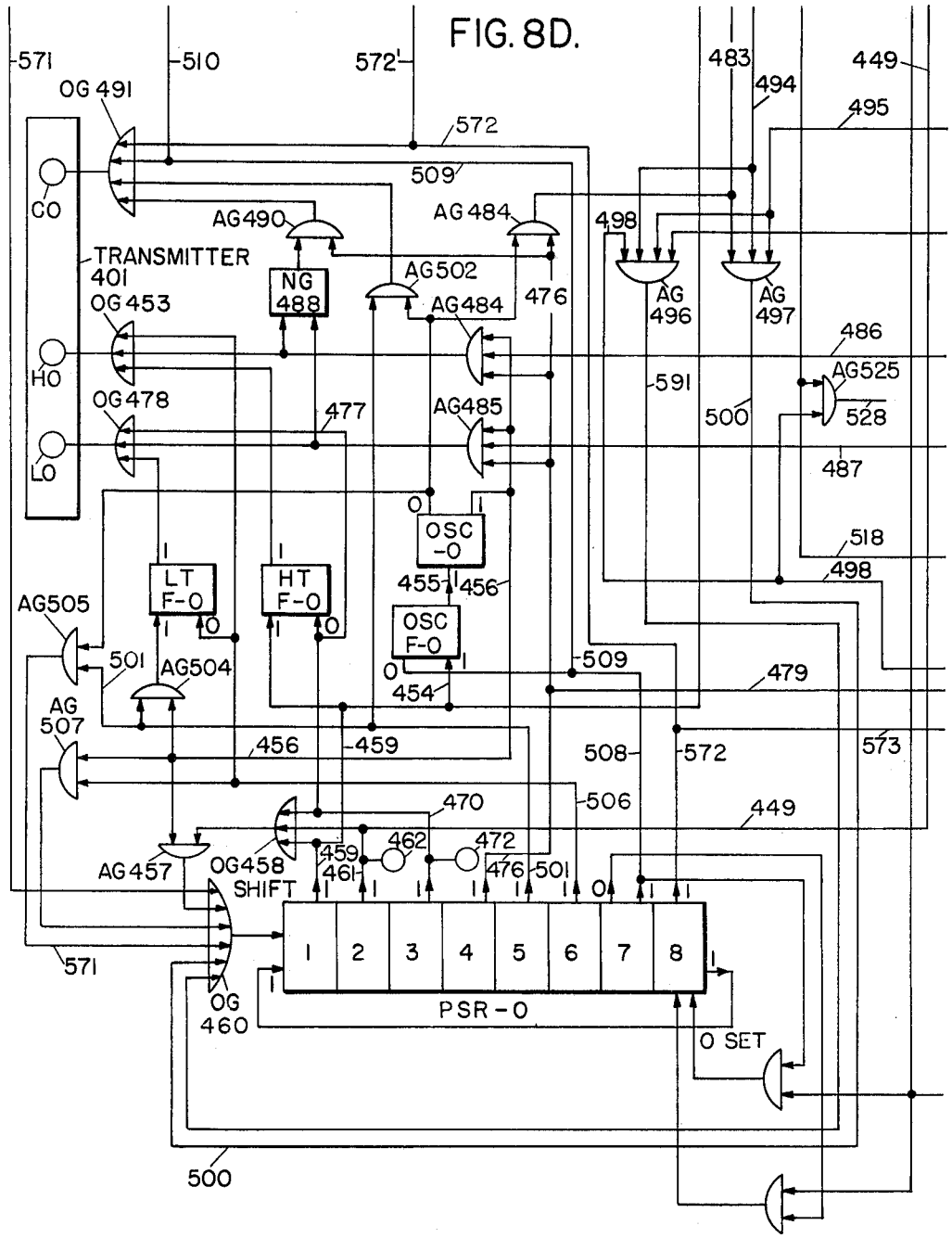

With reference to FIGS. 8A–8F and FIGS. 11A to 11H, the shift register PSR-0 (FIG. 8D) first shifts so that its unit No. 1 is put in its "one" condition to start the first part of the transmission cycle. In response to the output on wire 459 from the No. 1 unit of the register PSR-0, the flip-flop circuit HTF-0 shifts to its number "one" condition which causes the transmitter 401 to transmit a high frequency by being energized through gate OG453. The oscillator control flip-flop circuit OSCF-0 goes to its number "one" condition because of energy being applied to wire 454 that is connected to wire 459. The oscillator OSC-0 in response thereto is turned on because of energy being applied to input wire 455 (FIG. 8D). An output then appears on wire 456 from the oscillator OSC-0 to cause gate AG457 to conduct, which gate had previously been conditioned by the output from unit 1 of the register PSR-0 through gate OG458. The conducting of the gate AG457 causes energy to flow through gate OG460 to shift the register PSR-0 one unit or digit so that unit No. 2 of the register PSR-0 is now providing energy to its output wire 461. This causes the command and the zone to be addressed to be read into the shift register TRSR-01 and TRSR-02 respectively at this time in the following manner. The application of energy to the wire 461 applies output energy to terminal 462 (FIG. 8D) and causes the AND gate AG414 (FIG. 6A) to conduct, to energize through the diode matrix (FIG. 6A) a certain combination of the wires 422 through 426 which places the units 10 to 14 of the register TRSR-02 connected to wires 422 to 426 that are energized, in a "one" condition. Also, energy is applied to the AND gates 463 (FIG. 6A) through 469, and those flip-flop circuits PFF, RFF, ENZFF, etc. (FIG. 7), which are in their "one" condition to cause their respective gates AG419A–AG419D (FIG. 7) to conduct, now completes the conduction of respective gates AG463 to AG469. Thus, in the present example, the circuit PFF is in its "one" condition noting that the "proceed" command was stored in zone unit U4 which causes the gate AG419A to conduct and thus the gate AG463 over a wire 463'. Thus wire 441 is energized so that the No. 3 unit of the register TRSR-01 is operated to its "one" condition. The zone Z4 and the command "proceed in the same zone" are now ready to be transmitted.

The energy on wire 461 at the output from the No. 2 unit of the shift register PSR-0 also places unit No. 1 of the register TRSR-01 (FIG. 8B) in its "one" condition by the application of energy to wire 449 and gate OG449 to condition the apparatus for proper transmission.

The oscillator OSC-0 then goes to "zero" and then oscillates back to its "one" condition which shifts the register PSR-0 one unit to provide an output on wire 470 from its No. 3 unit. The application of energy to the wire 470 and a terminal 472 causes the AND gate AG452 (FIG. 7), which had previously been conditioned, to apply energy to input wires 473, 474 and 475 of the flip-flop circuits PFF, RFF and ENZFF to operate them all to "zero" if they were not already in that condition, thus cancelling out any type of a motion command from the zone unit U4. The high frequency transmission flip-flop HTF-0 is now shut off because of energy on the wire 470 being connected thereto thus causing the transmission of the high frequency to cease. The transmitter 401 begins transmitting a low frequency while output is being applied to the wire 470 (FIG. 8D); wire 477 and the gate OG478. The oscillator OSC-0 then goes to "zero" and back to its "one" condition which causes the register PSR-0 to shift so that its No. 4 digit provides an output at wire 476. This is caused by energy being applied simultaneously to the gate AG457 by wire 456 and the wire 470 through the gate OG458.

When the oscillator OSC-0 next goes to "zero," the shift registers TRSR-01 and TRSR-02 now shift one position so that the condition of digit 2 is in the same condition as the previous condition of digit 1 and so on through unit 16. The output from the digit No. 8 of the shift register TRSR-01 is transferred to register TRSR-02 by the application of energy to wire 479 which conditions gates AG479 and 481 so that they will transfer the condition of unit No. 8 over either wire 489 or 491 upon the shifting of the units of the registers. Thus, the lowest filled digit of the shift register TRSR-01 is now the digit 2. The shift registers TRSR-01 and TRSR-02 were shifted by application of energy to wire 480 (FIG. 8B) by way of gate OG482 (FIG. 8A), wire 483, and the output of gate AG484 (FIG. 8D) which was conditioned to conduct by the application of energy to the output wire 476 and the output from the oscillator OSC-0 when it is in its "zero" condition. With the oscillator OSC-0 at "zero" position, the center frequency is transmitted by the conduction of gate AG490 which occurs when the gate NG488 is conducting in the absence of either a high or low frequency transmission. This marks the end of the first part of the transmission code; the control office unit is now ready to commence the transmission of first the address and then the command, and the coding and decoding units that are carried on each of the trains are cleared for further reception.

At the beginning of the next part of the transmission cycle, the oscillator OSC-0 goes to its "one" position and the code frequency transmitted is either a high or a low depending upon the condition of the unit 16 of the shift register TRSR-02 (FIG. 8E). With energy being applied to the wire 476 from the unit No. 4 of the register PSR-0 to condition gate AG484 and gate AG485 (FIG. 8D), and the gates AG484 and AG485 being further conditioned by the output of the oscillator OSC-0 in its "one" condition, one or the other of these gates AG484 or AG485 are caused to conduct by the application of energy to either wire 486 or 487 respectively from the digit 16 of the shift register TRSR–02. Assuming that this first frequency in the second part is to be a low frequency, the gate AG484 conducts to energize the low terminal by way of gate OG478. The oscillator then swings back to its "zero" position which causes the transmission of a center frequency when there is no output from the gates AG484 and AG485 because the gate NG488 in this event completes the conditioning of a gate AG490 to apply energy at its output to the center frequency terminal through gate OG491. This also causes the shift registers TRSR–01 and TRSR–02 to shift one more unit, which causes either the wire 486 or 487 (FIGS. 8D and 8E) to be energized in accordance with the code to be transmitted to transmit either a high or a low frequency. This sequence continues wherein the oscillator OSC–0 oscillates from its "zero" to its "one" condition and back again, with the frequency that is transmitted being determined by the condition of the unit 16 of the register TRSR–02 after each shifting of the registers TRSR–01 and TRSR–02 until all the information has been transferred from the shift registers TRSR–01 and TRSR–02 in sequence.

During the transmission from the office as it has been described, which may be considered the second part of an office transmission cycle, the various combinations of lows followed by centers and highs followed by centers represented the zone addressed and after the information had been read out of the units 10 through 14 of the shift register TRSR–02, in succession, all of the trains were locked out, or in other words, prevented from receiving any further information with the exception of the train in the particular zone addressed which in this example is zone Z4. The series of frequencies which corresponds to the information initially stored in the units 2 through 6 of the shift register TRSR–01 represented the command to be given to the train in the zone Z4, and may be considered the third part of the transmission cycle. When this information has been read out, the transmission cycle has reached the end of its third portion and is now conditioned to begin its fourth or final portion which merely marks the end of the transmission code.

When all of the foregoing information has been read out of the shift registers TRSR–01 and TRSR–02, gates AG492 (FIG. 8B) and AG493 (FIG. 8E) associated with the registers TRSR–01 and TRSR–02 respectively, are caused to conduct to apply energy to their output wires 494 and 495, respectively. This applies energy to gates AG496 and 497 (FIG. 8D). The gate AG497 then conducts causing the shift register PSR–0 to shift from its No. 4 unit to its No. 5 unit because of energy being applied by way of wire 500 through shift gate OG460. Thus the output wire 501 of digit No. 5 is now energized to cause gate AG505 to conduct when the oscillator OSC–0 goes to its "zero" position to transmit a center frequency.

When the oscillator OSC–0 oscillates to "one," the low transmission flip-flop circuit LTF–0 is changed to its "one" condition because of the conduction through gate AG504 to transmit a low frequency. This gate is caused to conduct because of energy also being applied to the wire 501 from unit 5 of the register PSR–0 and energy being applied to the wire 456 connected to the "one" terminal of the oscillator OSC–0. When the oscillator next goes to "zero" gate AG505 is caused to conduct to shift the register PSR–0 one unit. The register PSR–0 is now providing energy on wire 506 that is connected to its No. 6 unit. This causes a high frequency to be transmitted to by way of the gate OG453 and also shuts off the flip-flop circuit LTF–0 to stop the low frequency transmission. When the oscillator OSC–0 goes to its "one" condition, the gate AG507 is caused to conduct because of energy being applied to wire 506 that is connected to the No. 6 unit of PSR–0 and the wire 456 that is connected to the "one" terminal of the oscillator OSC–0. This shifts the register PSR–0 one unit to provide an output at No. 7 unit of the register PSR–0. The oscillator OSC–0 then goes to "zero" and the oscillator flip-flop circuit OSCF–0 is turned off to shut off the oscillator OSC–0 by the application of energy to wire 508 from unit No. 7 of the shift register PSR–0. A center frequency is now being transmitted by the application of energy to wire 509 that is connected to wire 508 at the output of the No. 7 unit of the register PSR–0. The application of energy to wire 509 also applies energy to wire 510 (FIG. 8A) for conditioning the gates AG512, AG513, and AG514 for reception. The control office has now completed its transmission portion of the cycle and in so doing has addressed a particular zone and given a command to a train in that zone. The control office apparatus is now conditioned to receive a series of pulses from the train in the zone which was previously addressed. It will continue to transmit a center frequency until the beginning of the next control office to train transmission.

At the beginning of the reception portion of this cycle, the control office receives a low frequency followed by a high frequency that is followed by a center frequency, which conditions the control office coding and decoding equipment for receiving a code which corresponds to the zone in which the train sending the code is travelling, or corresponds to the zone which the train wishes to enter, which is the next zone in the direction of travel of the train.

The first low frequency pulse of the cycle causes the flip-flop circuit LRF–0 (FIG. 8A) to be operated to its "zero" position in response to the application of energy from the output of gate AG513. The reception of the next high frequency causes gate AG523 to conduct which places the flip-flop circuit LHF–0 in its "one" condition, thus indicating the reception of a low frequency followed by a high frequency.

Upon the operation of the flip-flop circuit LHF–0 to its "one" condition energy is applied to a wire 517 which places units No. 1, No. 7, and No. 8 of the shift register TRSR–01 (FIG. 8B) in their "one" condition through gates OG449, OG524 and OG529. Also, energy is applied to a wire 518 that is connected to the wire 517 which operates digit No. 9, digit No. 15, and digit No. 16 of the shift register TRSR–02 (FIG. 8E) to their "one" condition.

Simultaneously, the operation of the flip-flop circuit LHF–0 to its "one" condition causes gate AG525 (FIG. 8D) to conduct because of energy on the wire 518, and the digits No. 1 through 8 of the counting shift register CSR–0 (FIG. 8E) are all in their "zero" condition causing gate AG499 to conduct, which applies energy to wire 498 connected to the other input of the gate AG525. Thus, energy is applied to the wire 528 (FIGS. 8D and 6A).

Because zone unit U4 is controlling the transmission of the code and the effect of the reception from the train, the gate AG414 (FIG. 6A) is still being conditioned by the wire 413 (FIGS. 6B and 7) and the energy on wire 528 causes the diode matrix to energize the combination of wires 422 through 426 for conditioning the units 10 through 14 of the shift register TRSR–02. This is the code for the zone that the train is in. In this example Z4.

Also, either contact 530 or 531 (FIG. 7) of the approach stick relays 27LAS and 25RAS, respectively, is closed. In this example, it is assumed that the train is traveling in a direction so that the relay 25RAS is energized and energy is applied to wire 430, which energizes the wires 440 through 444 through gate AG433 as controlled by the diode matrix (FIG. 6A). This combination corresponds to the code for the next zone in the direction of travel of the train. If the train in zone U4 were traveling in the opposite direction, wire 428 (FIG. 7A) would be energized and the wires 440 through 444 would be energized through gate AG432. In the present example, the application of energy at the output of gate AG525 on wire 528 (FIGS. 8D and 6A) causes a certain combination of the units 2 through 6 of the shift register TRSR-01 and a certain combination of the units 10 to 14 of the register TRSR-02 to be placed in their "one" condition. The combination of units which are put in their "one" condition indicates or reads into the shift register TRSR-01 a code corresponding to the next zone in the direction of travel of the train to which the transmission portion of the cycle was previously addressed. In this example, the code read into the register TRSR-01 is for the zone Z6; and as is apparent from FIG. 8B units No. 2, 3, 5 and 6 of the register TRSR-01 are operated to their "one" condition by the application of energy to wires 440, 441, 443 and 444.

Simultaneously, a code indicative of the zone to which the transmission portion was addressed, which in this example, is zone Z4, is read into the shift register TRSR-02. In this example, units No. 10, 12, 13 and 14 are operated to their "one" condition as is apparent from FIG. 8E.

The reception of the low frequency followed by the high frequency at the beginning of the reception portion of the cycle also causes energy to be applied over wire 518 to the inputs of gates AG518 and AG520 (FIGS. 8C and 8F) to condition them for operating either the flip-flop circuit D1F-0 or D2F-0 at the proper time in accordance with the code which follows.

At this time, gates AG542 and AG543 (FIG. 8A) also have energy applied to one of their inputs over wire 517 from the output of the flip-flop circuit LHF-0 in its "one" condition so that subsequent received high and low pulses will operate the shift register selectively to place the digits of the shift register TRSR-01 and TRSR-02 consecutively in either their "zero" or their "one" condition in accordance with the code received from the train. Also, wires 539 and 540 are connected to wires 546 and 544 to condition unit No. 9 of the register TRSR-02 through gates OG535 and OG536 by way of wires 539' and 544' in the same manner as the conditioning of unit No. 1, and simultaneously therewith in the response to each low and high frequency.

Prior to the reception of the following series of pulses it should be noted with respect to the shift register TRSR-01 that inputs to a gate AG530 (FIG. 8C) are connected to the "zero" output wires of units No. 1 and No. 8 respectively thereof so that this gate will conduct when both the digits No. 1 and No. 8 are in agreement as to their zero condition. Also, a gate AG531 (FIG. 8C) has its inputs connected to the "one" output wires of the units No. 1 and No. 8, respectively, of the shift register TRSR-01 so that the gate AG531 will conduct when both digits No. 1 and No. 8 are in their "one" condition. It should be noted at this time that when units No. 1 and No. 8 of the register TRSR-01 are in both either their "one" or "zero" condition energy is applied to a gate OG532 from the output of either gate AG530 or gate AG531 which applies energy to a NOT gate NOG2. When no energy is flowing from the output of the gate OG532 the gate NOG2 conducts. The output of gate NOG2 is connected to a gate AG518 for operating the decoding flip-flop circuit D1F-0. Thus, when the shift register TRSR-01 is in such a condition that neither its No. 1 and No. 8 digits are in agreement as to their condition, the decoding circuit D1F-0 will operate at the designated time as will hereinafter be described.

It should further be noted at this time that a gate AG534 (FIG. 8F) is provided with a pair of inputs connected to an output from unit No. 9 and unit No. 16 respectively of the shift register TRSR-02 so that it will conduct when both of these digits are in their "zero" condition. Also, a gate AG535 is provided with a pair of input wires one of which is connected to the output of digit No. 9 in its "one" condition and the other of which is connected to the output of digit No. 16 in its "one" condition so that it will conduct when both the digit No. 9 and 16 of the shift register TRSR-02 are both in their "one" condition. The output of gates AG534 and AG535 provide the input for a gate OG536. The output of the gate OG536 supplies the input to a NOT gate NOG1 (FIG. 8F), the output of which provides an input to gate AG520 when the units 9 and 16 are in disagreement. When the gate AG520 conducts the decoding flip-flop circuit D2F-0 is operated to its "one" condition. This, when the digits 9 and 16 of the shift register TRSR-02 are in different conditions the flip-flop circuit D2F-0 is placed in its "one" condition.

The second part of the train to control office transmission causes the receiver 400 to receive either a high or low pulse in accordance with the code. In the present example, a first pulse is a high frequency which causes the gate AG543 (FIG. 8A) to conduct thereby applying energy to a wire 544 which results in the No. 1 and No. 9 units of the shift registers TRSR-01 and TRSR-02 being put in its "one" condition. The shift register TRSR-01 was shifted previously one digit by energy on the wire 480 through the gate OG482 at the output of the delay multi-vibrator DM540 which shifts the register during the reception of the center frequency before the high or low pulse is received. The counting shift register CSR-0 upon the reception of each high or low frequency pulse is shifted one digit by the application of energy to wire 543 at the output of the delay multi-vibrator 540; and prior to each shift of the register CSR-0, unit No. 1 thereof is operated to its "one" condition because of energy being applied to a wire 545 connected to the output of the gate OG541.

The next pulse is a center frequency which is followed by a low frequency, the reception of which causes the gate AG542 to conduct to apply energy to a wire 546 to put the No. 1 unit of the register TRSR-01 and the No. 9 unit of the register TRSR-02 in its "zero" condition. The register TRSR-01 and TRSR-02 are then shifted by energy being applied to the wire 480 as previously described. Also, the counting shift register CSR-0 operates so that its No. 1 unit is placed in its "one" condition and shifted so that its No. 2 unit is in its "one" condition.

This sequence continues with each digit of the shift registers TRSR-01 and TRSR-02 being filled in sequence in accordance with the code received and then shifting one unit to the right for TRSR-01 and to the left for TRSR-02, as viewed in the drawing.

Upon the reception of a center frequency following the high or low frequency which places the digits 1 and 8 of the shift register TRSR-01 or the digits 9 and 16 of the shift register TRSR-02 in disagreement, the decoding flip-flop circuit D1F-0 or D2F-0 is placed in its "one" condition. Wire 549, which is connected to the input side of AND gates AG518 and AG520 has energy applied thereto by way of a wire 551 that is connected to the center frequency terminal of the receiver 400 so that the flip-flop circuits D1F-0 and D2F-0 operate during a center frequency only.

If the D1F-0 flip-flop circuit is placed in its "one" condition, it is indicative of the fact that the incoming code does not correspond to the next zone of the train in its direction of travel. If the D2F-0 flip-flop circuit is operated to its "one" condition, it indicates that the incoming code does not correspond to the zone that the train is in. In the present example, the train in zone Z4 is sending a code for the zone in which it is located, and thus the flip-flop circuit D1F-0 is operated to its "one" condition and D2F-0 remains in its "zero" condition. When all of the digits of the cycle have been received in this second portion of the reception cycle, at which time the counting shift register CSR-0 has its No. 8 unit in the "one" condition, the gate AG550 (FIG. 8C) has its input wire 559 from the "one" terminal of the circuit D1F-0 energized, its input wire 561 from the "zero" output of the circuit D2F-0 energized, and its input wire 569 that is connected to output wire 576 of unit No. 8 of the shift register CSR–0 energized.

The third portion of the cycle which completes the reception from the train, is a high frequency followed by a low frequency, and which causes the flip-flop circuit HLF–0 (FIG. 8A) to go to its "one" condition which applies energy to its output wire 579 that is connected to the input of the gates AG550 and AG552. Thus AG534 now conducts to apply energy to its output wire 534.

Referring to FIG. 7 the application of energy to the wire 534 causes the gate AG450 to conduct, and since the relay 4SR is energized the flip-flop circuit PFF for the zone unit U4 is operated to its "one" condition by the circuit which includes front contact 560′ of the relay 4SR. This stores in the control office the fact that the train in zone Z4 wishes to "proceed" in the same zone.

If the flip-flop circuit D2F–0 has been operated to its one condition and D1F–0 remained in its "zero" condition which indicates the reception of a code corresponding to the next zone in the direction of travel of the train, gate AG552 (FIG. 8F) would conduct at this time energizing wire 553 thereby causing the gate AG439 of the zone unit U4 to conduct. In this event, if no stop control had been given to a train in zone Z4 prior to this time, and traffic conditions permit the train to enter zone Z6, a circuit is completed to energize the relay 6ZOR, which extends from the output of gate AG439 and includes front contact 560 of the relay 4SR, front contact 562 of the relay 25RAS, the eastbound pulse stretcher 4EPS, front contact 563 of the relay 4ZOR, back contact 564 of the relay 8ZOR, and the winding of the relay 6ZOR to the center terminal of a source of direct current. Upon the picking up of the relay 6ZOR, a circuit is completed which operates the flip-flop circuit ENZFF of the zone unit U4 to its "one" condition. This circuit extends from the output of gate AG439 and includes the front contact 560 of the relay 4SR, the contact 562 of the relay 25RAS, contact 566 of the relay 25–27F in its left-hand position, front contact 567 of the relay 6ZOR, and the input of flip-flop circuit ENZFF. This stores in the control office, the fact that the train wishes to "enter the next zone."

It is noted at this time that the relay 6ZOR is picked up so that the scanner will stop to send a command to a train in zone Z6. In the event that traffic conditions were improper for the train to enter the zone Z6 the circuit would not be completed to put the flip-flop circuit ENZFF in its "one" condition, and the train would not receive permission during a subsequent transmission cycle. This is accomplished by the inclusion of the contact 566 of the traffic signal relay 25–27F and the front contacts of the various zone relays 6ZOR and 8ZOR in the above mentioned circuit.

Figure 8F:
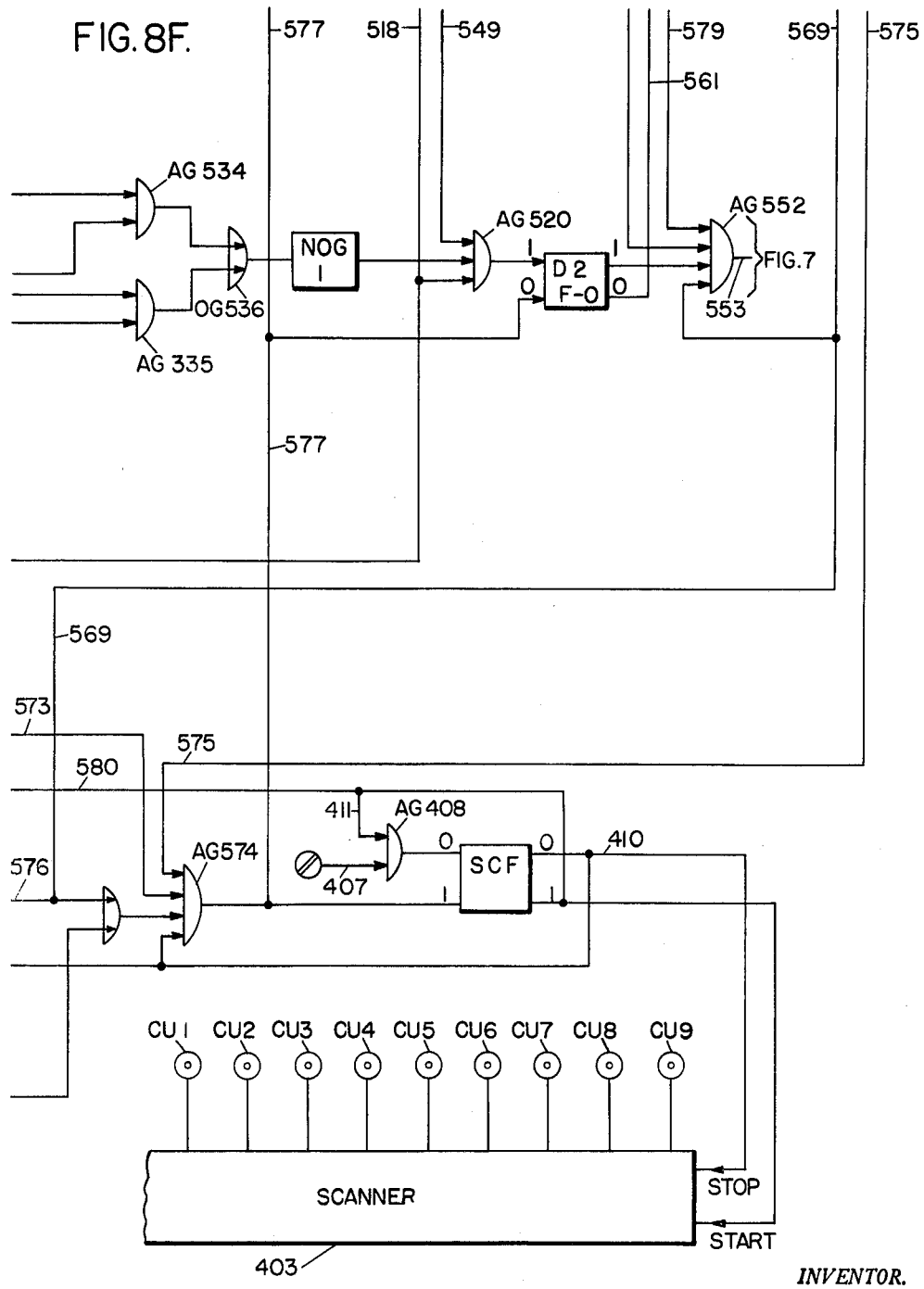
Figure 11D:
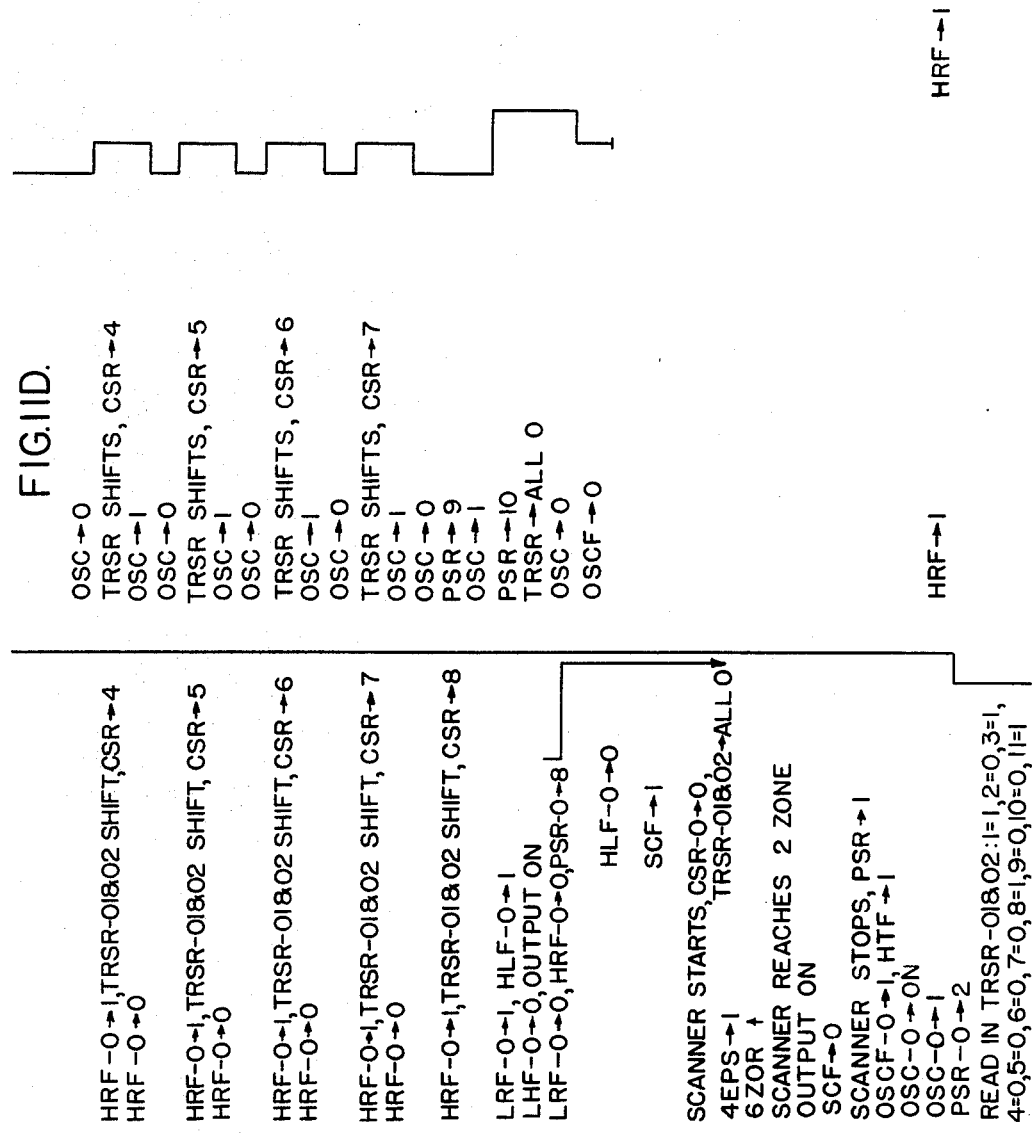
Figure 11E:
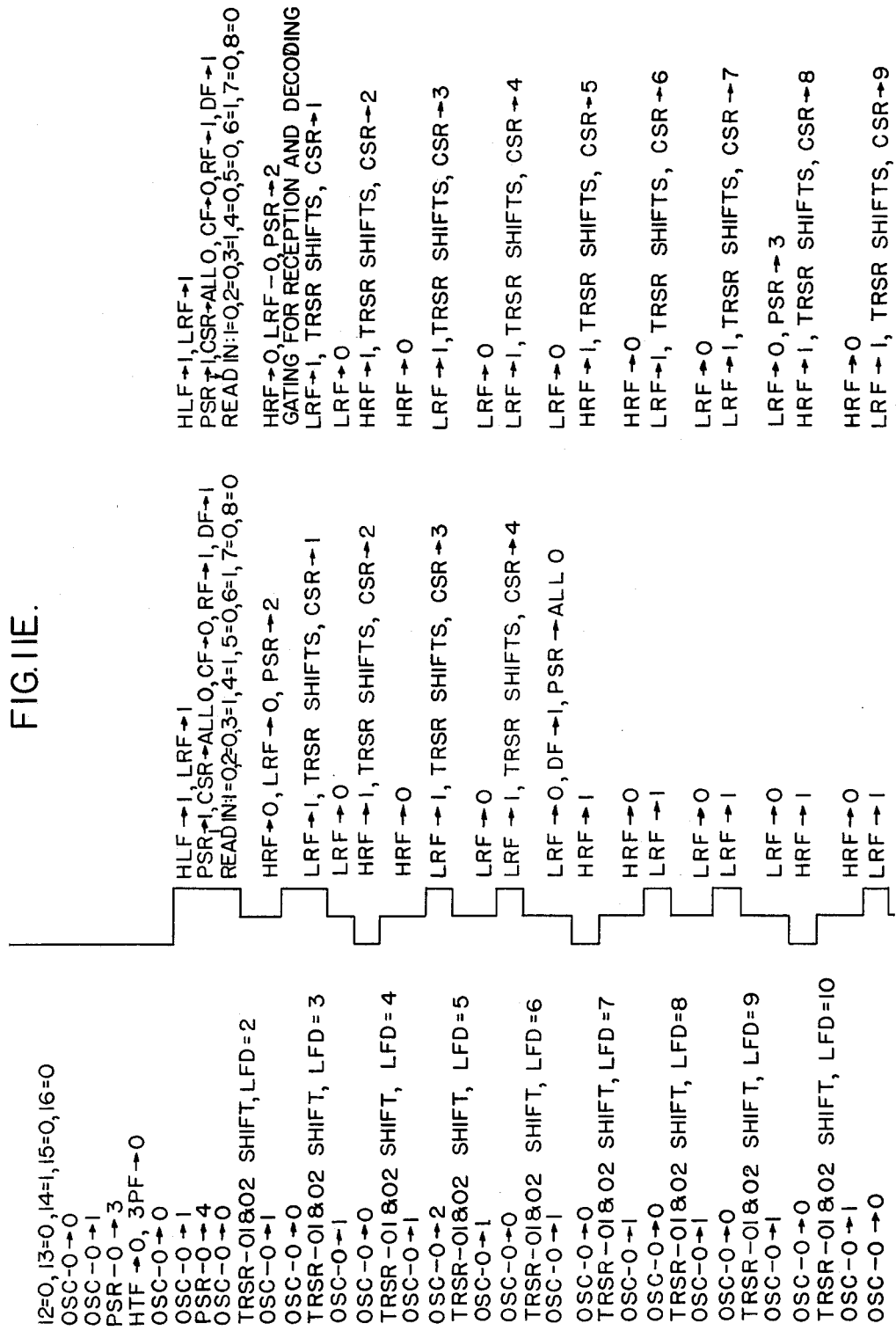
Figure 11F:
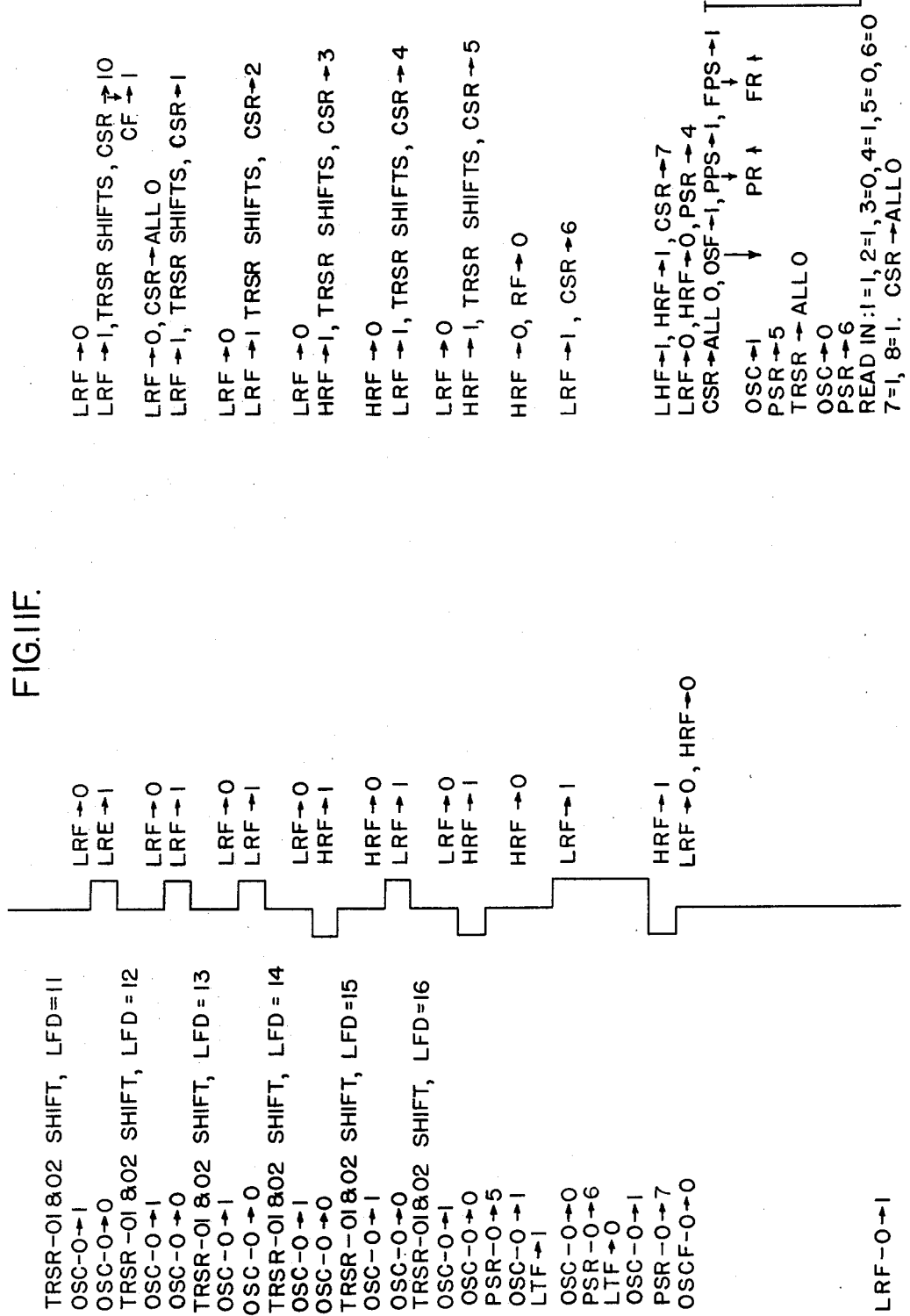
Figure 11G:
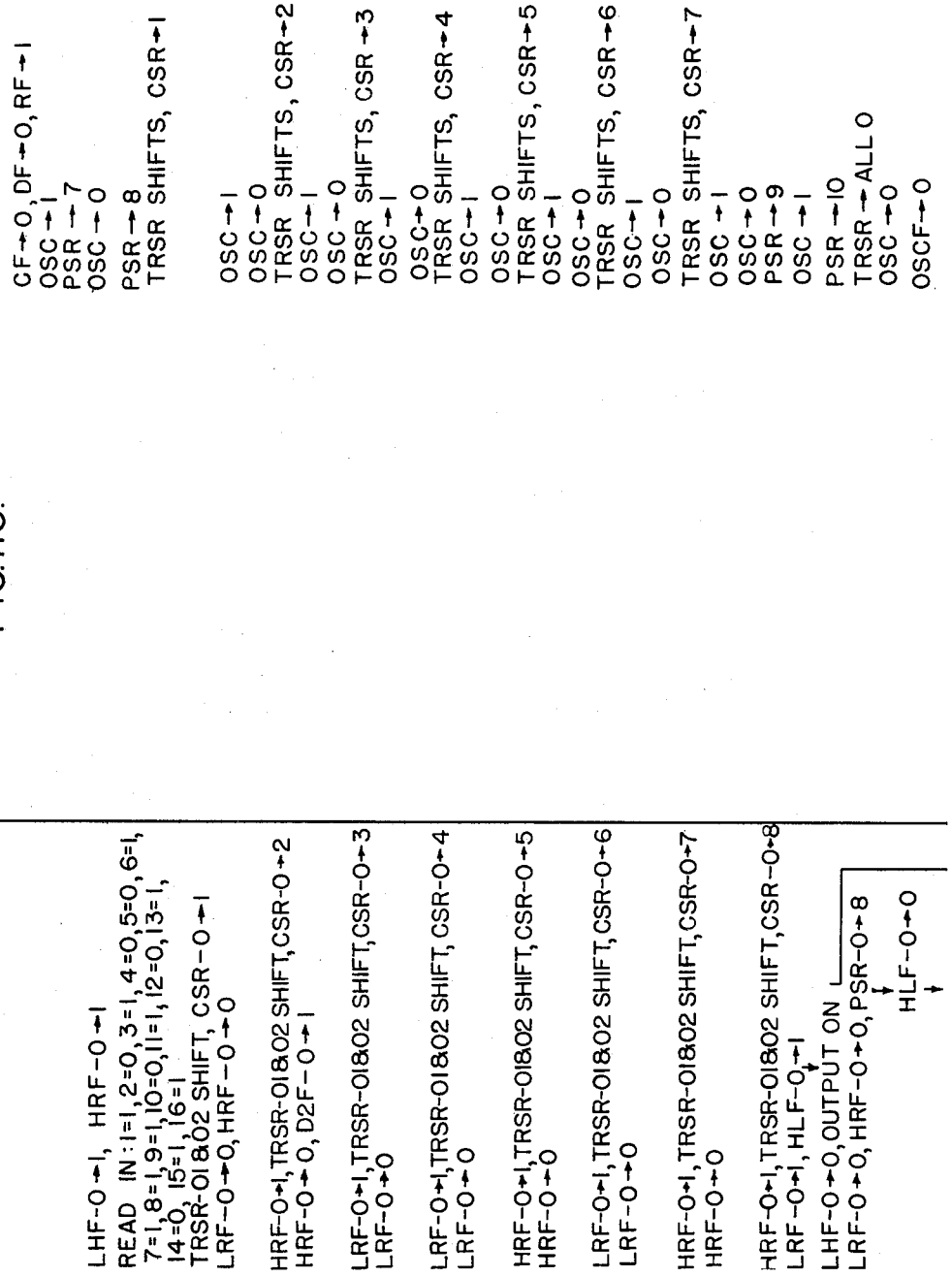

The operation of the flip-flop circuit HLF–0 to its "one" condition through gate AG522 operates the flip-flop LHF–0 to its "zero" condition to prevent further conduction of gates AG542 and AG543 in response to received pulses. Upon the reception of the center frequency at the end of the cycle, the gate AG570 (FIG. 8A) conducts. The output from the gate AG570 energizes a wire 571 that is connected to the gate OG460 to shift the programming shift register PSR–0 to its No. 8 unit. The steady center frequency transmitted from the control office (FIG. 8D) is now caused by energy on output wire 572 from digit No. 8 of the register PSR–0. Output wire 572 is also connected to a wire 572′ to operate the circuit HLF–0 to its "zero" condition, and is connected to a wire 573 which is connected to the input of a gate AG574 (FIG. 8F). The gate AG574 has another input wire 575 energized when the flip-flop circuit HLF–0 is operated to its "zero" condition; and has another input wire 576 energized when the counting shift register CSR–0 provides a "one" output from its No. 8 digit; the scanning flip-flop SCF in its "zero" condition provides the other input to the gate AG574. The output from the gate AG574 operates the flip-flop circuit SCF to its "one" condition for starting the scanner 403 so that it will scan until the next occupied zone is reached. The output of the gate AG574 also operates the flip-flop circuits D1F–0 and D2F–0 to their "zero" condition by the application of energy to a wire 577. The shift registers TRSR–01, TRSR–02 and CSR–0 are cleared or reset to place their units in their "zero" condition when the scanning flip-flop circuit SCF goes to its "one" condition by the application of energy to wire 580 which is connected to reset wire 581 of the registers TRSR–02 and CSR–0, and to reset wire 582 of the register TRSR–01. The shift register PSR–0 is shifted so that unit No. 1 will be in its "one" condition at the beginning of the next transmission cycle when all of the registers CSR–0, TRSR–01 and TRSR–02 are cleared or in their "zero" condition. This is accomplished by energy on wire 591 from the output of the gate AG496, which is connected to the gate OG460. When the scanner reaches the next occupied zone, the control office begins a transmission cycle which is followed by a reception cycle similar to the one previously described.

It is apparent from the drawings and the foregoing description that during the transmission portion of the cycle only the train in the zone addressed will receive a command. If there should be a malfunction of the control office equipment so that a code is sent out that is improper for a particular zone, or does not have the proper number of digits the code will not be received by the train nor will the transmitted command be executed. It is also apparent, that if the code received by the control office does not correspond to the zone in which the train is located or the next zone ahead of the train, there will be no operation of the flip-flop circuits PFF, RFF or ENZFF, thus preventing a command to the train during the next reception cycle. Also, traffic conditions will prevent the control office from sending out an improper command, as previously described.

Referring to FIGS. 10A and 10B, a control panel such as referred to at 600 is located in the control office. This control panel has a miniature track diagram corresponding to the track layout of the zone control territory. The track diagram is divided into zones so that each zone corresponding to the track layout is illuminated when the respective zone is occupied by a train. A lever 26L is provided to operate the switch 26 to either a reverse or a normal position. A lever 28L is provided to operate the switch 28 to either its normal or reverse position. Associated with each illuminable zone on the panel 600 are push buttons RPB and SPB. The push buttons SPB are used to provide a manual control to the train so that it may be moved through the territory under emergency conditions. The push buttons RPB are used to reverse the direction of travel of the train, which control first requires the train to stop as will hereinafter be described. The push buttons 3RPB and 3SPB are used to provide a reversing and manual control respectively for a train located in zone Z3. The push buttons 4RPB and 4SPB are used to provide a reverse and manual control for a train located in zone Z4. Similarly, the push buttons RPB and SPB having other numerical prefixes are used to control the trains in the similarly numbered zones. In order to simplify the drawings the circuitry that is operated in response to the operation of the push buttons 4RPB and 4SPB only is shown schematically.

Associated with each zone is a relay RS and a relay SR. The relay SR is normally energized as long as traffic conditions permit a train to proceed in the direction in which it is traveling or when manual control is used for operating the train under emergency conditions. The relay RS for each zone is normally deenergized and is operated in response to the operation of its associated push button RPB.

Associated with each of the signals, such as 25R, 27RA and 27L for example is an approach stick relay AS. Associated with the signal 25R is an approach stick relay 25RAS. Associated with the signal 27L is an approach stick relay 27LAS. When a signal is clear so that traffic may move into the territory governed by the signal its associated approach stick relay is energized. If the signal is at stop its associated approach stick relay is deenergized. A route directional stick relay, such as 25–27F is provided to indicate the permissive direction of travel for trains traveling in the territory in accordance with the condition of the signals. The relay 25–27F for example is a magnetic stick relay which is energized so that its contacts are in their right-hand position as viewed in the drawings when traffic is allowed to travel between signals 27L and 25L in a left-hand or westerly direction as viewed in the drawings, and is operated so that its contacts are in their left-hand position when the signals are cleared so that traffic may move easterly or in a right-hand direction. Associated with each F relay in any control territory is a timing relay FTE, such as the relay 25–27FTE illustrated in FIG. 10A. This relay is used to prevent the reversing of the direction of travel of the train until the train has had time to come to a stop. Other traffic indication and control relays may be used in accordance with the requirements of practice and the relays illustrated and described herein are included for certain signals for the purpose of showing the principles of operation of the system.

With reference to FIGS. 10A and 10B the relay 4SR associated with the zone Z4 is normally energized when the approach stick relays for the signals 25R and 27L are in their proper condition, and the relay 25–27F is in its proper position. The circuit for maintaining the relay 4SR normally energized when traffic conditions permit a train in zone Z4 to travel in an easterly direction, extends from (+) and includes wire 602, contact 603 of the relay 25–27F in its left-hand position, front contact 604 of the relay 25RAS, back contact 605 of the relay 27LAS, back contact 606 of the relay 4RS, and the winding of the relay 4SR, to (—). The relay 4SR once energized is provided with a stick circuit which extends from (+) and includes wire 607, back contact 608 of the relay 4RS, front contact 610 of the relay 4SR and the winding of the relay 4SR, to (—).

The circuit for energizing the relay 4RS in response to the operation of the button 4RPB is provided with a number of contacts of the various zone relays to prevent an operator from reversing the direction of travel of the train when it is unsafe. The circuit for picking up the relay 4RS extends from (+) and includes the push button 4RPB in its operated condition, back contact 612 of the timing relay 25–27FTE, wire 613, contact 614 of the relay 25–27F in its right-hand position, back contact 615 of the relay 6ZOR, back contact 616 of the relay 8ZOR, front contact 617 of the relay 2ZOR, front contact 618 of the relay 4ZOR, back contact 620 of the relay 1ZOR, back contact 622 of the relay 9ZOR, and the winding of the relay 4RS, to (—). This pick up circuit insures that the zones either ahead of or behind the train being reversed are unoccupied. The front contact of the relay 2ZOR is included in the pick up circuit to provide for the occupying of both zones Z4 and Z2 by the train to be reversed. An alternate pick up circuit for the relay 4RS includes the contact 614 of the relay 25–27F in its left-hand position, front contact 623 of the relay 6ZOR and back contact 624 of the relay 1ZOR. This alternate pick up circuit parallels the back contacts of 6ZOR and 8ZOR so that the train may occupy the zone 6Z when the signals are in such condition that the train may reverse its direction to travel westerly into zone 4 and zone 2, etc. The relay 4RS is held energized after the button 4RPB is released by a stick circuit which extends from (+) and includes wire 625, contact 626 of the relay 25–27F in its right-hand position, back contact 627 of the relay 25RAS, front contact 628 of the relay 4RS and the winding of the relay 4RS, to (—). Thus, once the relay 4RS is picked up and the signals are such that its reversal is in a westerly direction is safe, the train may be effectively reversed. An alternate stick circuit is provided for a train reversing its direction from westerly to easterly which includes the contact 626 of the relay 25–27F in its left-hand position and back contact 630 of the relay 27LAS which insures that no train is cleared to move easterly on the same track. The timing relay 25–27FTE is provided with various pick up circuits so that it will reverse the signal governing relay 25–27F when a train is located in the zones between the signals 25 and 27.

When the button 4RPB is operated the relay 4RS is picked up by the aforementioned circuit and the relay 4SR is dropped away by the opening of the back contacts 606 and 608 of the relay 4RS. Energy is applied to the winding of relay 25–27FTE which begins a timing period after which its contacts pick up. The circuit for energizing 25–27FTE extends from (+) and includes back contact 640 of the relay 4SR, front contact 641 of the relay 4RS and the winding of the relay 25–27FTE, to (—).

Referring to FIG. 7 the picking up of relay 4RS and the dropping away of relay 4SR causes the flip-flop circuit RFF to go to its "one" condition when the control office receives a request to "proceed" as previously explained. The circuit for operating the flip-flop circuit RFF includes back contact 560 of relay 4SR, front contact 642 of relay 4RS, contact 643 of relay 25–27F in its left-hand position, and front contact 644 of relay 25RHS to the input of the RFF flip-flop circuit.

If the train had requested "enter new zone" the RFF circuit is energized by a circuit which extends from the gate AG439 and includes back contact 560 of the relay 4SR. The mere operation of the circuit RFF does not cause a proceed command to be sent to the train during its transmission cycle and the train comes to a stop. In FIG. 7A if both the circuits PFF and ENZFF are in their zero condition gate AG651 conducts to cause a stop control to be sent to the train by energizing a relay S such as shown in FIGS. 3A and 4B. When the train has had time to come to a stop, the contact 612 of the relay 25–27FTE opens which drops out the relay 4RS and the relay 4SR picks up as previously described. The train now can send and receive "proceed" commands. The closing of contact 645 of relay 25–27FTE also reverses the relay 25–27F which causes relay 27LAS to pick up and relay 25RAS to drop away in a well known manner which results in the code being read into the matrix as previously described being determined by the front contact 530 of the relay 27LAS. Thus, the train is now proceeding in a reverse direction and the circuitry is prepared so that the train can enter zone Z2 upon its approach thereto as previously described.

To obtain a further understanding of the overall operation of the system, the illustrated embodiment will be described in connection with the operation of a train in zone Z4 traveling in an easterly direction into zone Z6. In this description of operation the assumption is made that traffic conditions are proper for a train to travel between signals 25R and 27R in an easterly direction and the switch 28 is in its normal position. Thus, the relay 25–27F is operated so that its contacts are in their left-hand position and the relay 25RAS is energized. As previously described in connection with the description of FIGS. 10A and 10B under these conditions the relay 4SR is energized.

It should also be recalled that a code for the zone Z4 is stored in the storage relays ZSA or ZSB (FIGS. 3A and 3B) as previously described. For the purposes of this example it is assumed that the zone is stored in the relays ZSB.

The scanner (FIG. 8F) commences scanning until it applies energy to the contact CU4 and stops because the relay 4ZOR is picked up denoting the occupancy of the zone Z4. The zone unit 4U (FIG. 7A) causes the transmitter which had previously been sending a steady center frequency to begin the transmission of a series of code pulses. Also, the zone unit 4U now controls the code which will be sent to the trains in the zone control territory. This is accomplished through the code forming matrix (FIG. 6A) which stores in the coding unit, namely, the shift registers TRSR–01 and TRSR–02 respectively, the control to be transmitted and the zone address of the train intended to receive the control. Thus, at the end of the first portion of the control office to train transmission cycle the train carried receiving apparatus has been conditioned to receive the present transmission cycle and the code to be transmitted has been stored in the radio coding unit.

The second portion of the control office to train transmission cycle transmits the code in accordance with the zone address stored in the shift register TRSR–02 which serves to lock out the apparatus on all of the trains running in the territory which has an address stored in the train carried coding and decoding unit (FIGS. 4A–4F) different from that transmitted. Thus, because the code transmitted agrees with the code stored in the train located in the zone Z4 its apparatus is prepared to receive the command during the third portion of the transmission cycle.

The third portion of the transmission cycle causes the output relay P (FIG. 4B) to be energized momentarily which conducts energy to the relay PCP for keeping it energized which permits the train to continue proceeding. The fourth and final portion of the control office to train transmission cycle causes the train carried apparatus to condition itself and begin transmitting a series of pulses to the control office.

The train now begins transmitting a series of code pulses which will either be a code corresponding to the zone in which the train is located, that is, that zone in which the train was previously addressed, or will correspond to the next zone in the direction of travel of the train. Because the train is still in zone Z4, in accordance with our example, the code will correspond to the zone in which the train was previously addressed. In the first part of the train to control office transmission, a code is sent which conditions the control office apparatus to receive the subsequent coded information. Also during this time the shift register TRSR (FIG. 4B) is conditioned to store therein a zone location code as controlled by the operated condition of the relays ZSB1 through ZSB4. Also, this first part of the train to control office transmission causes the control office apparatus to store in the shift registers TRSR–02 (FIG. 8B) and the shift register TRSR–01 (FIG. 8E) a code corresponding to the zone location which was previously transmitted in the control office to train portion of the cycle and a code corresponding to the zone in the direction of the travel of the train, respectively. Assuming that the code corresponds to the zone in which the train was previously addressed the decoding flip-flop circuit D1F–0 is shifted to its "one" condition. This happens because the shift register TRSR–01 is in disagreement with the code being received from the train. Because the shift register TRSR–02 was in such a condition that it agreed with the zone code being received by the train, the flip-flop circuit D2F–0 remained in its "zero" condition. If both of the codes stored in the shift registers TRSR–01 and TRSR–02 were in disagreement both of the flip-flop circuits D1F–0 and D2F–0 would be operated to their "one" condition which would prevent an output from the AND gates AG550 or AG552 respectively. This would prevent any command request from being stored in the control office zone unit U4 because it would indicate that something was wrong with the apparatus.

However, the flip-flop circuit D1F–0 causes the proceed flip-flop circuit PFF (FIG. 7A) of the zone unit U4 to be shifted to its "one" condition. The third part of the train to control office transmission marks the end of the cycle and causes the control office apparatus to start the scanner (FIG. 8F) operating until it arrives at another terminal CU of an occupied zone.

Assuming that there are no other occupied zones the scanner will again immediately come to rest at the terminal CU4 which will begin the first part of the control office to train transmission cycle and repeat the entire sequence of control office to train transmission which then causes the train to control office transmission as hereinbefore described. This repetition of commands sent to the train as controlled by the previous request for a command stored in the control office maintains the relay PCP energized on the train so that it may continue to proceed in the zone Z4. In the event that the train should not receive a command for any predetermined length of time, the relay PCP will drop away and the train will come to a stop.

Assuming that the train passes the wayside identification coil 10 at the entrance to the zone Z6, a code corresponding to the zone Z6 is stored in the bank of relays ZSA. Thus, at this time there is stored in the train carried apparatus (FIGS. 3A and 3B) a code corresponding to the zone Z4 and the code corresponding to the zone Z6. When the control office begins transmitting to the train which is still located in the zone Z4 it stores in its shift register TRSR–02 the code for the zone location Z4 and also stores in its shift register TRSR–01 the "proceed" command which was previously stored in the zone unit U4 as evidenced by the condition of the flip-flop circuit PFF. The control office to train transmission occurs as previously described with the command being cancelled after it has been stored in the shift register TRSR–01, and the train receives the command "proceed" as evidenced by the energizing of the output relays F and P. However, when the zone code for the subsequent zone in the direction of the travel of the train was stored in the relays ZSA, the zone transmission relay ZTR was operated to its other position and closes its front contacts, which causes a code corresponding to this subsequent zone code to be read into the shift register TRSR (FIG. 4B) and it is this code which is transmitted to the control office during the train to control office transmission. The reception of this code by the control office causes the flip-flop circuit D1F–0 to be shifted to its "one" position which completes the circuit for operating the flip-flop circuit ENZFF to its "one" condition at the end of the cycle. This operation of the flip-flop circuit stores the fact in the zone unit U4 that the train wishes to enter the zone Z6. It will be noted in FIG. 7 that the circuit for operating the flip-flop ENZFF includes contacts of the signal relay 25–27F and the appropriate approach stick relay 25RAS or 27LAS. In this example, inasmuch as the train is traveling easterly the contact 566 of the relay 25–27F is in its left-hand position and the front contact 567 of the relay 6ZOR must be energized. The relay 6ZOR in this example was energized just prior to the energization of the flip-flop circuit ENZFF.

The next time that the control office scanner reaches the terminal CU4 a code corresponding to the zone Z4 is sent to the train and the command "enter new zone" is transmitted as evidence by the momentary picking up of the relay F and ENZ.

When the PCP relay is deenergized because of the failure of the relay P to be picked up during previous transmissions, the operation of the relay ENZ causes the "enter new zone" repeater relay ENZP to be energized. Unless the train is effectively influenced by the coil 11 at the entrance to the zone Z6 within a certain length of time the train will come to a stop because the energized condition of relay ENZP alone is insufficient to keep the train moving. When the train passes the coil 11 the relay 1TC is dropped away which causes the train carried storage apparatus to cancel the code stored in the storage bank ZSB for the zone Z4 and also conditions the apparatus so that the train will be addressed by a code from the central office corresponding to the zone Z6. Thus during the next control office to train transmission the train will respond to the code for the zone Z6. Also, the train will transmit to the control office a code corresponding to the zone Z6 as it previously had done to request a command to "enter the new zone." However, because the train had been addressed in the zone Z6 and the address transmitted to the control office was for the same zone, the zone unit U6, similar to unit U4 of FIG. 7, now stores a "proceed" command by the operation of the flip-flop circuit PFF for the zone unit U6. In the next control office to train transmission the proceed command is sent to the train at the entrance of the zone Z6 which restores the relay 1TC to its energized condition by causing the relay PCP to be picked up. When this sequence has been completed the train will be able to continue to travel in the zone Z6 by the periodic reception of the "proceed" command as previously described. Thus, it is apparent that if the code 11 should be defective or missing the train will come to a stop because the train will be unable to receive the command "proceed" in zone Z6 after receiving the "enter new zone" command. Also, if the coil 10 should be defective or missing, the train will not store the code for the new zone and after the train passes the coil 11 there will be no address stored on the train to which the train can respond. To sumarize the sequence of events when a train approaches the entrance to the zone Z6, for example, the influence of the coil 10 causes the train to transmit the code for the new zone. The influence of the coil 11 initiates a brake application and cancels the zone location for the previous zone and simultaneously conditions the train carried apparatus to receive the code address to the new zone.

From the previous description of operation it has been pointed out that the train will come to a stop if it has failed to receive any command whatsoever for a certain period of time. It should be noted that if traffic conditions should change causing the relay 4SR, for example, to drop away (FIG. 7, FIGS. 10A and 10B) a stop command will be stored in the zone unit U4. This will cause the control office to send a command requiring the train to stop by energizing the output relay S (FIG. 4B) to provide a quicker response than a no code command.

In reversing the direction of travel of the train traveling in the zone Z4, the push button 4RPB is operated, and if traffic conditions permit as previously described the relay 4RS is energized (FIGS. 10A and 10B) which causes the relay 4SR to drop away. With reference to FIG. 7, this condition will cause the flip-flop circuit RFF to be operated to its "one" condition instead of the "proceed" flip-flop circuit PFF. Therefore a reverse command is transmitted by the central control office for a predetermined length of time. Once the train has been detected that it is actually stopped as previously described, a "proceed" command is then sent to the train in the manner previously described.

With reference to FIG. 7 the zone relay 4ZOR which indicates occupancy of the zone by a train can be deenergized in accordance with the needs of practice. The zone relay for a particular zone could be deenergized after the train has passed the zone and occupies a predetermined zone in advance thereof. Also, the zone relays ZOR may be interlocked to prevent their operation in accordance with the individual needs of practice.

Thus, it is seen that I have provided an improved system for governing the operation of railroad trains wherein the trains are addressed by the zone number of the zone in which they are located by means of a code which requires a minimum of frequencies. It is also seen, that the failure of the communication channels at any time will cause the train to stop regardless of its position in the zone. Also, that the response of the train to a control office transmission is checked for validity at the control office in addition to the various other checks hereinbefore described to provide for maximum protection.

It is contemplated that additional controls from the train may be provided such as idle, inching, etc. and other types of communication apparatus may be used in actual practice and that various components performing similar functions may be substituted for those illustrated and described herein.

Having described a system for governing the operation of railroad trains from a central office it is to be understood that various adaptations and modifications may be made without departing from the spirit or scope of the invention.

What I claim is:

1. A system for governing the operation from a central office of railway trains over a stretch of track that is divided into a plurality of successive zones, wherein the central office and the trains each have transmitting and receiving means for communicating therebetween, said system comprising means at the office for initiating a communication cycle successively for communicating between the central office and the respective trains repeatedly at intervals independent of the progress of the trains, each said recurring communication cycle including a central office to train transmission first portion having a signal characteristic of a distinct zone and at times a signal characteristic of a command and including also a train to central office transmission second portion having a signal characteristic of a distinct zone, means partly on the wayside and partly on each train operative to govern the effective reception of a command signal during the first portion of each recurring communication cycle when a command signal is included in said first portion and the distinct zone characteristic of the signal transmitted during the second portion of each cycle, circuit means at the central office responsive to the reception of a signal characteristic of one distinct zone during the second portion of one communication cycle to govern the including of a signal characteristic of a command in the first portion of that next communication cycle having a signal in the first portion thereof characteristic of the distinct zone corresponding to the first portion of said one communication cycle, and means on the train to govern said train to stop in the absence of the reception of a command during the first portion of the recurring communication cycles for a predetermined interval of time.

2. A system for governing the operation from a central office of a train over a stretch of track that is divided into a plurality of successive zones wherein the central office and the train each have transmitting and receiving means for communicating therebetween, said system comprising means for initiating a communication cycle between the central office and the train at recurring time intervals, each said recurring communication cycle including a central office to train transmission first portion having a code corresponding to a particular zone with at times a clearing control for said zone and including a train to central office transmission second portion having a code corresponding to a particular zone, train carried means responsive to the movement of the train into each of said successive zones operative to register on the train the particular zone in which the train is entering, first circuit means on the train governed by the particular zone registered on the train to render the train receiving means operative to receive the clearing control code of the first portion of a communication cycle only when said first portion includes a code corresponding to the zone registered on the train, second circuit means on the train governed by the particular zone registered on the train operative to govern the code for a particular zone for the second portion of each communication cycle, circuit means at the office governed by the completion of one communication cycle having a code for the same particular zone in both the first and second portions to govern the transmission of a clearing control in a subsequent communication cycle when the code of the first portion of said subsequent communication cycle corresponds to the same particular zones of said one communication cycle, and means on the train responsive to the reception of the clearing control at recurring intervals to govern the train to travel in a respective zone.

3. In a system for governing from a central office the operation of a train over a stretch of track that is divided into a plurality of distinctly identified successive zones wherein the central office and the train each have transmitting and receiving means for communicating therebetween, comprising means for initiating a communication cycle between the central office and the train at recurring intervals, each said communication cycle including a first central office to train transmission portion having a code corresponding to a selected command for a distinct zone and including a second train to central office transmission portion having a code corresponding to a distinct zone, zone address circuit means at the central office for each of said zones, means governed by each of said zone address means to govern the initiating means to initiate a communication cycle at recurring intervals having a first portion corresponding to each respective zone, means at the central office responsive to the reception of a code corresponding to a distinct zone during the second portion of each communication cycle to govern the zone address means to store a selected command at the central office for the particular zone transmitted during the first portion of said communication cycle, means governed by the stored command to govern the command transmitted during the first portion of a subsequent communication cycle having a code corresponding to said same particular zone, and means on the train responsive to the said command to govern the train in accordance therewith.

4. A system for governing the operation from a central office of a train over a stretch of track that is divided into a plurality of successive zones wherein the central office and the train each have transmitting and receiving means for communicating therebetween, said system comprising means partly on the train and partly on the wayside to store on the train the distinct identity of the zone in which the train is located, memory means at the office for storing identities of occupied zones and for selecting successive transmission of codes for the occupied zones, means for initiating a communication cycle between the central office and the train at recurring time intervals independent of the progress of the train, each said communication cycle including a first portion comprising a central office to train transmission having a code corresponding to a distinctly identified zone selected by said memory means with at times a selected command for said zone and including a second portion comprising a train to central office transmission having a code corresponding to a distinctly identified zone, means on the train responsive to the reception of a selected command at predetermined recurring intervals to govern the train in accordance with the command received, means on the train to govern the train to stop in the absence of the reception of any command for another predetermined interval, means on the train governed by the identity of the zone stored by the storing means on the train to select the distinct identity of the zone for the second portion of each communication cycle, means at the central office to compare the identity of the zone received in response to the second portion with the identity of the zone transmitted during the first portion of each communication cycle, and means governed by the central office comparing means and traffic conditions along the stretch of track operative at times to store information in the central office in response to the reception of the second portion of each communication cycle to govern the selection of the command for the same identified zone in the first portion of the next recurring communication cycle.

5. A system for governing the operation of a train from a central control office along a stretch of track which is divided into a plurality of discrete zones wherein the central office and the train has means for communicating therebetween during a communication cycle, comprising initiating means at the office for initiating transmission of communication cycles for occupied zones successively and at intervals independent of the progress of the train, means on the train effective to govern said train to continue traveling in the zone in which the train is located or to enter the next zone in its direction of travel, means on the train effective to store information corresponding to the zone in which the train is traveling and at times when the train is approaching a succeeding zone to store information corresponding to the next zone in its direction of travel contemporaneously therewith, means at the central office responsive to the reception of information from the train corresponsing to the zone location that the train is in to send a command to the train to govern said train to proceed in the same zone when a communication cycle is next initiated by the initiating means for the zone occupied by the train, and means at the central office responsive to the reception of information corresponding to the succeeding zone effective to transmit a command to the train to enter said succeeding zone when a communication cycle is next initiated by the initiating means for the zone occupied by the train.

6. A system for governing the operation of a train over a stretch of railway track that is geographically divided into a first and second successive zone and wherein the train has means for transmitting information to and receiving information from a central office and the central office has means for receiving information from and transmitting information to the train, said system comprising means on the train effective to store its presence in the first zone while occupying the first zone and its presence in both the first and second zones while occupying the first and second zones and its presence in the second zone while occupying the second zone, means on the train responsive to the reception of a first distinct control to govern the train to travel in the first zone while it is occupying the first zone and to govern the train to travel in the second zone while it is occupying the second zone, means at the central office governed by the indication of the presence of the train in the first zone operative to transmit said first distinct control to the train, means at the central office governed by traffic conditions along said stretch of track and the indicated presence of the train in both the first and the second zones effective to transmit a second distinct control to the train, and means on the train governed by the reception of said second distinct control subsequent to the first distinct control to render the train effective to receive said first distinct control to govern the train to travel in the second zone, and means on the train effective to govern the train to stop upon the failure of the train to receive said first and second distinct controls.

7. A system for governing the operation from a central office of a train over a stretch of track that is divided into a plurality of successive zones wherein the central office and the train each have transmitting and receiving means for communicating therebetween, said system comprising means partly on the train and partly on the wayside adjacent the entrance of each of said zones to store on the train identities of each of two distinct zones in succession as the train travels over the stretch of track, means for initiating a communication cycle between the central office and the train at recurring time intervals, each said communication cycle including a first portion comprising a central office to train transmission having a code corresponding to a distinct zone with at times a selected command for said distinct zone and including a second portion comprising a train to central office transmission having a code corresponding to one of said two distinct zones, circuit means at the central office governed by the zone code transmitted during the first portion of one communication cycle to store in the central office a selected command in response to the distinct zone of the second portion of said same communication cycle for transmitting said stored command during the first portion of the next communication cycle having the same distinct zone in the first portion thereof as the zone in the first portion of said one communication cycle, circuit means on the train governed by the zone stored on the train by the storing means to effectively receive the command during the first portion of each communication cycle and to select the distinct zone transmitted during the second portion of said same communication cycle, means on the train responsive to the effective reception of the selected command at said recurring time intervals to govern the operation of the train in accordance with the particular command, and means on the train operative to govern the train to stop in the absence of the effective reception of a command for a predetermined time interval.

8. A system for governing the operation from a central office of a train over a stretch of track that is divided into a plurality of successive zones, wherein the central office and the train each have transmitting and receiving means for communicating therebetween, said system comprising means partly on the train and partly on the wayside to store on the train the distinct identity of one zone when the train is located in said one zone and the distinct identity of another zone contemporaneously with the one zone when the train is located approaching said other zone, means for initiating a communication cycle between the central office and the train at recurring time intervals, each said communication cycle including a first portion comprising a central office to train transmission having a code corresponding to a distinctly identified zone with at times a selected command for said identified zone and including a second portion comprising a train to central office transmission having a code corresponding to a distinctly identified zone, means at the central office responsive to the second portion of each communication cycle to compare the identity of the zone received during said second portion with the identity of the zone transmitted during the first portion of each communication cycle, circuit means on the train governed by the zone identity storing means on the train and the identity of the zone of the first portion of each communication cycle to select the identity of the zone of the second portion of each communication cycle, means governed by the central office comparing means and traffic conditions along the stretch of track in response to the second portion of each communication cycle to select a first command for transmission in the first portion of the next communication cycle when the identity of the zone of both the first and second portion of a previous communication cycle are the same and to select a second command for the next transmission of the communication cycle when the identity of the zone of the first and second portions of the preceding communication cycle are different, and means on the train responsive to the reception of said first command at predetermined recurring intervals to govern the train to proceed in the identified zone in which the train is located and responsive to the reception of the second command to govern the train to travel into the next succeeding identified zone and means on the train to govern the train to stop in the absence of the reception of said first and second command for another predetermined interval.

9. A system according to claim 8 including circuit means at the central office responsive to the central office comparing means to render the central office storage means inoperative to store a command in response to the zone identity of the second portion of the communicating cycle when the zone identity in the second portion of the communication cycle is other than the same distinct zone identity transmitted during the first portion of said same communication cycle or the identity of the next zone adjacent said first zone.

10. A system according to claim 8 further including a second means partly on the train and partly on the wayside adjacent the entrance to each zone and activated in response to the passage of the train thereby to govern the train carried zone storage means to receive effectively the first command for the next successive zone in the direction of travel of the train only when said second command is governing the train.

11. A system according to claim 10 having means including the second means operative to cancel on the train the first control for the one zone to govern the train to stop when the train is located adjacent the end of said one zone when the first command is governing the train.

12. In a system for governing from a central office the operation of a train over a stretch of track that is divided into a plurality of successive zones and wherein the central office and the train each have transmitting and receiving means for communicating therebetween, comprising a clearing control means on the train operative when activated by a first distinct code received from the central office to govern the train to travel in the zone in which the train is located, a first means partly on the train and partly along the stretch of track at the end of each successive zone to govern the train transmitting means to send a second distinct code characteristic of a zone the train is about to enter, means at the central office responsive to the reception of said second distinct code to govern the central office transmitting means ineffective to transmit said first distinct code in combination with a zone address code for the zone the train is occupying, a second means partly on the train and partly along the stretch of track for registering the presence of the train along the track at a point where it is about to enter the next zone, means responsive to the activation of said second means to render said clearing control means operated in response to the reception of said first distinct code in combination with the second distinct code to govern the train to proceed in the zone next succeeding the zone it is occupying, and means at the central office responsive to traffic conditions over said stretch of track to govern the transmission of said second distinct code.

13. A system for governing from a central office the operation of a train over a stretch of track that is divided into a plurality of successive zones wherein the central office and train each have transmitting and receiving means for communicating therebetween, said system comprising means for initiating a communication cycle between the central office and the train at recurring intervals, means at the central office for governing the transmitting means at the central office to selectively transmit a clearing control signal and an intermediate control signal to the train, first means on the train responsive to the reception of said clearing control signal at said recurring intervals to govern the train to travel through a respective zone, a second means on the train activated in response to the reception of said intermediate control signal when the first means is in an unoperated condition to govern the train to enter the next successive zone, a third means partly on the train and partly along the wayside adjacent the end of the zone activated in response to the trains passing the end of a respective zone, a first circuit means on the train responsive to the activation of the third means to render said first means unresponsive to said clearing control signal, a second circuit means on the train responsive to the reception of said intermediate control signal when the first means on the train is in an unoperated condition, and a third circuit means on the train operative to render said first means responsive to a clearing control signal only when both said second means and said third means are activated, and means at the central office responsive to traffic conditions along the stretch of track to govern the transmission of the clearing control signal and the intermediate control signal during each recurring communication cycle.

14. A system according to claim 13 including circuit means on the train responsive to the reception of the clearing control signal to deactivate said third means.

15. In a system for governing from a central office having means to transmit repetitively within predetermined time limit intervals a selected one of a plurality of commands for a distinctly identified zone, the operation of a railway vehicle having a receiving means and a plurality of normally inactive command means, a respective one of which is activated momentarily in response to each reception of a selected transmitted command, over a stretch of track that is divided into a plurality of successive zones having means to transmit to the vehicle the distinct identity of each zone as the vehicle enters each respective zone, comprising a first and second storage means for storing on the vehicle the distinct identity of a first and second zone in response to the zone transmitting means, a zone transfer means when in a first condition operative to govern the vehicle receiving means to activate momentarily a selected one of the command means upon each transmission of a command for the distinct zone stored in the first storage means and when in a second condition operative to govern the vehicle receiving means to activate momentarily a selected one of the command means upon each transmisison of a command for the distinct zone stored in the second storage means, a first and second vehicle control means operative to govern the train to travel when either one or the other is in one condition and operative to govern the train to stop when both said vehicle control means are in their other condition, a first circuit means operative when the second vehicle control means is in its one condition to operate the first vehicle control means to its one condition in response to the activation of a first one of the command means, a second circuit means operative when the first vehicle control means is in its other condition to operate the second vehicle control means to its one condition in response to the activation of a second one of the command means, means governed by the operation of the second vehicle control means to its one condition to operate the zone transfer means to its second condition to govern the vehicle receiving means to activate momentarily said first command means upon the transmission of the command for the distinct zone stored in the second storage means, and means operative to hold said first and second vehicle control means in its respective one condition in response to the repetitive activation within said predetermined time limit intervals of the respective one of the first and second command means, whereby the railway vehicle is governed to travel in a particular zone in response to the repetitive reception of a transmitted control and is governed to travel in a successive zone only upon receiving the second control repetitively prior to the reception of the first control for the next successive zone.

16. A system as claimed in claim 15 including third circuit means operative to cancel the distinct zone stored in the first storage means upon the operation of the first vehicle control means in response to a momentary activation of the first command means for the zone stored in the second storage means.

17. A system as claimed in claim 15 further including location means on the train normally in one condition and operated to its other condition upon the presence of the train a predetermined distance beyond the entrance of each zone, and wherein said second circuit means is operative to operate the second vehicle control means to its one condition only when said location means is in its one condition, and wherein the operation of the second vehicle control means is effective to operate the zone transfer means to its second condition when the second vehicle control means is in its one condition only when the location means is in its other condition, and a third circuit means to operate the location means to its one condition in response to the operation of the first vehicle control means to its one condition when the second vehicle control means is in its one condition.

18. In a system according to claim 15 further including transmitting means on the railway vehicle operative to transmit a selected signal in response to the reception of a selected command, and circuit means on the vehicle to govern the vehicle transmitting means to transmit a first distinct signal when only one zone is stored in the zone storage means and to transmit a second distinct signal when two distinct zones are stored in the storage means, and means at the central office responsive to the reception of a distinct one of said first and second signals to govern the transmission of a respective one of the first and second commands by the central office transmitting means.

References Cited by the Examiner

UNITED STATES PATENTS

| | | | |
|---|---|---|---|
| 3,001,063 | 9/1961 | George | 246—5 X |
| 3,027,544 | 3/1962 | Atkinson | 246—122 X |
| 3,054,100 | 9/1962 | Jones | 246—122 X |
| 3,072,785 | 1/1963 | Hailes | 246—30 X |
| 3,112,908 | 12/1963 | Hailes | 246—3 X |

FOREIGN PATENTS 1,277,755  10/1961  France.

ARTHUR L. LA POINT, *Primary Examiner.*

LEO QUACKENBUSH, *Examiner.*

S. B. GREEN, *Assistant Examiner.*